United States Patent
Pedlar et al.

(10) Patent No.: US 12,003,206 B2
(45) Date of Patent: Jun. 4, 2024

(54) RAIL-BASED SOLAR PANEL MOUNTING SYSTEM

(71) Applicant: IronRidge, Inc., Hayward, CA (US)

(72) Inventors: Roger Pedlar, Phoenix, AZ (US); Bryan Lester, Phoenix, AZ (US); Anumeha Justice, Leesburg, VA (US); Duane Menton, Vallejo, CA (US); Joe Greer, Phoenix, AZ (US); Alexander Parsley, Folsom, CA (US); Jordan Wensley, San Diego, CA (US)

(73) Assignee: IronRidge, Inc., Hayward, CA (US)

( * ) Notice: Subject to any disclaimer, the term of this patent is extended or adjusted under 35 U.S.C. 154(b) by 0 days.

(21) Appl. No.: 18/266,406

(22) PCT Filed: Aug. 24, 2022

(86) PCT No.: PCT/US2022/041312
§ 371 (c)(1),
(2) Date: Jun. 9, 2023

(87) PCT Pub. No.: WO2023/028101
PCT Pub. Date: Mar. 2, 2023

(65) Prior Publication Data
US 2023/0396208 A1     Dec. 7, 2023

Related U.S. Application Data

(60) Provisional application No. 63/236,385, filed on Aug. 24, 2021.

(51) Int. Cl.
*H02S 20/23*     (2014.01)
*F24S 25/30*     (2018.01)
(Continued)

(52) U.S. Cl.
CPC .............. *H02S 20/23* (2014.12); *F24S 25/30* (2018.05); *F24S 25/65* (2018.05); *F24S 25/35* (2018.05);
(Continued)

(58) Field of Classification Search
CPC . H02S 20/23; F24S 25/30; F24S 25/65; F24S 25/35; F24S 25/634; F24S 2025/60; F24S 2025/6006; F24S 2025/6003
See application file for complete search history.

(56) References Cited

U.S. PATENT DOCUMENTS

| 6,182,403 B1 | 2/2001 | Mimura et al. |
| 6,547,482 B2 | 4/2003 | Schwörer |

(Continued)

FOREIGN PATENT DOCUMENTS

| DE | 19830784 A1 | 1/2000 |
| DE | 202006018426 U1 | 2/2007 |

(Continued)

OTHER PUBLICATIONS

SnapNRack, "SnapNRack Universal End Clamp", 2023, pp. 1-26.

*Primary Examiner* — Jessie T Fonseca
(74) *Attorney, Agent, or Firm* — The Webb Law Firm

(57) ABSTRACT

A rail-based solar panel mounting system including at least one mounting bracket coupled to a mounting surface and at least one elongated rail having an open channel configuration, wherein the at least one elongated rail is coupled to the at least one mounting bracket. The mounting system also includes at least one mid-clamp assembly couplable to the at least one elongated rail, wherein the at least one mid-clamp assembly is configured to retain at least one solar panel relative to the at least one elongated rail.

20 Claims, 50 Drawing Sheets

(51) Int. Cl.
  *F24S 25/60* (2018.01)
  *F24S 25/65* (2018.01)
  *F24S 25/35* (2018.01)
  *F24S 25/634* (2018.01)

(52) U.S. Cl.
  CPC .............. *F24S 2025/6003* (2018.05); *F24S 2025/6006* (2018.05); *F24S 25/634* (2018.05)

(56) References Cited

U.S. PATENT DOCUMENTS

| | | |
|---|---|---|
| 6,672,018 B2 | 1/2004 | Shingleton |
| 6,784,360 B2 | 8/2004 | Nakajima et al. |
| 7,592,537 B1 | 9/2009 | West |
| D627,717 S | 11/2010 | Munoz et al. |
| 8,152,575 B2 | 4/2012 | Boling et al. |
| 8,181,926 B2 | 5/2012 | Magno, Jr. et al. |
| 8,376,298 B2 | 2/2013 | McPheeters |
| 8,407,895 B2 | 4/2013 | Hartelius et al. |
| 8,413,944 B2 | 4/2013 | Harberts et al. |
| 8,505,863 B2 | 8/2013 | McPheeters |
| 8,567,030 B2 | 10/2013 | Koch et al. |
| 8,585,000 B2 | 11/2013 | McPheeters |
| 8,801,349 B2 | 8/2014 | McPheeters |
| 8,936,224 B2 | 1/2015 | Bartelt-Muszynski et al. |
| 8,984,818 B2 | 3/2015 | McPheeters et al. |
| D732,698 S | 6/2015 | Meng |
| 9,057,542 B2 | 6/2015 | Schuit et al. |
| 9,074,616 B2 | 7/2015 | Wiley et al. |
| 9,076,899 B2 | 7/2015 | Schrock |
| 9,093,584 B2 | 7/2015 | Kanbara et al. |
| 9,147,986 B2 | 9/2015 | Redel |
| 9,160,273 B2 | 10/2015 | Schuit et al. |
| 9,166,524 B2 | 10/2015 | West et al. |
| 9,291,369 B2 | 3/2016 | West et al. |
| 9,306,490 B2 | 4/2016 | Haddock et al. |
| 9,416,992 B2 | 8/2016 | Braunstein et al. |
| 9,422,723 B2 | 8/2016 | Stearns et al. |
| 9,515,599 B2 | 12/2016 | Franklin et al. |
| 9,531,319 B2 | 12/2016 | Braunstein et al. |
| 9,577,571 B2 | 2/2017 | Atia et al. |
| 9,584,062 B2 | 2/2017 | Ganshaw et al. |
| 9,638,223 B2 | 5/2017 | Redel |
| 9,647,433 B2 | 5/2017 | Meine et al. |
| 9,660,567 B2 | 5/2017 | Goehringer et al. |
| 9,660,570 B2 | 5/2017 | Stephan et al. |
| 9,673,752 B2 | 6/2017 | Tripp et al. |
| 9,689,411 B2 | 6/2017 | Meine et al. |
| 9,698,724 B2 | 7/2017 | West et al. |
| 9,732,512 B2 | 8/2017 | Haddock |
| 9,755,572 B2 | 9/2017 | Wentworth et al. |
| 9,774,291 B2 | 9/2017 | Stearns et al. |
| 9,774,292 B2 | 9/2017 | Stearns et al. |
| 9,777,948 B2 | 10/2017 | Braunstein et al. |
| 9,800,200 B2 | 10/2017 | Higuchi et al. |
| 9,803,893 B2 | 10/2017 | Giraudo et al. |
| 9,813,015 B1 | 11/2017 | Kapla et al. |
| 9,837,955 B1 | 12/2017 | Schuit et al. |
| 9,865,938 B2 | 1/2018 | Meine et al. |
| 9,876,463 B2 | 1/2018 | Jasmin |
| 9,893,436 B2 | 2/2018 | Martin |
| 9,893,677 B1 | 2/2018 | Liu |
| 9,911,880 B2 | 3/2018 | West et al. |
| D815,303 S | 4/2018 | Schuit et al. |
| 10,014,818 B2 | 7/2018 | Stearns et al. |
| 10,020,773 B2 | 7/2018 | Molina et al. |
| 10,036,576 B1 | 7/2018 | Robinson |
| 10,079,570 B2 | 9/2018 | Patton et al. |
| 10,097,132 B2 | 10/2018 | Stearns et al. |
| 10,097,133 B2 | 10/2018 | Aliabadi et al. |
| 10,187,006 B2 | 1/2019 | Almy et al. |
| 10,218,305 B1 | 2/2019 | Schrock |
| 10,240,820 B2 | 3/2019 | Ash et al. |
| 10,243,507 B2 | 3/2019 | Kapla et al. |
| 10,256,765 B2 | 4/2019 | Rodrigues et al. |
| 10,288,319 B2 | 5/2019 | Li et al. |
| 10,305,415 B2 | 5/2019 | McPheeters et al. |
| 10,309,690 B2 | 6/2019 | West et al. |
| 10,312,855 B2 | 6/2019 | Lester et al. |
| D853,954 S | 7/2019 | McPheeters |
| 10,337,764 B2 | 7/2019 | Ash et al. |
| 10,340,838 B2 | 7/2019 | Schuit et al. |
| 10,381,974 B2 | 8/2019 | McPheeters |
| 10,418,931 B2 | 9/2019 | McPheeters et al. |
| 10,432,133 B2 | 10/2019 | Braunstein et al. |
| 10,451,315 B2 | 10/2019 | Harris et al. |
| 10,587,220 B2 | 3/2020 | De Vogel et al. |
| 10,608,578 B2 | 3/2020 | Itou et al. |
| 10,622,935 B1 | 4/2020 | Liu |
| 10,630,229 B2 | 4/2020 | Stapleton |
| 10,680,548 B2 | 6/2020 | Braunstein et al. |
| 10,686,399 B2 | 6/2020 | Linderman |
| 10,686,401 B2 | 6/2020 | Ash et al. |
| 10,742,007 B2 | 8/2020 | Schimpf |
| 11,056,998 B2 | 7/2021 | Martin |
| 11,143,436 B1 | 10/2021 | Stephan et al. |
| 2006/0257229 A1 | 11/2006 | Bucciferro et al. |
| 2010/0276558 A1 | 11/2010 | Faust et al. |
| 2010/0282920 A1* | 11/2010 | McPheeters ............ F24S 25/00 248/72 |
| 2011/0000151 A1 | 1/2011 | Hochreiter et al. |
| 2011/0001030 A1 | 1/2011 | Hochreiter et al. |
| 2011/0138585 A1 | 1/2011 | Kmita et al. |
| 2011/0248131 A1 | 10/2011 | Genschorek |
| 2011/0253859 A1 | 10/2011 | Ostermeier et al. |
| 2011/0283492 A1* | 11/2011 | McPheeters ............ F24S 25/00 24/569 |
| 2011/0284708 A1* | 11/2011 | McPheeters ............ E04D 13/00 248/226.11 |
| 2011/0299957 A1 | 12/2011 | Young |
| 2012/0001046 A1 | 1/2012 | Schmotz |
| 2012/0025042 A1 | 2/2012 | Bellacicco et al. |
| 2012/0097807 A1 | 4/2012 | Rees |
| 2012/0167364 A1 | 7/2012 | Koch et al. |
| 2012/0192926 A1 | 8/2012 | Kambara et al. |
| 2014/0010616 A1 | 1/2014 | Meine et al. |
| 2014/0179133 A1 | 1/2014 | Redel et al. |
| 2014/0202523 A1 | 7/2014 | Guo |
| 2014/0220834 A1 | 8/2014 | Rizzo |
| 2014/0338729 A1* | 11/2014 | Newman ................ H02S 20/10 136/251 |
| 2015/0075588 A1 | 3/2015 | Franklin et al. |
| 2015/0076301 A1* | 3/2015 | McPheeters ......... H01Q 1/1207 248/214 |
| 2015/0101655 A1 | 4/2015 | Schuit et al. |
| 2015/0362220 A1 | 12/2015 | Redel |
| 2016/0233819 A1 | 8/2016 | Redel |
| 2016/0268958 A1 | 9/2016 | Wildes et al. |
| 2016/0268959 A1 | 9/2016 | Meine et al. |
| 2017/0099028 A1 | 4/2017 | Braunstein et al. |
| 2017/0194902 A1 | 7/2017 | Meine et al. |
| 2017/0207743 A1 | 7/2017 | Lemos et al. |
| 2017/0346439 A1 | 11/2017 | Pereira et al. |
| 2017/0366131 A1 | 12/2017 | Stearns et al. |
| 2018/0013379 A1 | 1/2018 | Stearns et al. |
| 2018/0026576 A1 | 1/2018 | Danning |
| 2018/0044909 A1 | 2/2018 | Haddock |
| 2018/0135891 A1 | 5/2018 | Li et al. |
| 2018/0367093 A1* | 12/2018 | Ayers ...................... F24S 25/61 |
| 2019/0013653 A1 | 1/2019 | Schimpf |
| 2019/0036474 A1 | 1/2019 | Schuit et al. |
| 2019/0049151 A1* | 2/2019 | Harris ................... F24S 25/636 |
| 2019/0178274 A1 | 6/2019 | Katz |
| 2019/0338988 A1 | 11/2019 | Harris et al. |
| 2020/0099331 A1 | 3/2020 | McPheeters |
| 2020/0099332 A1 | 3/2020 | Rossi et al. |
| 2020/0259450 A1 | 8/2020 | Braunstein et al. |
| 2020/0274258 A1 | 8/2020 | Ash et al. |
| 2020/0313611 A1 | 10/2020 | Ash et al. |
| 2021/0184626 A1* | 6/2021 | Yang ...................... H02S 20/23 |

(56) References Cited

U.S. PATENT DOCUMENTS

| | | | | |
|---|---|---|---|---|
| 2022/0381275 | A1* | 12/2022 | Katz | F24S 25/30 |
| 2023/0036926 | A1* | 2/2023 | Jovanovic | H02S 30/10 |

FOREIGN PATENT DOCUMENTS

| | | | | |
|---|---|---|---|---|
| DE | 202007000309 | U1 | | 4/2007 |
| DE | 102004044103 | B4 | | 6/2008 |
| DE | 202011107843 | U1 | | 11/2011 |
| DE | 202013002857 | U1 | | 5/2013 |
| DE | 202012005714 | U1 | * 11/2013 | F16B 2/12 |
| DE | 102020206810 | B3 | * 8/2021 | F24S 25/636 |
| EM | 0021880940002 | S | | 3/2013 |
| EP | 0828035 | A2 | | 3/1998 |
| EP | 1930668 | A2 | | 6/2008 |
| EP | 2194335 | A1 | | 6/2010 |
| EP | 2352177 | A1 | | 8/2011 |
| EP | 2425169 | A1 | | 3/2012 |
| EP | 2604949 | A1 | | 6/2013 |
| EP | 2425188 | B1 | | 8/2015 |
| EP | 2440860 | B1 | | 5/2016 |
| EP | 3023558 | A1 | | 5/2016 |
| EP | 3043123 | A1 | | 7/2016 |
| EP | 1341240 | B1 | | 11/2016 |
| EP | 2716835 | B1 | | 7/2017 |
| EP | 2423622 | B1 | | 8/2017 |
| EP | 3361628 | A1 | | 8/2018 |
| EP | 2413063 | B1 | | 10/2018 |
| EP | 3128098 | B1 | | 12/2018 |
| EP | 2242112 | B1 | | 2/2019 |
| EP | 2757332 | B1 | | 7/2019 |
| EP | 3364124 | B1 | | 10/2019 |
| NL | 1021582 | C2 | | 4/2004 |
| WO | 03098126 | A1 | | 11/2003 |
| WO | 2010124680 | A2 | | 11/2010 |
| WO | 2010126770 | A1 | | 11/2010 |
| WO | 2010136022 | A2 | | 12/2010 |
| WO | 2013092428 | A1 | | 6/2013 |
| WO | 2013110456 | A2 | | 8/2013 |
| WO | 2013163667 | A1 | | 11/2013 |
| WO | 2014194576 | A1 | | 12/2014 |
| WO | 2016014042 | A1 | | 1/2016 |
| WO | 2019032215 | A1 | | 2/2019 |
| WO | 2022132135 | A1 | | 6/2022 |

\* cited by examiner

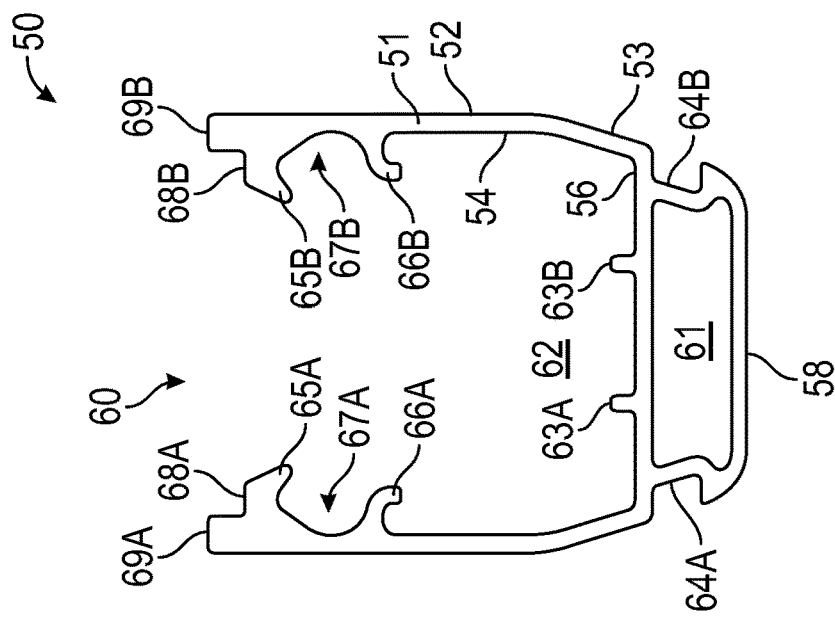
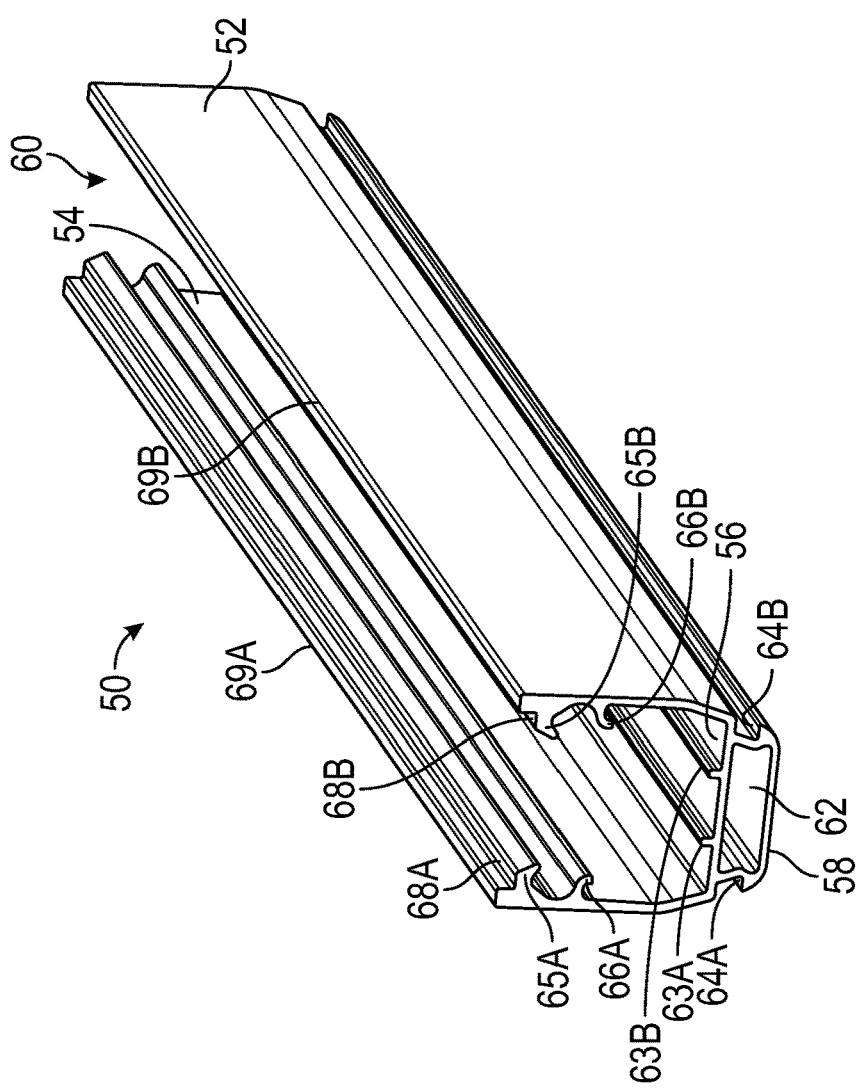
FIG. 4B
FIG. 4A

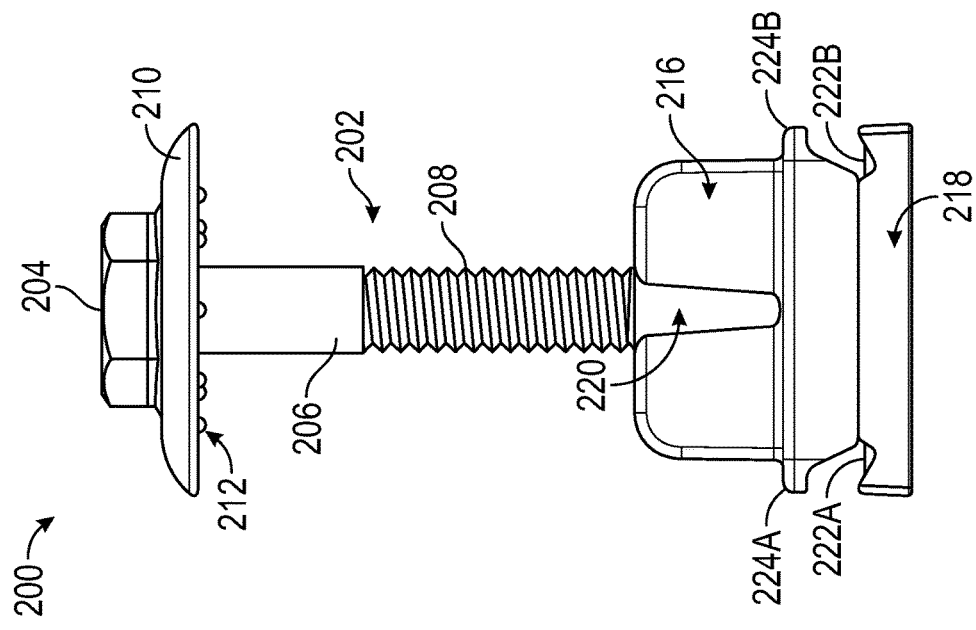
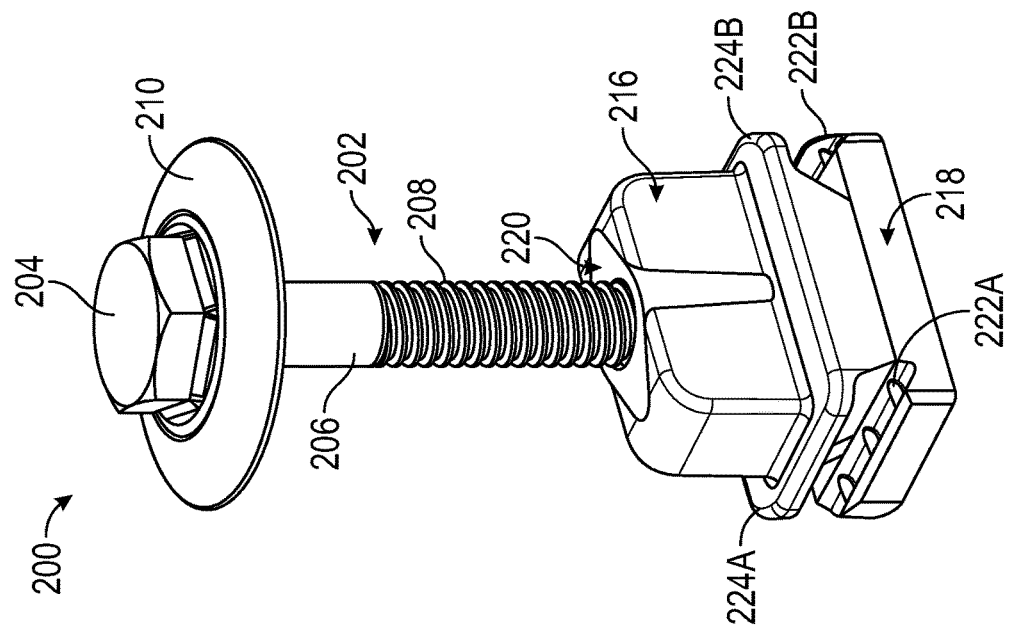

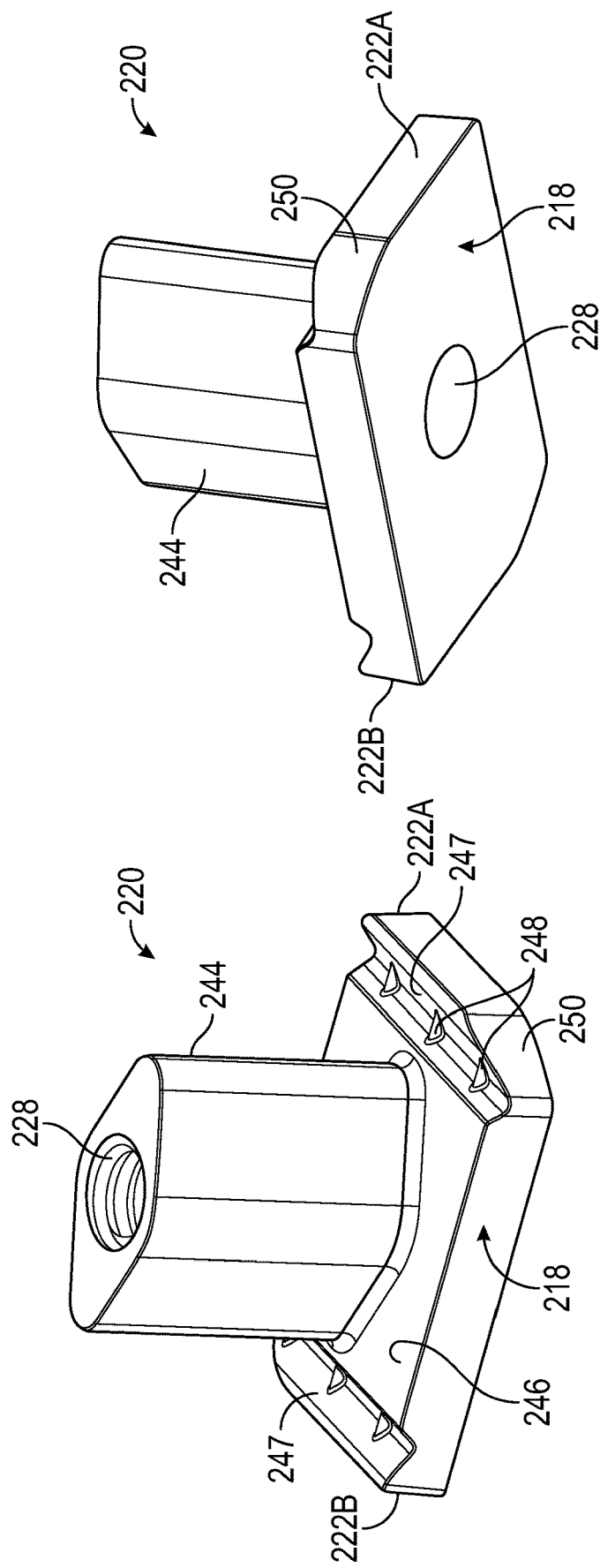

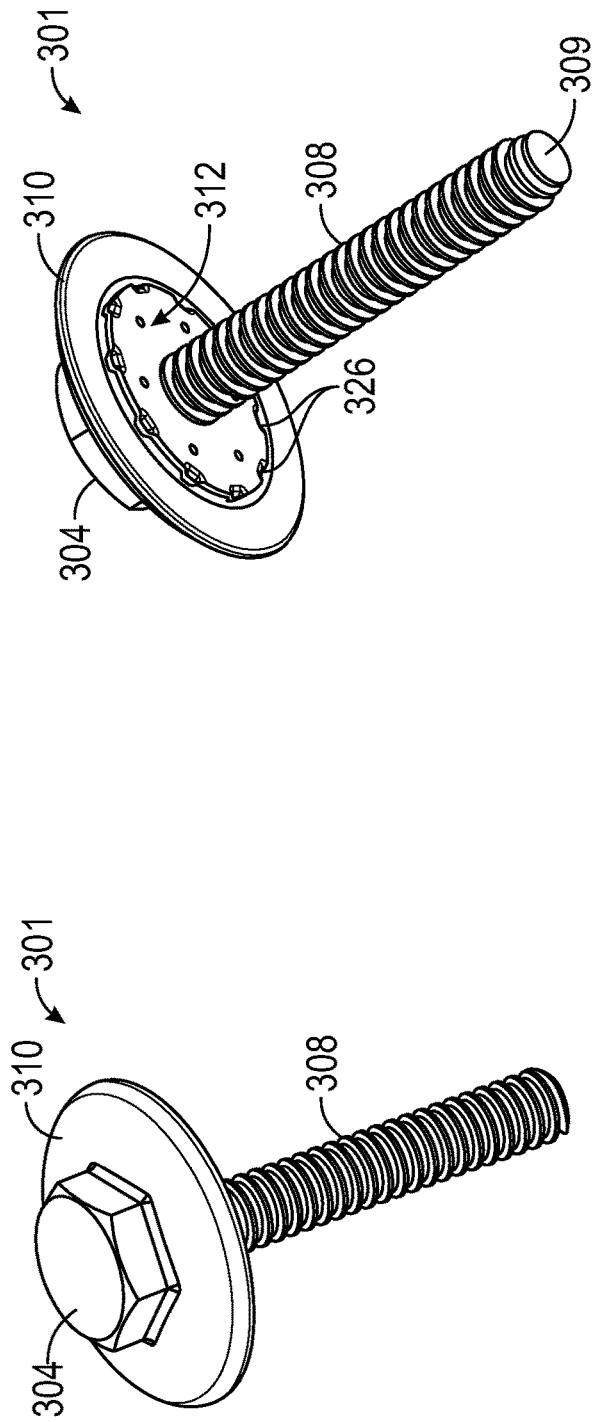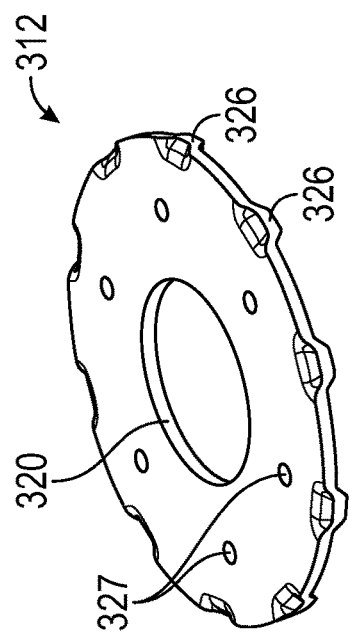
FIG. 14B
FIG. 14C
FIG. 14A

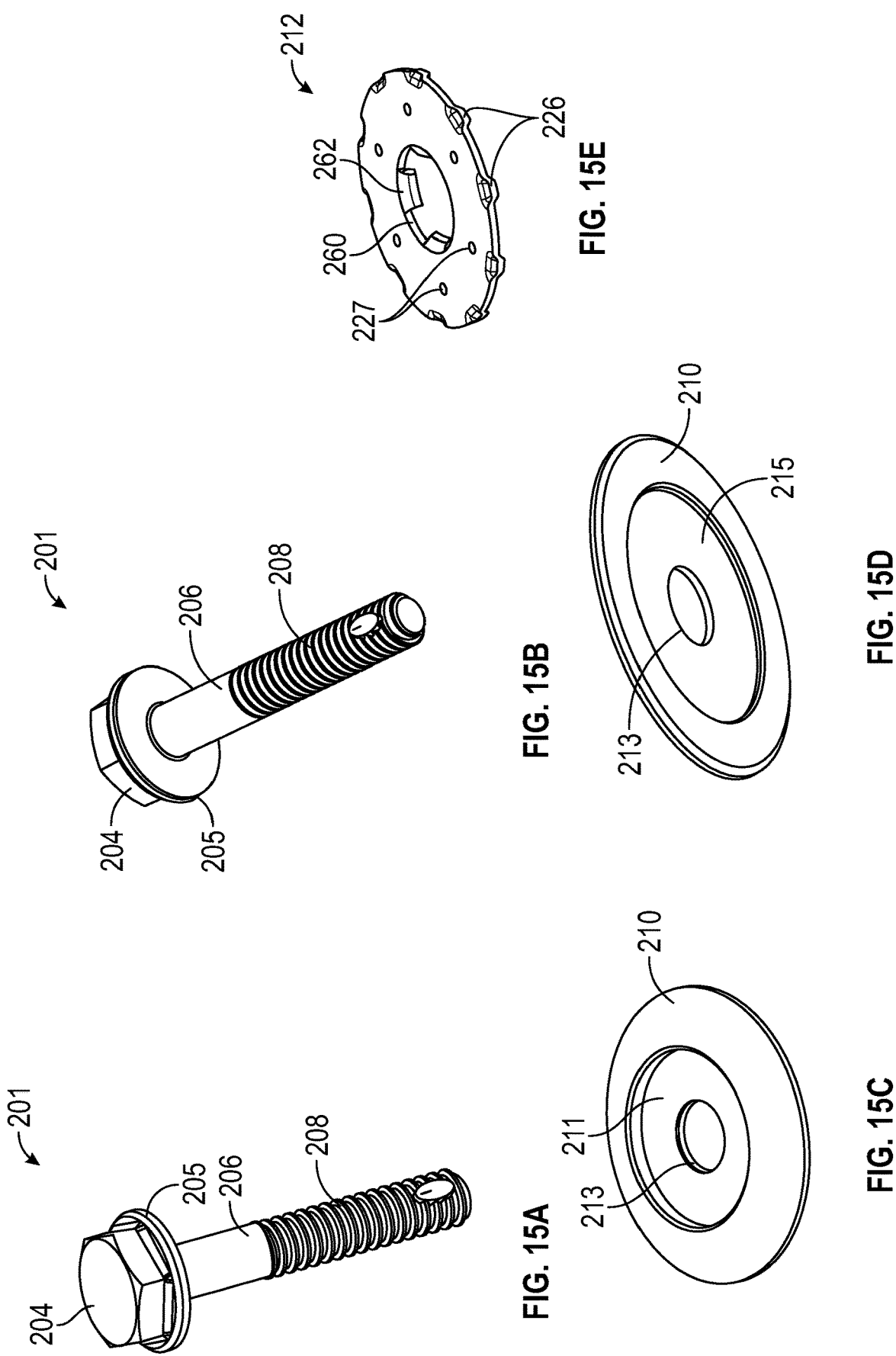

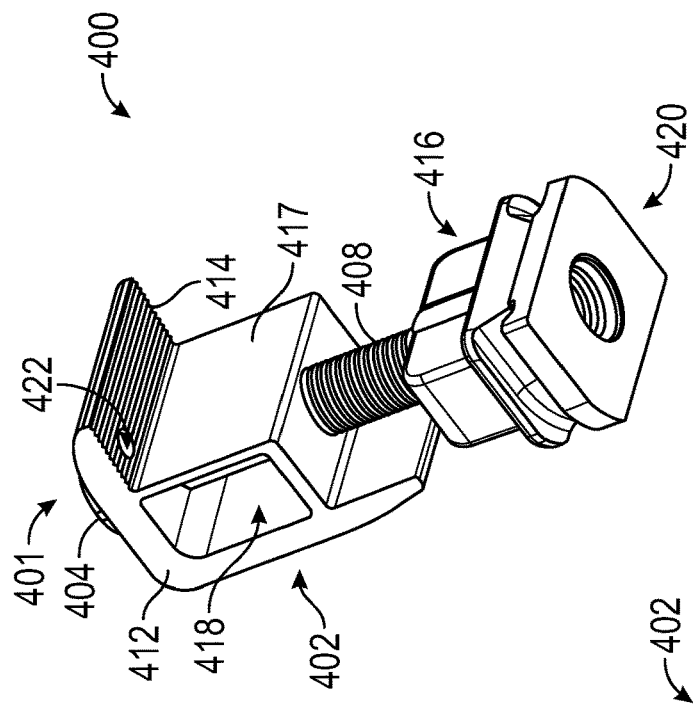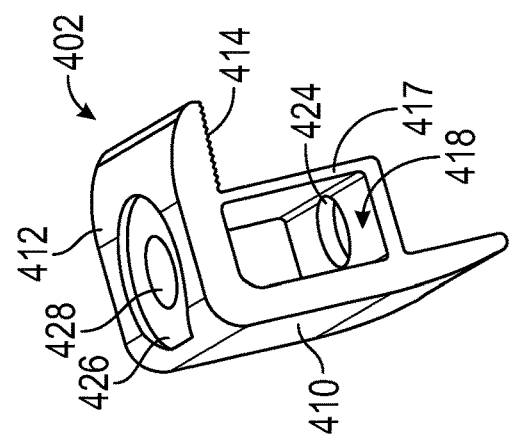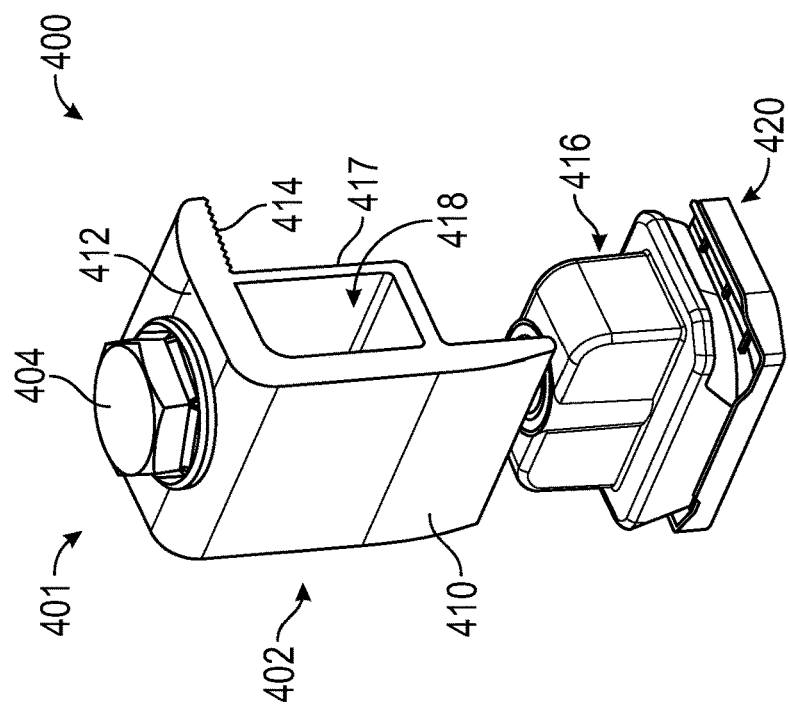

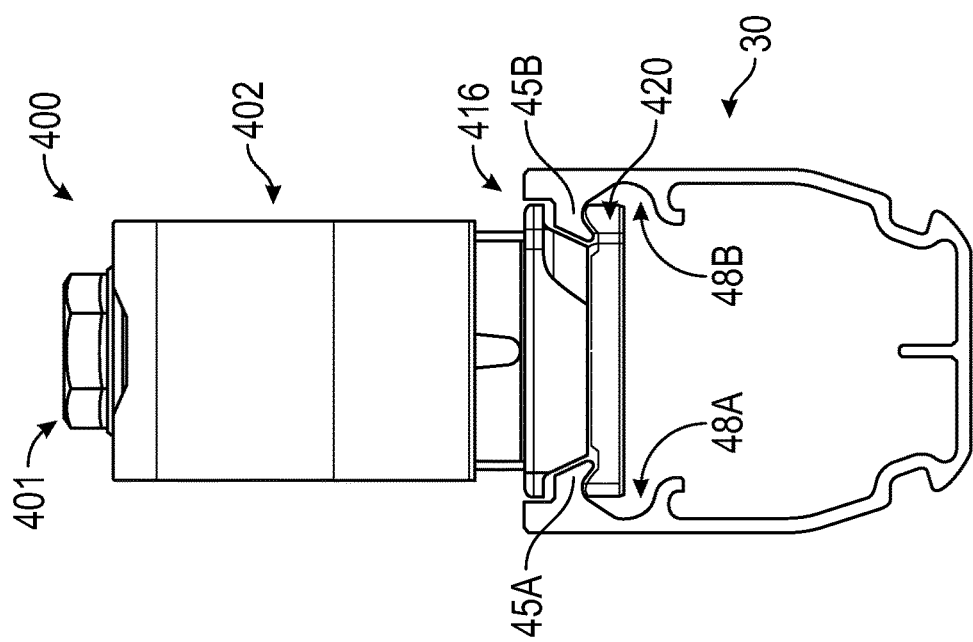
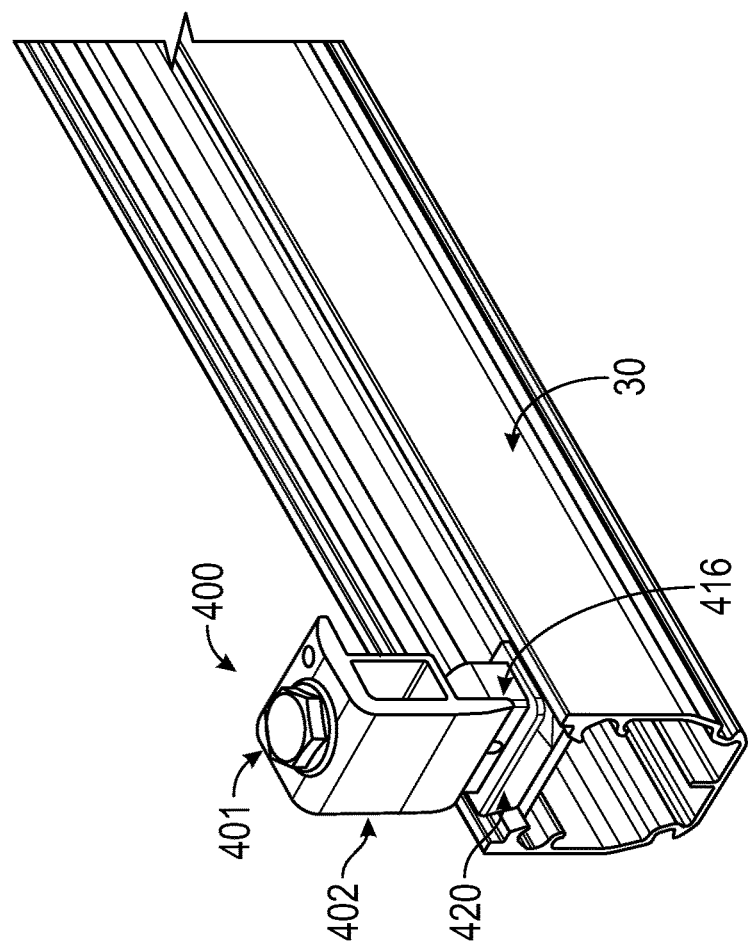
FIG. 17B
FIG. 17A

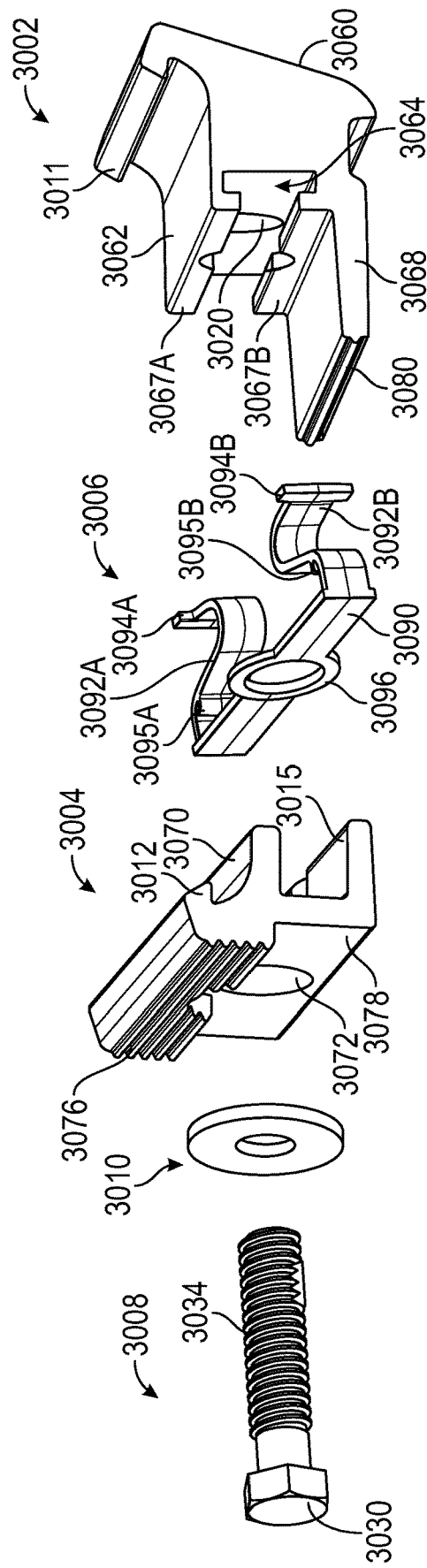

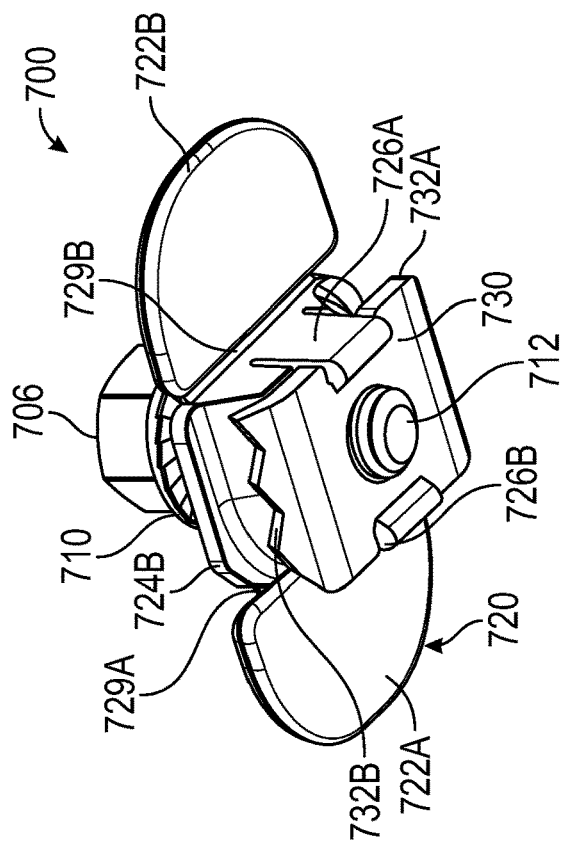
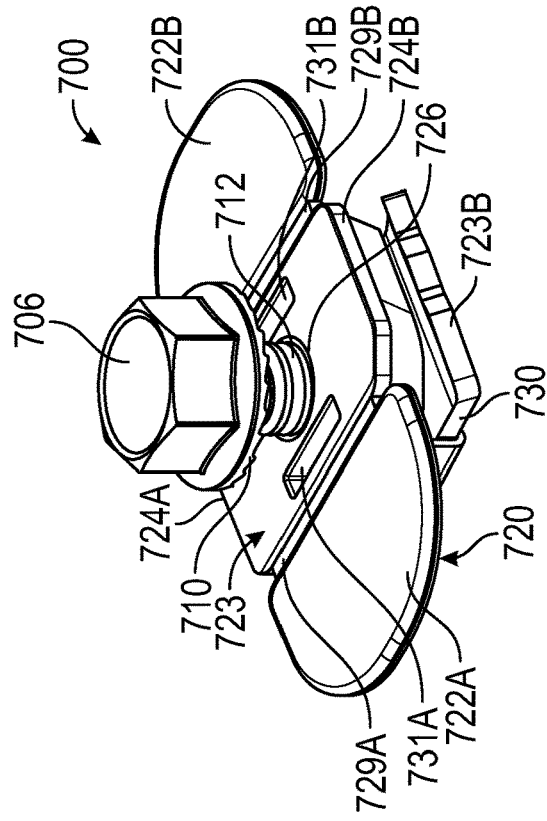
FIG. 32B
FIG. 32A

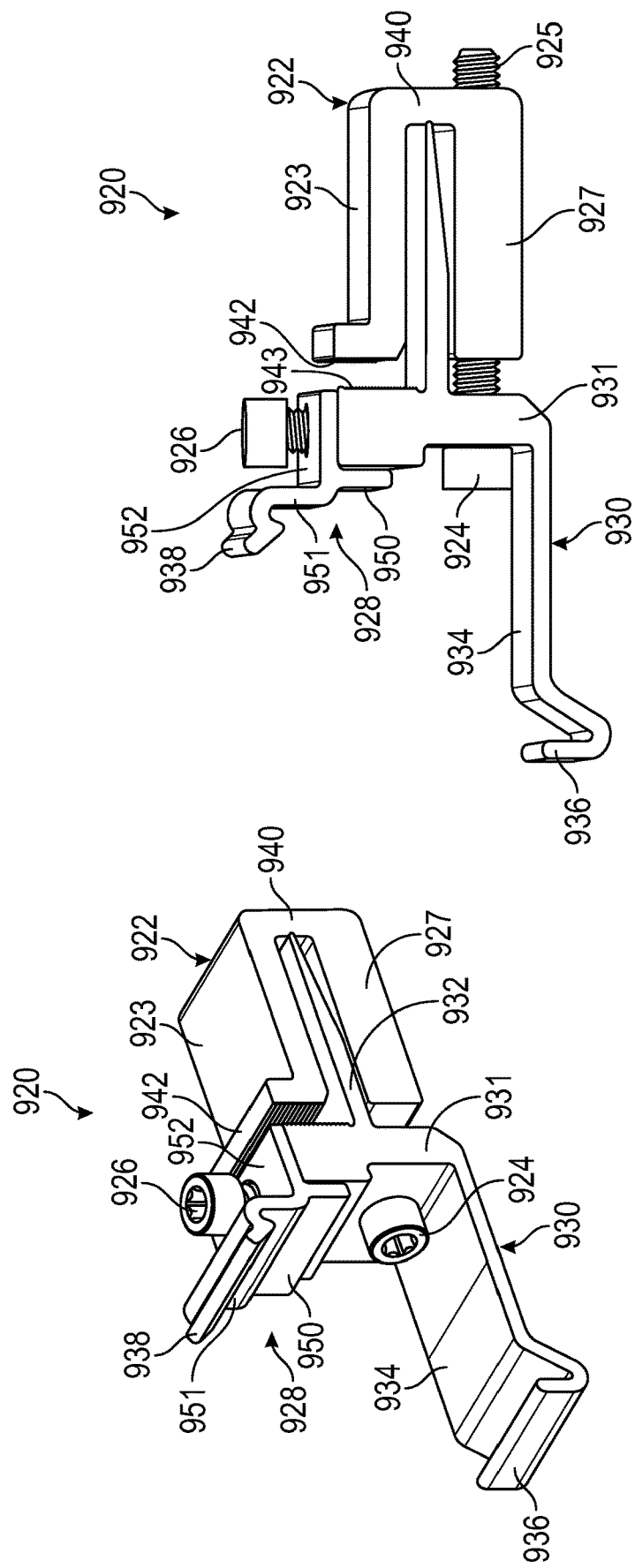

RAIL-BASED SOLAR PANEL MOUNTING SYSTEM

CROSS-REFERENCE TO RELATED APPLICATIONS

This application is the United States national phase of International Application No. PCT/US22/41312 filed Aug. 24, 2022, and claims priority to U.S. Provisional Patent Application No. 63/236,385 filed Aug. 24, 2021, the disclosures of which are hereby incorporated by reference in their entireties.

BACKGROUND OF THE INVENTION

Field of the Disclosure

The present disclosure relates generally to a mounting system utilized in mounting solar panels and associated components to, e.g., a rooftop. More specifically, the present disclosure relates to a rail-based solar panel mounting system and associated components.

Description of the Related Art

The use of solar panels for electrical energy generation has become increasingly popular, both in commercial and residential settings. Most commonly, each solar panel comprises a large array of photovoltaic cells surrounded by a rigid aluminum frame, with electrical leads extending from each panel to an inverter or to an electrical storage device such as a battery. In order to provide maximum exposure to sunlight necessary for solar energy conversion, the solar panels are often strategically positioned on rooftops. Accordingly, various mounting systems have been developed to enable efficient and secure mounting of solar panel arrays to rooftop structures, including residential homes having standard composite shingled roofs.

As solar energy generation continues to rise in popularity amongst homeowners and commercial users alike, the cost, complexity, and aesthetics of solar panel installations has become increasingly scrutinized. Unfortunately, many current installation mounting systems cannot provide a relatively low-cost solution that is both aesthetically pleasing and less labor-intensive to install.

SUMMARY OF THE INVENTION

In view of the foregoing, there exists a need for lower-cost solar panel mounting systems and installation methods that also provide for improved securement of the panels to a rail-based mounting system, particularly for residential installations.

In accordance with an aspect of the present disclosure, a rail-based solar panel mounting system is disclosed. The rail-based solar panel mounting system includes at least one mounting bracket coupled to a mounting surface, at least one elongated rail having an open channel configuration, wherein the at least one elongated rail is coupled to the at least one mounting bracket, at least one mid-clamp assembly couplable to the at least one elongated rail, wherein the at least one mid-clamp assembly is configured to retain at least one solar panel relative to the at least one elongated rail.

In some embodiments, the mounting system includes at least one universal end clamp couplable to the at least one elongated rail, wherein the at least one universal end clamp is configured to retain the at least one solar panel relative to the at least one elongated rail.

In some embodiments, the mounting system includes at least one hidden end clamp couplable to the at least one elongated rail, wherein the at least one hidden end clamp is configured to retain the at least one solar panel relative to the at least one elongated rail.

In some embodiments, the at least one hidden end clamp further includes a tether.

In some embodiments, the mounting system includes at least one module-level power electronics (MLPE) mount assembly couplable to the at least one elongated rail.

In some embodiments, the mounting system includes at least one grounding lug assembly couplable to the at least one elongated rail.

In some embodiments, the mounting system includes at least one skirt assembly couplable to a frame surface of the at least one solar panel.

In some embodiments, the at least one skirt assembly includes at least one skirt clamp and at least one skirt member.

In some embodiments, the at least one skirt assembly further includes at least one skirt splice configured to couple a plurality of skirt members.

In some embodiments, the at least one rail splice is configured to couple a plurality of elongated rails.

In some embodiments, the mounting system further includes at least one rail attachment bracket, wherein the at least one rail attachment bracket is couplable to the at least one mounting bracket and configured to couple the at least one elongated rail to the at least one mounting bracket.

In some embodiments, the mounting system further includes a hidden end clamp assembly configured to secure a frame member of a solar panel module to a rail, the assembly including: a clamping body, where the clamping body includes a top clamping portion having a lower clamping surface and a leg portion extending downwardly from the lower clamping surface at an acute angle, where a distal end portion of the leg portion includes a base portion having at least one elongated opening formed therethrough; a nut member, where the nut member includes a pair of flanges extending from a rear portion, where the pair of flanges are spaced apart so as to at least partially receive the base portion of clamping body, where the rear portion extends at an angle substantially equal to the acute angle of the leg portion of the clamping body, and further where the rear portion includes a threaded opening formed therethrough; and a fastener member, where the fastener member includes a drive head and a threaded shank, and where the threaded shank is configured to extend through the at least one elongated opening of the base portion and engage with the threaded opening of the rear portion of the nut member such that tightening of the fastener member causes the clamping body to move downward relative to the nut member.

In some embodiments, the mounting system further includes wherein the top clamping portion further comprises one or more bonding portions extending from the lower clamping surface, wherein the bonding portions are formed of an electrically conducting material.

In some embodiments, the mounting system further includes wherein the one or more bonding portions comprise one or more sharp piercing points.

In some embodiments, the mounting system further includes wherein the base portion of the clamping body includes a pair of elongated openings formed therethrough.

In some embodiments, the mounting system further includes a retaining member configured to be coupled to the clamping body and the nut member by the fastener member to support the clamping body relative to the nut member when the fastener member is in an untightened state.

In some embodiments, the mounting system further includes the retaining member includes a bottom retaining portion, a front extension, a rear extension, and a curved portion coupling the front extension and the rear extension, where the rear extension is configured to extend within the rear portion of the nut member such that the retaining member acts as a spring to urge the rear portion of the nut member away from the leg portion of the clamping body.

In some embodiments, the mounting system further includes the front extension includes a front through-hole and the rear extension comprises a rear through-hole, where the front through-hole and the rear-through hole are sized and configured to receive the threaded shank of the fastener member therethrough so as to couple the retaining member to the clamping body and the nut member.

In some embodiments, the mounting system further includes the base portion of the clamping body further includes a pair of projecting side surfaces having respective sloping ledges and the flanges of the nut member includes respective sloping flange bottom surfaces, further where the sloping flange bottom surfaces engage the sloping ledges when the fastening member is tightened.

In some embodiments, the mounting system further includes the pair of flanges of the nut member further include respective wing projections angled outwardly therefrom, where the wing projections are configured to provide a slidable interface between the nut member and a pair of elongated recesses of the rail.

In some embodiments, the mounting system further includes each wing projection includes at least one piercing projection extend from an upper portion of each notch.

In some embodiments, the mounting system further includes the base portion of the clamp body further includes a front face, where a surface plane of the front face is parallel to the angled leg portion of the clamp body.

In some embodiments, the mounting system further includes a rear surface of the top clamping portion of the clamping body includes a plurality of parallel ribs to form a textured surface.

In some embodiments, the mounting system further includes the base portion of the clamp body further includes a barb connector.

In some embodiments, the mounting system further includes a tether, where the tether is configured to be coupled to the barb connector.

In some embodiments, the mounting system further includes the tether having a pulling end portion, an elongated central portion, and a coupling end portion, where the coupling end portion comprises an opening sized and configured to surround the barb connector.

In some embodiments, the mounting system further includes each of the clamp body, the nut member, and the fastener member are formed of an electrically conducting material.

In some embodiments, the mounting system further includes a hidden end clamp assembly configured to secure a frame member of a solar panel module to a rail, the assembly including: a clamping body, where the clamping body includes a top clamping portion having a lower clamping surface and a leg portion extending downwardly from the lower clamping surface at an acute angle, where a distal end portion of the leg portion includes a base portion having at least one elongated opening formed therethrough; a nut member, where the nut member includes a pair of flanges extending from a rear portion, where the pair of flanges are spaced apart so as to at least partially receive the base portion of clamping body, where the rear portion extends at an angle substantially parallel to the leg portion of the clamping body, and further where the rear portion includes a threaded opening formed therethrough; and a fastener member, includes a drive head and a threaded shank, the threaded shank through the at least one elongated opening of the base portion where a longitudinal axis of the threaded shank is nonparallel to the rail, and engage with the threaded opening of the rear portion of the nut member such that tightening of the fastener member causes the clamping body to move downward relative to the nut member.

In some embodiments, the mounting system further includes a retaining member positioned at least partially between the clamping body and the nut member and configured to support the clamping body relative to the nut member wherein the retaining member comprises a bottom retaining portion, a front extension, a rear extension, and a curved portion coupling the front extension and the rear extension, where the rear extension is configured to extend within the rear portion of the nut member such that the retaining member acts as a spring to urge the rear portion of the nut member away from the leg portion of the clamping body.

In some embodiments, the mounting system further includes, the clamping body having a barb connector extending from a surface thereof; and a tether, where the tether is configured to be couplable to the barb connector of the base portion of the clamping body to allow the assembly to be selectively positioned along the rail such that the lower clamping portion of the clamping body extends at least partially over the frame member of the solar panel module.

In some embodiments, the mounting system further includes, where the longitudinal axis of the threaded shank extends in a direction through the rail.

Further details and advantages of the present disclosure will be understood from the following detailed description read in conjunction with the accompanying drawings.

BRIEF DESCRIPTION OF THE DRAWINGS

FIG. 4A is a top isometric view of a rail for use in a solar panel mounting system in accordance with another aspect of the present disclosure;

FIG. 4B is an end plan view of the rail of FIG. 4A;

FIG. 10A is a top isometric view of a mid-clamp assembly for use in a solar panel mounting system in accordance with an aspect of the present disclosure;

FIG. 10B is an end plan view of the mid-clamp assembly of FIG. 10A coupled to a rail;

FIG. 13A is a top isometric view of the T-shaped nut of the mid-clamp assembly of FIGS. 10A-10C;

FIG. 13B is a bottom isometric view of the T-shaped nut of the mid-clamp assembly of FIGS. 10A-10C;

FIG. 14A is a top isometric view of a clamping bolt assembly of the mid-clamp assembly in accordance with an aspect of the present disclosure;

FIG. 14B is a bottom isometric view of the clamping bolt assembly of FIG. 14A;

FIG. 14C is a top isometric view of the grounding washer of the clamping bolt assembly of FIG. 14A;

FIG. 15A is a top isometric view of a bolt for use with a mid-clamp assembly in accordance with another aspect of the present disclosure;

FIG. 15B is a bottom isometric view of the bolt of FIG. 15A;

FIG. 15C is a top isometric view of a clamping washer for use the bolt of FIGS. 15A-15B;

FIG. 15D is a bottom isometric view of the clamping washer of FIG. 15C;

FIG. 15E is a top isometric view of a grounding washer for use with the clamping washer of FIGS. 15C-15D;

FIG. 16A is a top isometric view of a universal end clamp assembly in accordance with an aspect of the present disclosure;

FIG. 16B is a bottom isometric view of the universal end clamp assembly of FIG. 16A;

FIG. 16C is a top isometric view of the top clamp member of the universal end clamp assembly of FIGS. 16A-16B;

FIG. 17A is a top isometric view of the universal end clamp assembly of FIG. 16A coupled to a rail;

FIG. 17B is an end view of the universal end clamp assembly of FIG. 16A coupled to a rail;

FIG. 28A is an isometric view of a bolt of the rail attachment bracket of FIG. 27;

FIG. 28B is an isometric view of a washer of the rail attachment bracket of FIG. 27;

FIG. 28C is an isometric view of a first clamp portion of the rail attachment bracket of FIG. 27;

FIG. 28D is an isometric view of a coupling member of the rail attachment bracket of FIG. 27;

FIG. 28E is an isometric view of a second clamp portion of the rail attachment bracket of FIG. 27;

FIG. 32A is a top isometric view of an MLPE mounting clamp in accordance with an aspect of the present disclosure;

FIG. 32B is a bottom isometric view of the MLPE mounting clamp of FIG. 31A;

FIG. 39A is a top isometric view of a skirt clamp assembly in accordance with an aspect of the present disclosure;

FIG. 39B is an end view of the skirt clamp assembly of FIG. 39A;

DESCRIPTION OF THE INVENTION

Figure 1A:
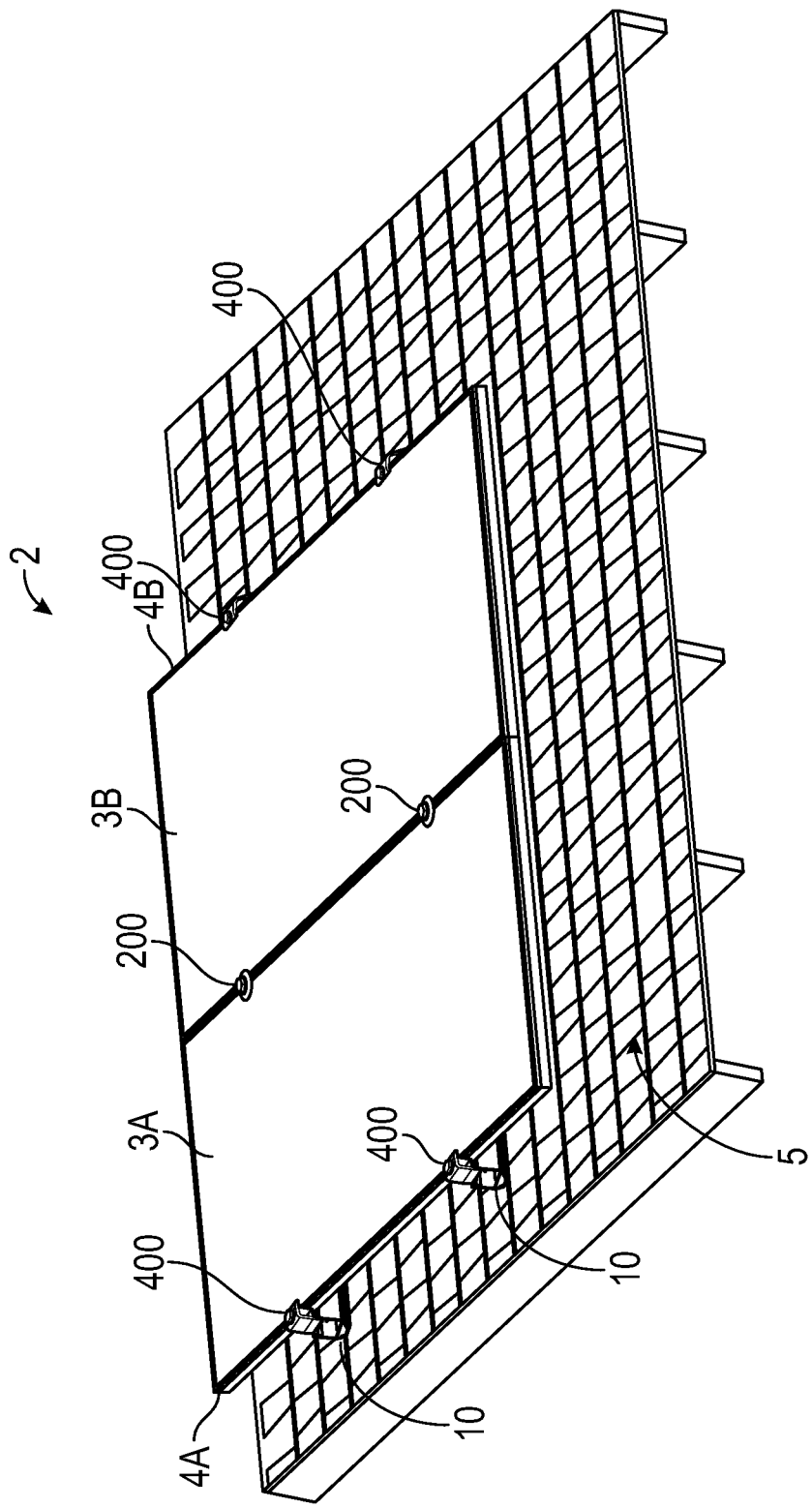
FIG. 1A is a top isometric view of a solar panel array coupled to a rooftop in accordance with an aspect of the present disclosure.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Throughout the foregoing disclosure, various embodiments pertaining to rail-based mounting systems and related componentry for securing solar panels to, e.g., rooftop structures are disclosed. However, it is to be understood that the rail-based mounting system and related componentry described herein may be utilized in non-rooftop applications. Furthermore, while various embodiments of the rail-based mounting systems and related componentry are shown and described herein being used in conjunction with specific rail configurations, rail splice configurations, etc., it is to be understood that the componentry described herein may be utilized with any appropriate rail configuration(s), rail splice configuration(s), etc., including (but not limited to) those shown and described herein with respect to alternative embodiments.

Figure 1B:
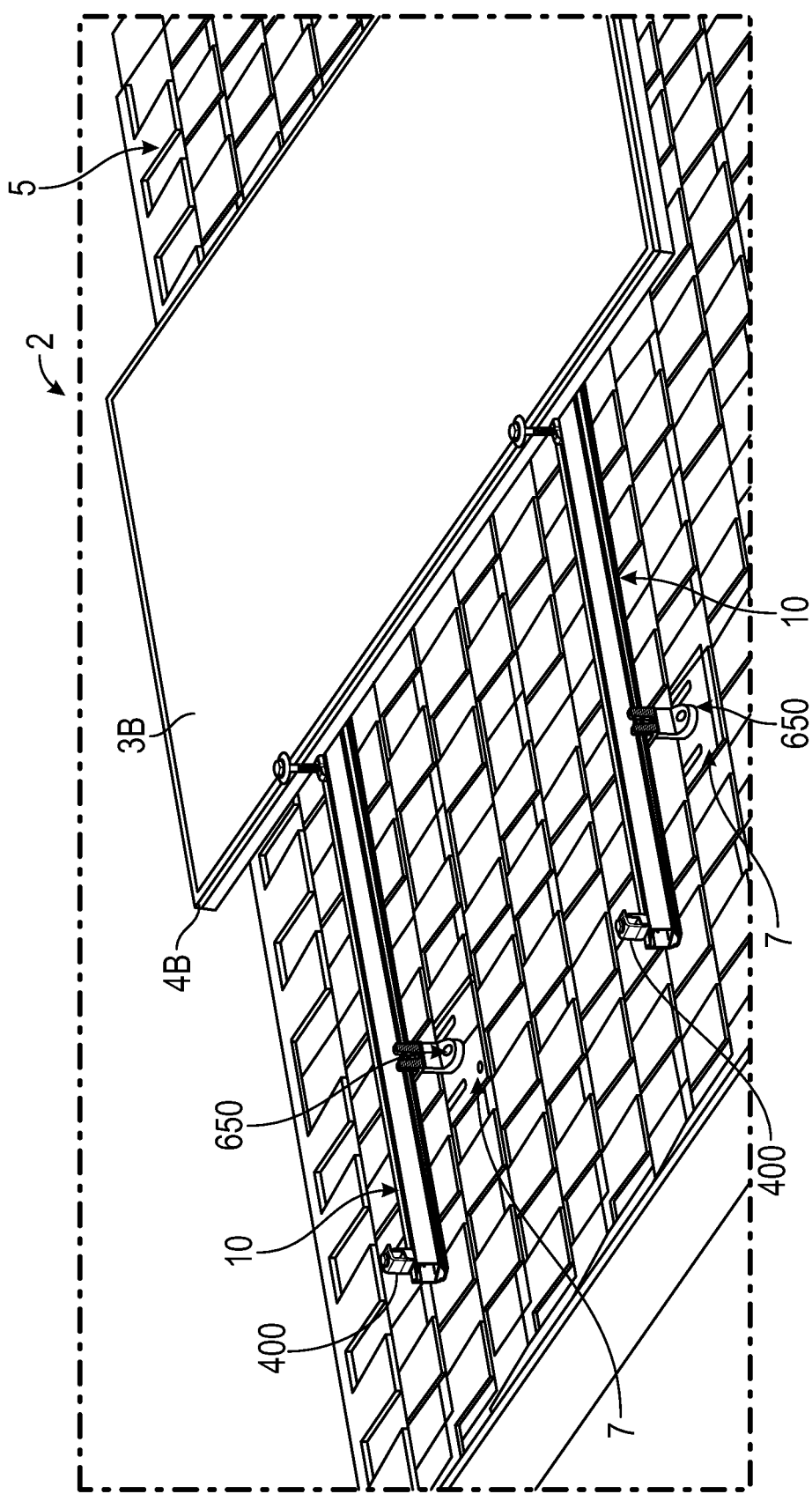
FIG. 1B is another top isometric view of the solar panel array of FIG. 1A.

Referring to FIGS. 1A and 1B, a rail-based mounting system 2 for the securement of at least two solar panels 3A, 3B to a roof structure 5 in accordance with an embodiment of the present disclosure is shown. Each solar panel 3A, 3B includes a respective surrounding frame 4A, 4B, which is utilized to couple the solar panels 3A, 3B to a plurality of rails 10. As will be described in further detail below, various clamping interfaces may be used to couple the panels 3A, 3B to the rails 10, including, e.g., one or more mid-clamp assemblies 200 and/or one or more universal end clamp assemblies 400.

As shown in FIG. 1B, the roof structure 5 may be, e.g., a conventional residential composite shingle roof. However, it is to be understood that rail-based mounting system 2 may be utilized and mounted on any appropriate surface, including, e.g., flat, non-shingled rooftop surfaces, non-rooftop surfaces, etc. In the embodiment shown in FIG. 1B, each rail 10 is coupled to the roof structure 5 by way of a plurality of mounting brackets 650, which will be described in further detail below. Furthermore, a flashing 7 is provided below each mounting bracket 650 so as to substantially prevent water infiltration at the mounting site of mounting brackets 650. However, it is to be understood that other mounting bracket configurations and/or flashing-free mounting configurations may be utilized in conjunction with the rail-based mounting system 2 described herein. For instance, other roofing types such as tile, slate, shake, metal shingle, standing seam, corrugated metal, and other may require different mounting configurations including flashings of varying contours shapes and sizes or other waterproofing means other than flashing.

Figure 2B:
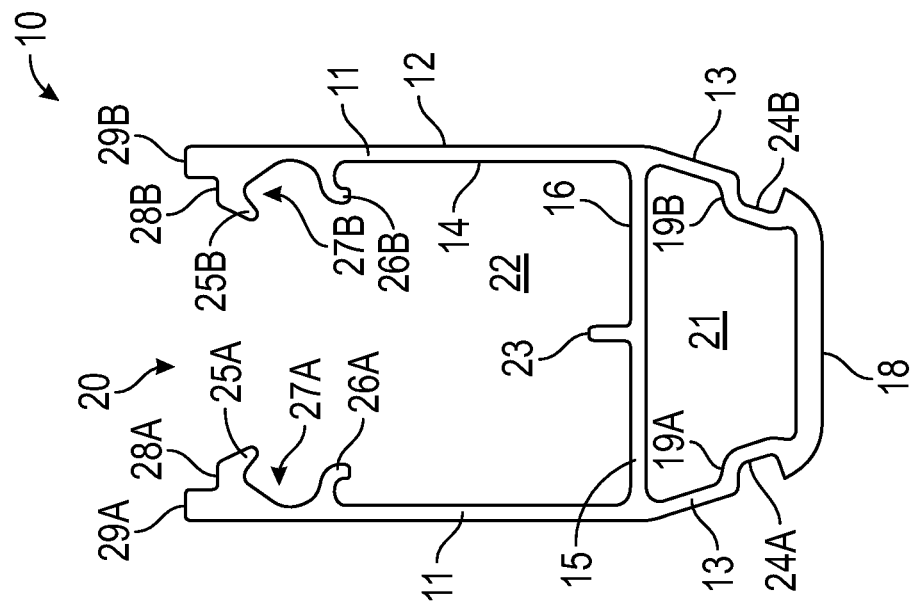
FIG. 2B is an end plan view of the rail of FIG. 2A.
Figure 2A:
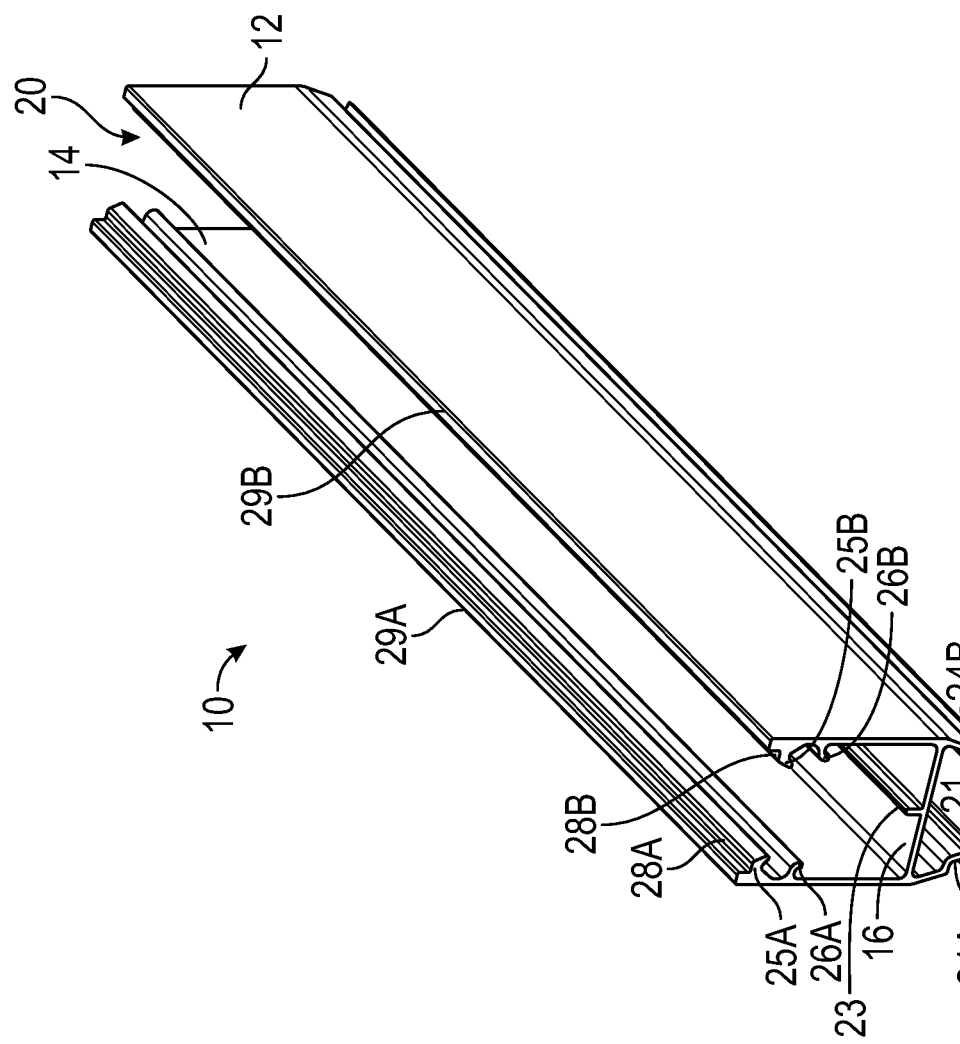
FIG. 2A is a top isometric view of a rail for use in a solar panel mounting system in accordance with an aspect of the present disclosure.

Referring to FIGS. 2A and 2B, a rail 10 in accordance with an aspect of the present disclosure is illustrated. Rail 10 is configured to secure one or more solar panels (not shown) to a support surface such as, e.g., a mounting bracket affixed to a rooftop. In certain embodiments, the rail 10 comprises an electrically conductive material that may be used to connect and electrically bond the components of the mounting system. For example, in one embodiment, the rail 10 may be formed of extruded aluminum. Furthermore, the rail 10 may have, e.g., a mill finish, an anodized finish, a painted finish, etc. However, it is to be understood that rail 10 may be formed of any appropriate electrically conductive metallic material such as, e.g., stainless steel, carbon steel, titanium, etc. Additionally and/or alternatively, the rail 10 may be formed by another appropriate manufacturing method such as, e.g., roll forming, forging, casting, milling, roll forming, stamping, etc. The length and/or overall dimensions of rail 10 may vary dependent upon the specific application of the rail-based mounting system.

Rail 10 includes a pair of opposing sidewalls 11, outer sidewall surfaces 12, inner sidewall surfaces 14, and a bottom surface 18. A top opening 20 is formed in the upper portion of the rail 10, thereby resulting in rail 10 being substantially U-shaped and having an open channel formed therein. As will be discussed in further detail below, such an open channel formation enables various clamp assemblies and other components of the mounting system to be retained within the rail 10.

An intermediate lateral wall 15 extends between the inner sidewall surfaces 14 of the sidewalls 11 and longitudinally along the length of the rail 10, thereby providing additional structural support to the respective sidewalls 11 of the rail 10, as well as providing an intermediate top surface 16 forming a bottom to the open channel formed by top opening 20 and the two sidewalls 11. As will be described below, the intermediate top surface 16 may also provide a support surface for one or more rail splices, which are configured to allow multiple rails to be linearly coupled together in an end-to-end fashion as needed during installation. Furthermore, a rib 23 may extend from the intermediate top surface 16, with the rib 23 also extending longitudinally along the length of rail 10. Rib 23 may provide structural support to the intermediate top surface 16.

Figure 2C:
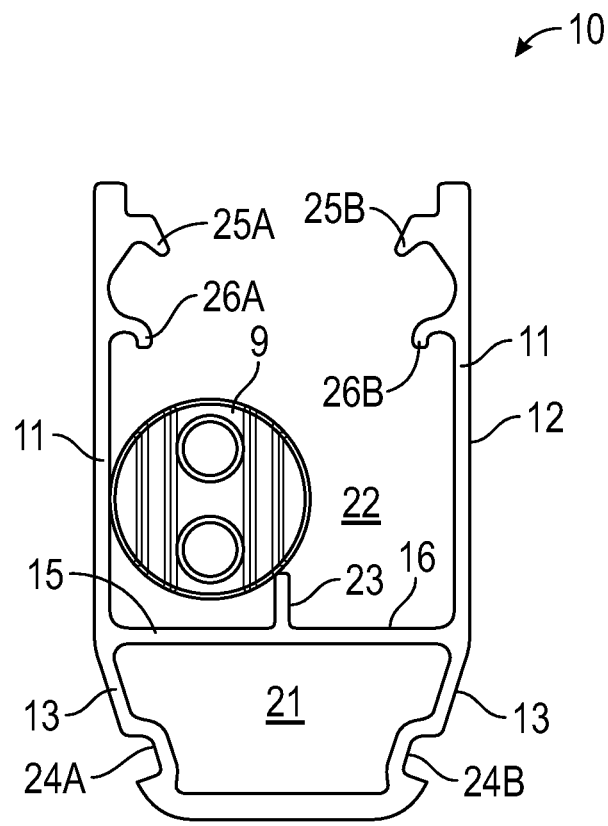
FIG. 2C is an end cross-sectional view of the rail of FIG. 2A having an electrical connector passing therethrough in accordance with an aspect of the present disclosure.

Additionally, with reference to FIG. 2C, in some embodiments, rib 23 is configured to provide an offset above the intermediate top surface 16 in order to prevent electrical connectors 9 from being located at or near the intermediate top surface 16. The second conduit 22 is open at its top, and rain that passes between or around modules can collect in the conduit 22. This water is then able to freely flow along the second conduit 22 and out the end of the rail 10. The rib 23 is configured to obstruct the electrical connectors 9 from sitting in the bottoms of the open channel conduit 22. In this way, the electrical connectors 9 are substantially prevented from being located in an area of the rail 10 through which water may collect and travel, thereby reducing the possibility of water-induced damage.

While rib 23 extends upwardly from intermediate surface 16 in FIGS. 2A and 2B, it is to be understood that rib 23 could extend downwardly from intermediate lateral wall 15. Furthermore, while only one rib 23 is shown, it is to be understood that a plurality of ribs 23 may be present. Additionally and/or alternatively, one or more ribs may extend from the inner sidewall surface 14.

Referring still to FIGS. 2A and 2B, a first conduit 21 is formed along the longitudinal length of rail 10, with first conduit 21 defined by the intermediate lateral wall 15, the bottom wall 18, and the tapered sidewall portions 13. The first conduit 21 may be sized and configured to allow electrical wires (not shown) associated with the solar panel installation to be fed therethrough. In this way, the first conduit 21 may both protect, conceal, and direct at least some of the electrical wires and connectors utilized in the solar panel installation.

Similarly, rail 10 may further include a second, trough-like conduit 22 formed by the sidewalls 11 and the intermediate lateral wall 15. Unlike first conduit 21, second conduit 22 is configured as an open channel due to top opening 20. Second conduit 22 may also be sized and configured to allow electrical wires associated with the solar panel installation to be fed therethrough. The opening 20 allows the wires to be placed into the conduit 22 from above at any point along the rail 10.

Proximate to the bottom surface 18, the tapered sidewall portions 13 of rail 10 further include a pair of opposing channels 24A, 24B. The channels 24A, 24B extend longitudinally along the rail 10 such that each channel 24A, 24B forms a concave recess formed substantially flush with the tapered sidewall portions 13 to provide a secure mounting track for receipt of corresponding surfaces of a rail attachment bracket, which clamp onto the channels 24A, 24B so as to secure the rail 10 to, e.g., an appropriate mounting bracket, as will be described further hereinbelow. As shown in FIGS. 2A and 2B, the channels 24A, 24B are located along angled surfaces of the tapered sidewall portions 13, wherein the tapered sidewall portions 13 angle inwardly from approximately the intermediate top surface 16 to the bottom surface 18. However, in other embodiments, it is to be understood that rail 10 could be configured such that there is no such inward (i.e., V-shaped) taper between the intermediate surface 16 to the bottom surface 18.

Rail 10 further includes a pair of upper top surfaces 29A and 29B. The upper top surfaces 29A, 29B serve as a support surface for solar panel frames and related accessories and components. Rail 10 further includes projections 25A, 25B positioned in proximity to respective upper top surfaces 29A, 29B. The projections 25A, 25B extend linearly along the length of rail 10 and are each partially inwardly and downwardly directed so as to form an angled interface within the rail 10. Furthermore, below projections 25A, 25B, a pair of substantially hook-shaped protrusions 26A, 26B extend inward from opposing sides of inner sidewall 14. As will be described in further detail below, the protrusions 26A, 26B are sized and configured so as to partially retain a portion of a rail splice used to couple two separate rails 10 during the installation process.

Between the projections 25A, 25B and the protrusions 26A, 26B, a pair of elongated recesses 27A, 27B are formed along the length of rail 10. As will be described further herein, these recesses 27A, 27B are configured to accommodate a nut portion of various clamp assemblies used to couple solar panels and/or related componentry to the rail 10. Above the projections 25A, 25B, a pair of respective top ledge surfaces 28A, 28B extend linearly along the length of rail 10. While the recesses 27A, 27B (and the angled projections 25A, 25B) may accommodate the nut portion of the clamp assemblies, the ledge surfaces 28A, 28B and/or upper top surfaces 29A, 29B of the rail 10 may provide a support surface for an upper portion of the clamp assemblies. In this way, when a clamp assembly is tightened, the upper grip portion (as will be described below) rests upon the ledge surfaces 28A, 28B and/or upper top surfaces 29A, 29B, while the nut portion of the clamp assembly is drawn upward within the recesses 27A, 27B toward the projections 25A, 25B, eventually securing the clamp assembly to the rail 10. Additionally, as will be described in further detail below, this configuration of the rail 10 also allows for the coupling of numerous other accessories and features aside from the clamp assembly, such as, e.g., a module-level power electronics (MLPE) mounting clamp, an accessory clamp, a grounding wire clamp, a grounding lug, etc.

Figure 3B:
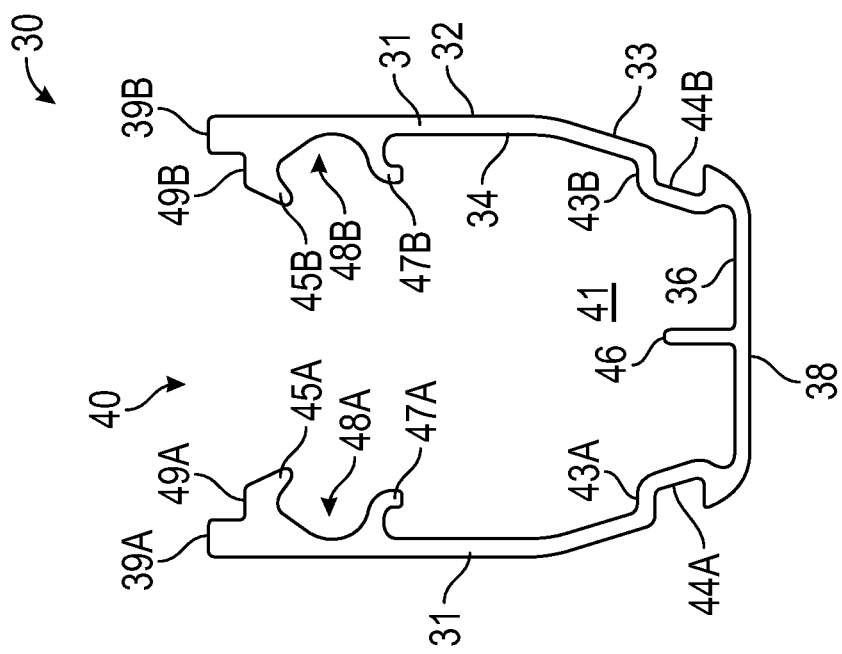
FIG. 3B is an end plan view of the rail of FIG. 3A.
Figure 3A:
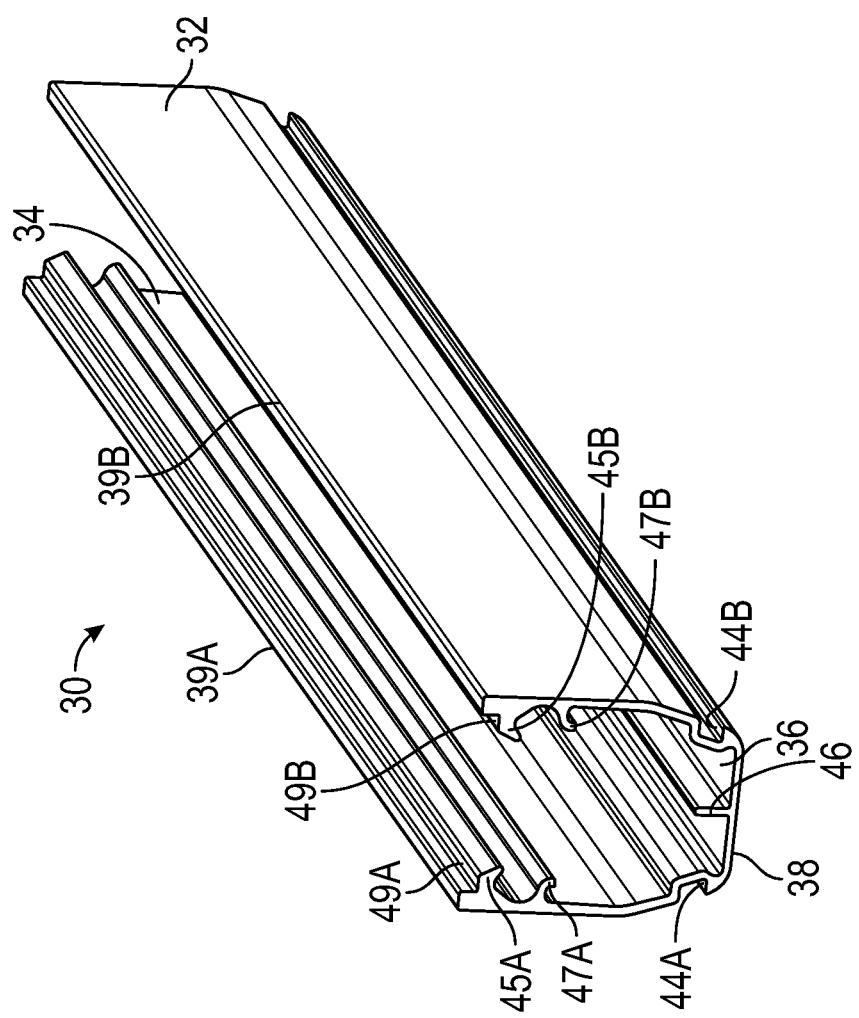
FIG. 3A is a top isometric view of a rail for use in a solar panel mounting system in accordance with another aspect of the present disclosure.

Next, referring to FIGS. 3A and 3B, a rail 30 in accordance with an alternative aspect of the present disclosure is shown. While substantially similar to rail 10 described above, rail 30 does not include a separate, enclosed conduit formed in a bottom portion thereof.

Like rail 10, in certain embodiments, rail 30 comprises an electrically conductive metallic material that may be used to connect and electrically bond the components of the mounting system. For example, in one embodiment, the rail 30 may be formed of extruded aluminum, and may have, e.g., a mill finish, an anodized finish, a painted finish, etc. However, it is to be understood that rail 30 may be formed of any appropriate material (e.g., stainless steel, carbon steel, titanium, etc., and/or may be formed by another appropriate manufacturing method (e.g., roll forming, forging, casting, milling, roll forming, stamping, etc.).

Rail 30 includes a pair of sidewalls 31 having outer sidewall surfaces 32 and inner sidewall surfaces 34, an lower top surface 36, and an exterior bottom surface 38. A top opening 40 is formed in the upper portion of the rail 30 such that rail 30 is substantially U-shaped and has an open channel formed therein. A rib 46 may extend upwardly from the lower top surface 36, with the rib 46 also extending longitudinally along the length of rail 30. Rib 46 may provide structural support to lower top surface 36. Additionally, as with rib 23 described above, rib 46 is configured to provide an offset above the lower top surface 36 in order to prevent electrical connectors from being located at or near the lower top surface 36. In this way, the electrical connectors are substantially prevented from contacting a surface of the rail 30 through which water may travel, thereby reducing the possibility of water-induced damage. Rib 46 divides the lower area of the trough-like conduit 41 into multiple conduits for the flow of fluid along the rail to exit the rail 30 at its ends.

As noted above, and unlike rail 10, rail 30 does not include a substantially enclosed conduit formed therein. However, rail 30 does include a trough-like conduit 41 configured such that one or more electrical wires may pass therein and therethrough without interference with, e.g., a rail splice coupling a pair of rails. For example, the rail 30 may include a pair of opposing shelf surfaces 43A, 43B above the lower top surface 36. These shelf surfaces 43A, 43B may provide a support surface for, e.g., a lower portion of a rail splice. As such, lower top surface 36 forms the conduit 41 to accommodate, e.g., one or more electrical wires in order to protect, conceal, and/or direct the electrical wires through the rail 30.

Proximate to the exterior bottom surface 38, rail 30 may further include a pair of opposing channels 44A, 44B formed within a tapered sidewall portions 33. The channels 44A, 44B extend longitudinally along the rail 30 and are configured to provide a secure mounting track for receipt of corresponding surfaces of a rail attachment bracket, which clamp onto the channels 44A, 44B so as to secure the rail 30 to, e.g., an appropriate mounting bracket, as will be described further hereinbelow. As shown in FIGS. 3A and 3B, the channels 44A, 44B are located along the tapered sidewall portion 33, which tapers inwardly toward the bottom surface 38. However, in other embodiments, it is to be understood that rail 30 could be configured such that there is no such inward (i.e., V-shaped) taper toward the bottom surface 38.

Next, rail 30 further includes a pair of projections 45A, 45B positioned in proximity to respective upper surfaces 39A, 39B. The projections 45A, 45B extend linearly along the length of rail 30 and are each partially inwardly and downwardly directed so as to form an angled interface within the rail 30. Furthermore, below projections 45A, 45B, a pair of hook-like protrusions 47A, 47B extend inward from opposing sides of inner sidewall 34. As will be described in further detail below, the protrusions 47A, 47B are sized and configured so as to partially retain a portion of a rail splice used to couple two separate rails 30 during the installation process.

Between the projections 45A, 45B and the protrusions 47A, 47B, a pair of elongated recesses 48A, 48B are formed along the length of rail 30. As will be described in further detail hereinbelow, the recesses 48A, 48B may be sized and configured to accommodate a nut portion of various clamp assemblies used to couple solar panels and/or related componentry to the rail 30.

Above the projections 45A, 45B, a pair of respective ledge surfaces 49A, 49B extend linearly along the length of rail 30. While the recesses 48A, 48B (and the angled projections 45A, 45B) may accommodate the nut portion of the clamp assemblies, the ledge surfaces 49A, 49B and/or upper surfaces 39A, 39B of the rail 30 may provide a support surface for an upper portion of the clamp assemblies. In this way, when a clamp assembly is tightened by way of, e.g., a bolt, the upper portion of the clamp assembly may be supported by the ledge top surfaces 49A, 49B and/or upper top surfaces 39A, 39B, while the nut portion is drawn upward within the recesses 48A, 48B toward the projections 45A, 45B, eventually securing the clamp assemblies, solar panels, and accessories to the rail 30.

Referring now to FIGS. 4A and 4B, a rail 50 in accordance with an alternative aspect of the present disclosure is illustrated. Like rails 10 and 30 described above, in certain embodiments, rail 50 comprises an electrically conductive metallic material that may be used to connect and electrically bond the components of the mounting system. For example, in one embodiment, the rail 50 may be formed of extruded aluminum, and may have, e.g., a mill finish, an anodized finish, a painted finish, etc. However, it is to be understood that rail 50 may be formed of any appropriate material (e.g., stainless steel, carbon steel, titanium, etc., and/or may be formed by another appropriate manufacturing method (e.g., forging, casting, milling, roll forming, stamping, etc.).

Rail 50 includes a pair of sidewalls 51 and tapered sidewall portions 53 having outer sidewall surfaces 52 and inner sidewall surfaces 54, and a bottom surface 58. A top opening 60 is formed in the upper portion of the rail 50, thereby resulting in rail 50 being substantially U-shaped and having an open channel formed therein. As will be discussed in further detail below, such an open channel formation enables various clamp assemblies and other components of the mounting system to be retained within the rail 50.

An intermediate lateral wall 56 extends along the length of the rail 50, thereby providing additional structural support to the respective sidewalls 51 of the rail 50, as well as providing a lower surface to the open channel formed by top opening 20. As will be described below, the intermediate lateral wall 56 may also provide a support surface for one or more rail splices, which are configured to allow multiple rails to be linearly coupled together as needed during installation. Furthermore, a pair of ribs 63A, 63B are configured to extend from the intermediate lateral wall 56, with the ribs 63A, 63B also extending longitudinally along the length of rail 50. The ribs 63A, 63B may provide structural support to the intermediate lateral wall 56.

While ribs 63A, 63B extends upwardly from intermediate lateral wall 56 in FIGS. 4A and 4B, it is to be understood that ribs 63A, 63B could extend downwardly from intermediate lateral wall 56. Furthermore, it is to be understood that intermediate lateral wall 56 could incorporate more than two ribs. Additionally, as with ribs 23 and 46 described above, ribs 63A, 63B are configured to provide an offset above the intermediate lateral wall 56 in order to prevent electrical connectors from being located at or near the intermediate lateral wall 56. In this way, the electrical connectors are substantially prevented from contacting a surface of the rail 50 through which water may travel, thereby reducing the possibility of water-induced damage.

Referring still to FIGS. 4A and 4B, a first conduit 61 is formed along the length of rail 50, with first conduit 61 defined by the intermediate lateral wall 56, the bottom surface 58, and tapered sidewall portion 53. First conduit 61 may be sized and configured to allow electrical wires (not shown) associated with the solar panel installation to be fed therethrough. In this way, first conduit 61 may both protect, conceal, and direct at least some of the electrical wires utilized in the solar panel installation.

Similarly, rail 50 may further include a second, trough-like conduit 62 formed by the sidewalls 51 and the intermediate lateral wall 56. Unlike first conduit 61, second conduit 62 is configured as an open channel due to top opening 60. However, second conduit 62 may also be sized and configured to allow electrical wires associated with the solar panel installation to be fed therethrough.

Rail 50 further includes a pair of projections 65A, 65B positioned in proximity to respective upper surfaces 69A, 69B. The projections 65A, 65B extend linearly along the length of rail 50 and are each partially inwardly and downwardly directed so as to form an angled interface within the rail 50. Furthermore, below projections 65A, 65B, a pair of hook-like protrusions 66A, 66B extend inward from opposing sides of inner sidewall 54. As will be described in further detail below, the protrusions 66A, 66B are sized and configured so as to partially retain a portion of a rail splice used to couple two separate rails 50 during the installation process.

In proximity to the bottom surface 58, the tapered sidewall portions 53 of rail 50 further include a pair of opposing channels 64A, 64B formed therein. As will be described in further detail below, a rail attachment bracket is configured to clamp onto the channels 64A, 64B so as to secure the rail 50 to, e.g., an appropriate mounting bracket. As shown in FIGS. 4A and 4B, the channels 64A, 64B are located along the tapered sidewall portions 53, which taper inwardly toward the bottom surface 58. However, in other embodiments, it is to be understood that rail 50 could be configured such that there is no such inward (i.e., V-shaped) taper toward the bottom surface 58.

The channels 64A, 64B, similar to channels 24A, 24B and 44A, 44B, extend longitudinally along the rail 50 such that each channel 64A, 64B, forms a concave recess formed substantially flush with the tapered sidewall portions' 53 outer surface 52 to provide a secure mounting track for receipt of corresponding surfaces of a rail attachment bracket. The concave recess 64A, 64B in the outer sidewall surfaces 52 are accommodated by the formation of a convex protrusion of the inner sidewall surfaces 54 into the conduits 62. It is to be understood that the channels 24A, 24B of rail 10 and channels 44A, 44B of rail 30 described above are configured in a substantially similar fashion.

Between the projections 65A, 65B and the protrusions 66A, 66B, a pair of elongated recesses 67A, 67B are formed along the length of rail 50. As will be described further herein, these recesses 67A, 67B are configured to accommodate a nut portion of various clamp assemblies used to couple solar panels and/or related componentry to the rail 50. Above the projections 65A, 65B, a pair of respective ledge top surfaces 68A, 68B extend linearly along the length of rail 50. While the recesses 67A, 67B (and the angled projections 65A, 65B) may accommodate the nut portion of the clamp assemblies, the ledge top surfaces 68A, 68B and/or upper surfaces 69A, 69B of the rail 50 may provide a support surface for an upper portion of the clamp assemblies. In this way, when a clamp assembly is tightened, the upper grip portion rests upon the ledge surfaces 68A, 68B and/or upper surfaces 69A, 69B, while the nut portion is drawn upward within the recesses 67A, 67B toward the projections 65A, 65B, eventually securing the clamp assembly, solar panels, and/or accessories to the rail 50.

As noted above, adjacent rails may be spliced together to create an elongated rail from multiple rails. Such rail splicing may be provided via rail splice members configured to be secured relative to a plurality of rails. Referring to FIGS. 5A-9B, various embodiments of rail splice members in accordance with aspects of the present disclosure are shown.

Figure 5B:
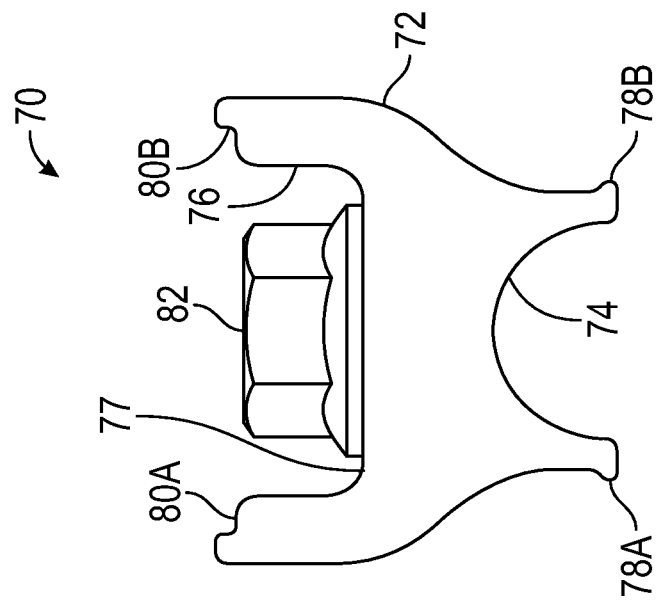
FIG. 5B is an end plan view of the rail splice of FIG. 5A.
Figure 5A:
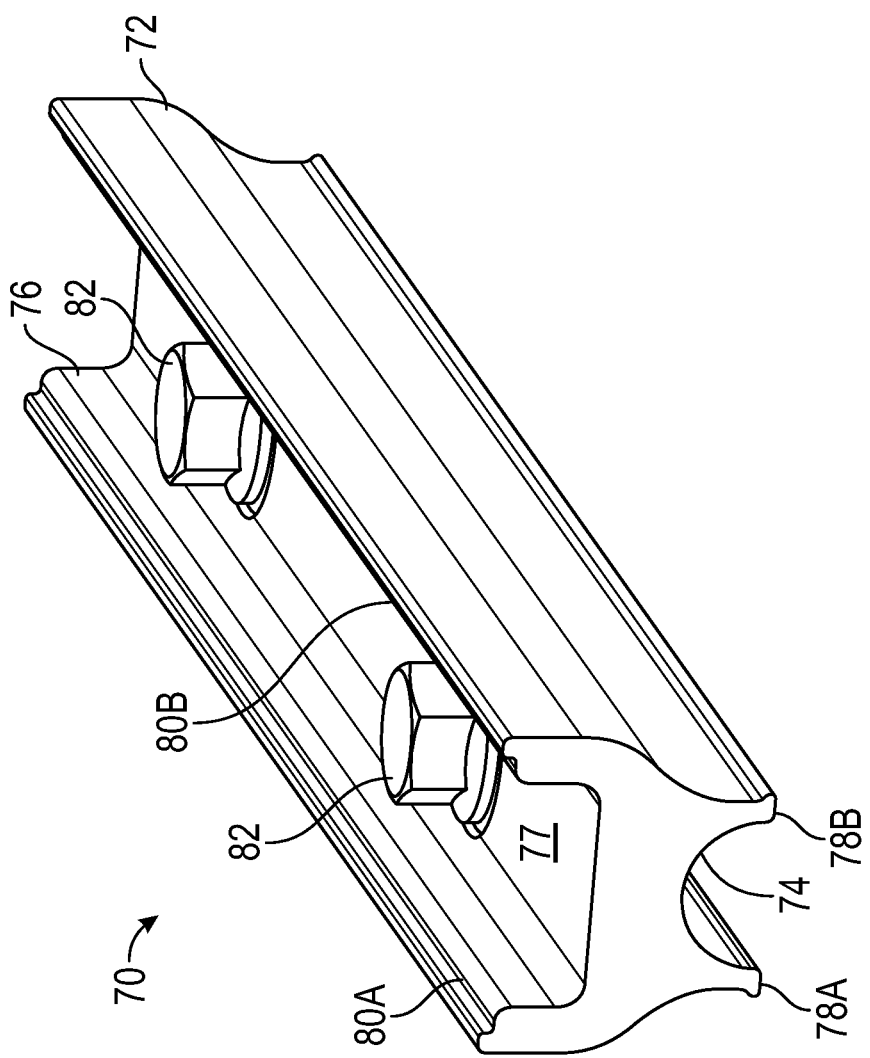
FIG. 5A is a top isometric view of a rail splice for use in a solar panel mounting system in accordance with an aspect of the present disclosure.

Specifically, referring to FIGS. 5A and 5B, a rail splice 70 in accordance with an aspect of the present disclosure is illustrated. Rail splice 70 may be sized and configured to fit within an interior space of adjacent, end-to-end rails for improved securement and strength. Accordingly, the overall dimensions and exterior contours and profile of rail splice 70 may be specific to the internal dimensions, contours, and profile of an associated rail design. Rail splice 70 may be formed of any appropriate electrically conductive material such as, e.g., aluminum, with such material having sufficient structural support to secure multiple rails relative to one another. Additionally, the rail splice 70 may be formed by another appropriate manufacturing method (e.g., extruding, forging, casting, milling, roll forming, stamping, etc.).

Rail splice 70 includes external sidewalls 72, a concave bottom surface 74, internal sidewalls 76, and an inset top surface 77. The external sidewalls 72 may be curved so as to accommodate specific interior rail profiles, etc. The concave bottom surface 74 is configured to extend linearly along the length of rail splice 70, accommodating the one or more ribs extending from a surface of the rail(s). Furthermore, concave bottom surface 74 enables water to flow below rail splice 70 (and the rail or rails to which rail splice 70 is attached), thereby preventing water from becoming trapped within the rail or rails.

The bottom portion of external sidewalls 72 terminates in a pair of opposing bottom feet 78A, 78B, with the bottom feet 78A, 78B extending linearly along the length of rail splice 70. The bottom feet 78A, 78B may be spaced and sized so as to provide a support surface along an interior surface of the rail(s) such as, e.g., intermediate surface 16 shown and described with respect to FIGS. 2A and 2B, shelf surfaces 43A, 43B shown and described with respect to FIGS. 3A, 3B, etc. Furthermore, a top portion of rail splice 70 includes opposing ridge portions 80A, 80B. Ridge portions 80A, 80B may have a curved and/or stepped interface such that the ridge portions 80A, 80B may slide or otherwise interact with an interior surface of the rail(s). For example, in one embodiment, ridge portions 80A, 80B may be configured to slide into the space formed below hook-like protrusions 26A, 26B of rail 10, thereby at least partially securing the rail splice 70 to the rail 10.

Referring still to FIGS. 5A and 5B, the rail splice 70 may further include a pair of fixing bolts 82 extending through a pair of openings (not shown) formed through the inset top surface 77 and the concave bottom surface 74. The fixing bolts 82 may act as, e.g., set screws to secure the rail splice 70 to surfaces of adjoining rails such as, e.g., a top surface of one or more ribs of the rails. Additionally, the fixing bolts 82 may provide electrical bonding between adjacent rail sections. In this way, once positioned at the end portions of adjacent rails, the fixing bolts 82 may be tightened so as to both secure the rail splice 70 relative to each of the rails and to secure the adjacent rails relative to one another forming an electrical bond between the splice and each rail section and thereby forming an electrical bond between the two rail sections. As is shown in FIG. 5B, when tightened, the top portion of fixing bolts 82 does not extend above the ridge portions 80A, 80B. As such, the fixing bolts 82 do not interfere with any clamp(s), wires, wire connectors, or other components within the adjoining rails. Furthermore, when fixing bolts 82 are fully tightened/secured, they are configured to extend into a recessed counterbore formed in the inset top surface 77, thereby allowing for more uninterrupted space above inset top surface 77 for the passage of electrical wires, etc., along the rail. While a pair of fixing bolts 82 are shown in FIGS. 5A and 5B, it is to be understood that rail splice 70 may utilize more or fewer fixing bolts in accordance with other aspects of the present disclosure.

Additionally, while not shown in FIGS. 5A and 5B, when the fixing bolts 82 are tightened such that they come into contact with the rib(s) extending from the rail(s), the fixing bolts 82 may cause a deformation in the rib(s) due to the compressive force applied to the top of the rib(s). However, when fixing bolts 82 are loosened and withdrawn, and no longer contact the rib(s), such a deformation of the rib(s) does not prevent movement and/or removal of the rail splice 70 relative to the rail(s), as the concave bottom surface 74 is sized with adequate open area within the concavity so as to accommodate such deformation without interference between the rail splice 70 and the rail(s) during removal and/or subsequent installation. The threaded hole, counterbore, extension of bolt 82 into the concavity 74, and the interference with the rib(s) of splice 70 are not shown in FIGS. 5A and 5B. However, these elements are substantially similar to those of splice 130 as shown and described with respect to FIGS. 8A-8C below.

Figure 6B:
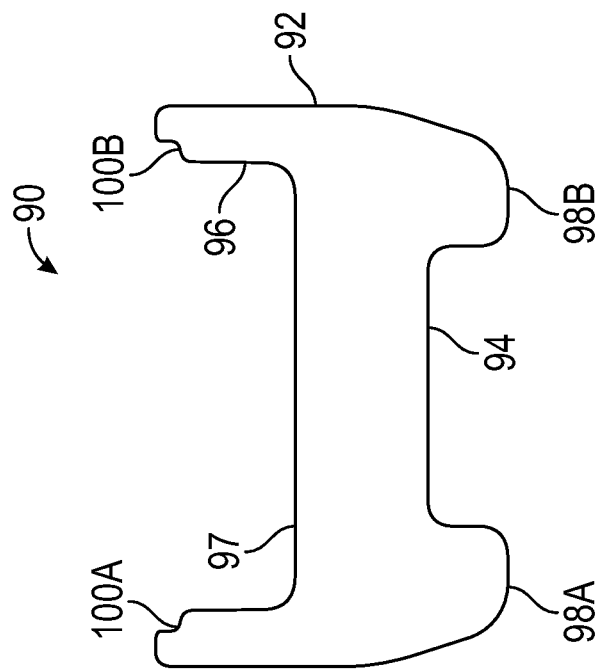
FIG. 6B is an end plan view of the rail splice of FIG. 6A.
Figure 6A:
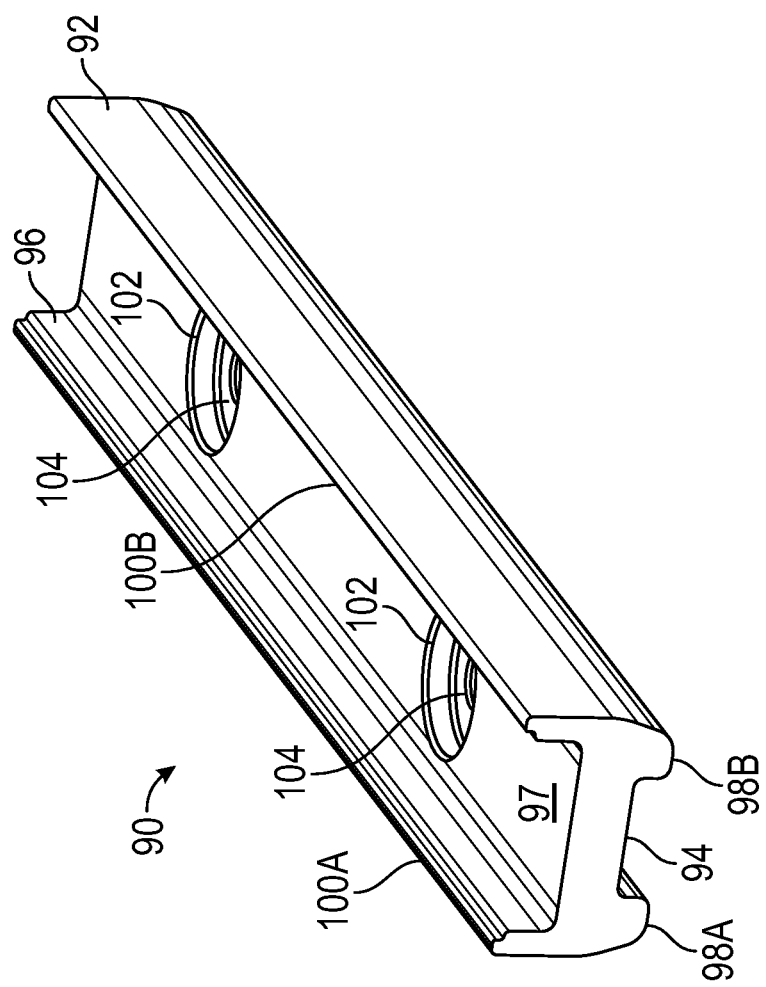
FIG. 6A is a top isometric view of a rail splice for use in a solar panel mounting system in accordance with another aspect of the present disclosure.
Figure 6C:
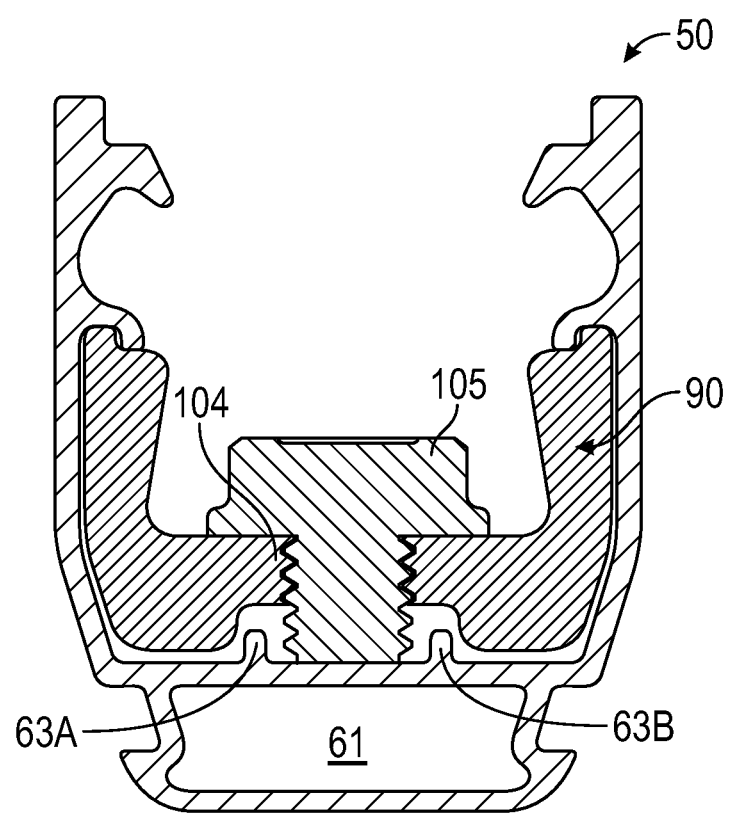
FIG. 6C is an end cross-sectional view of the rail splice of FIG. 6A positioned within a rail in accordance with an aspect of the present disclosure.

Next, with reference to FIGS. 6A and 6B, a rail splice 90 in accordance with another aspect of the present disclosure is illustrated. Like rail splice 70 described above, the overall dimensions contours, and profile of rail splice 90 may be specific to the internal dimensions, contours, and profile of an associated rail design. Rail splice 90 may be formed of any appropriate electrically conductive material such as, e.g., aluminum, and may be formed by another appropriate manufacturing method (e.g., extruding, forging, casting, milling, roll forming, stamping, etc.).

Rail splice 90 includes external sidewalls 92, an inset bottom surface 94, internal sidewalls 96, and an inset top surface 97. The external sidewalls 92 may include a curvature so as to accommodate specific interior rail profiles, etc. The inset bottom surface 94 is configured to extend linearly along the length of rail splice 90, accommodating the one or more ribs extending from a surface of the rail(s), and also allowing for the passage of water therethrough.

The bottom portion of external sidewalls 92 terminates in a pair of opposing bottom support surfaces 98A, 98B, with the bottom support surfaces 98A, 98B extending linearly along the length of rail splice 90. The bottom support surfaces 98A, 98B may be spaced and sized so as to provide a support surface along an interior surface of the rail(s) such as, e.g., intermediate surface 16 shown and described with respect to FIGS. 2A and 2B, shelf surfaces 43A, 43B shown and described with respect to FIGS. 3A, 3B, etc.

Furthermore, a top portion of rail splice 90 includes opposing ridge portions 100A, 100B. Ridge portions 100A, 100B may have a curved and/or stepped interface such that the ridge portions 100A, 100B may slide or otherwise interact with an interior surface of the rail(s). For example, in one embodiment, ridge portions 100A, 100B may be configured to slide into the space formed below hook-like protrusions 26A, 26B of one or more rail(s) 10, thereby at least partially securing the rail splice 90 to adjacent rail(s) 10.

Referring still to FIGS. 6A and 6B, the rail splice 90 may further include a pair of threaded through-holes 104 extending between the inset top surface 97 and the inset bottom surface 94. Surrounding each of the through-holes 104, a recessed counterbore 102 may be formed in the inset top surface 97, with the recessed counterbore 102 sized to accommodate at least a portion of a head of a fixing bolt (not shown). As described above with respect to FIGS. 5A and 5B, and referring further to FIG. 6C, the rail splice 90 may include fixing bolts 105 configured to act as, e.g., set screws to secure the rail splice 90 to surfaces of adjoining rails (e.g., rail(s) 50) such as, e.g., a top surface of one or more ribs of the rails, between the ribs 63A, 63B, etc. In this way, once positioned within the end portions of adjacent rails, the fixing bolts 105 may be tightened so as to both secure and electrically bond the rail splice 90 relative to each of the rails 50 and to secure and electrically bond the adjacent rails relative to one another.

Figure 7B:
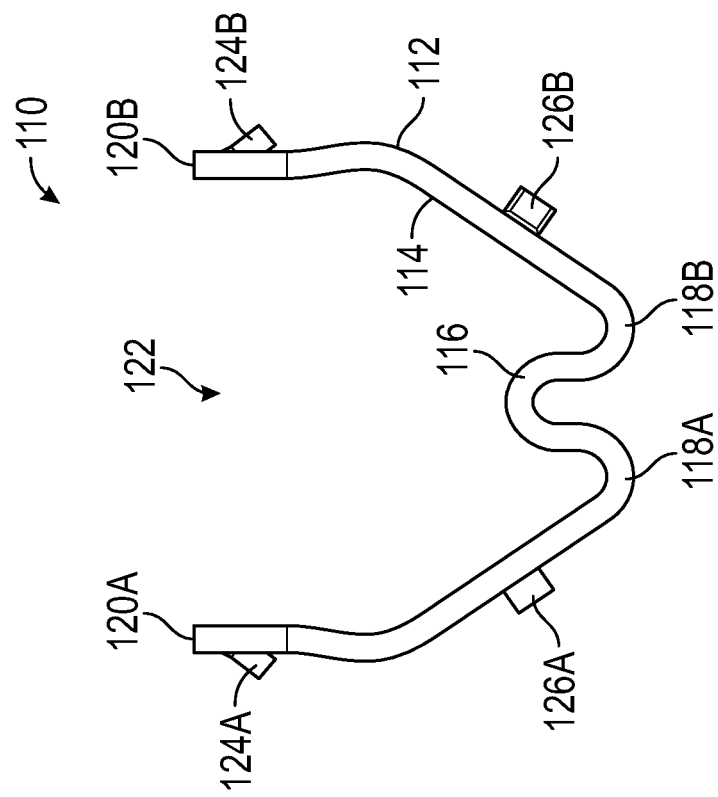
FIG. 7B is an end plan view of the rail splice of FIG. 7A.
Figure 7A:
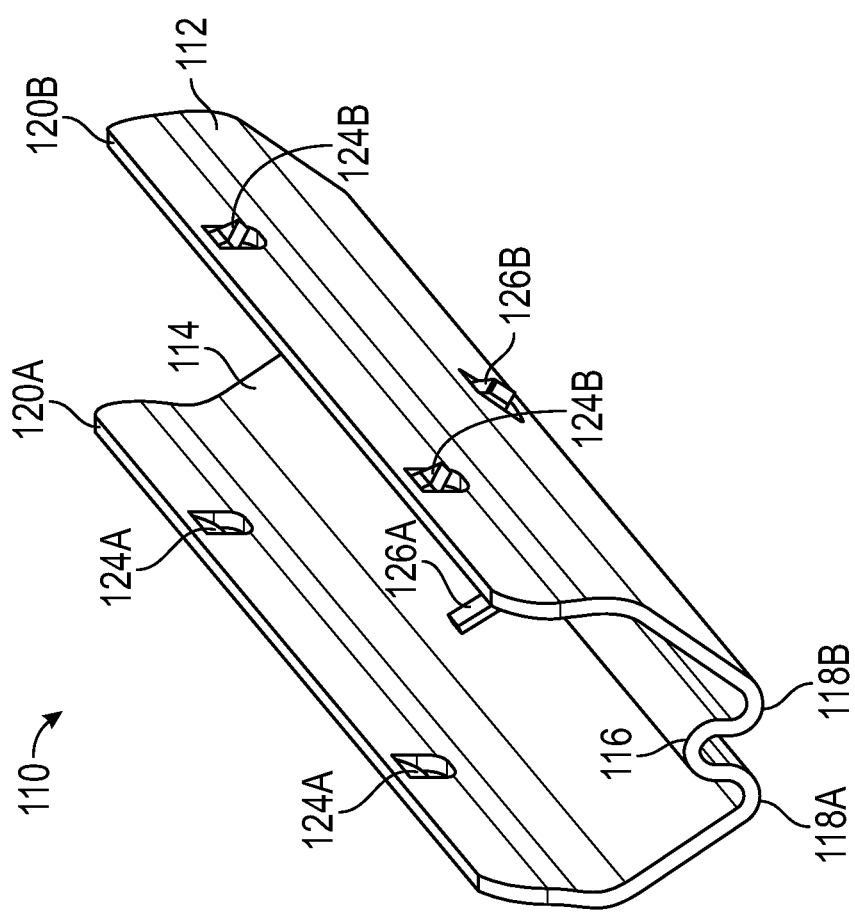
FIG. 7A is a top isometric view of a rail splice for use in a solar panel mounting system in accordance with another aspect of the present disclosure.

Next, referring to FIGS. 7A and 7B, a rail splice 110 in accordance with an alternative aspect of the present disclosure is illustrated. Like rail splices 70 and 90 described above, the overall dimensions, contours, and profile of rail splice 110 may be specific to the internal dimensions, contours, and profile of an associated rail design. Furthermore, rail splice 110 may be formed of any appropriate electrically conductive material such as, e.g., aluminum. However, while rail splices 70, 90 described above may be formed by, e.g., extruding, forging, casting, milling, roll forming, stamping, etc., rail splice 110 is configured such that it may be stamped or otherwise formed from a flat stock material such as, e.g., steel. In this way, rail splice 110 may be relatively low cost and easily configurable for various rail types.

Rail splice 110 includes external sidewall surfaces 112, internal sidewall surfaces 114, and a curved bottom portion 116. The external sidewall surfaces 112 may be include a curvature and/or angle so as to accommodate specific interior rail profiles, etc. The curved bottom portion 116 is configured to extend linearly along the length of rail splice 110, accommodating the one or more ribs extending from a surface of the rail(s).

The internal sidewall surfaces 114 and curved bottom portion 116 define an open portion 122 of the rail splice 110. The open portion 122 may be sized and configured so as to accommodate the passage of water through and between adjoining rails.

The bottom portion of external sidewalls 112 terminates in a pair of opposing bottom support surfaces 118A, 118B, which are positioned on either side of the curved bottom portion 116. The bottom support surfaces 118A, 118B extend linearly along the length of rail splice 110, and may be spaced and sized so as to provide a support surface along an interior surface of the rail(s) such as, e.g., intermediate top surface 16 shown and described with respect to FIGS. 2A and 2B.

Furthermore, a top portion of rail splice 110 includes opposing ridge portions 120A, 120B. Ridge portions 120A, 120B may slide or otherwise interact with an interior surface of the rail(s). For example, in one embodiment, ridge portions 120A, 120B may be configured to slide into the space formed below hook-like protrusions 26A, 26B of rail 10, thereby at least partially securing the rail splice 110 to the rail 10.

Referring still to FIGS. 7A and 7B, the rail splice 110 may further include a plurality of tabs projecting from the external sidewall 112. For example, a plurality of upper tabs 124A, 124B may extend from an upper portion of rail splice 110, while lower tabs 126A, 126B may extend from a lower portion thereof. The tabs 124A, 124B, may be punched or otherwise formed through material of the rail splice 110 and may include one or more pointed or sharp surfaces. In this way, once positioned at the end portions of adjacent rails, the tabs 124A, 124B may engage (e.g., partially penetrate) at least an inner surface coating of the inner surfaces of the respective rails so as to both secure the rail splice 110 relative to each of the rails and to secure the adjacent rails relative to one another, as well as to create an electrical bond between adjacent rails. Furthermore, the lower tabs 126A, 126B are configured and positioned such that they center the rail splice 110 when installed between two rails, and they may provide tactile feedback to the installer such that only one half of the rail splice 110 is inserted into an end of each respective rail. The lower tabs 126A, 126B extend perpendicularly away from the outer wall 112 surface and act as a stop to prevent the splice continuing farther into the rail.

Accordingly, unlike rail splices 70 and 90 described above, rail splice 110 does not include (or necessitate) threaded through-holes and/or fixing bolts for securement or bonding. The overall shape of open portion 122, combined with the material chosen for the rail splice 110, allows for the rail splice 110 to have some amount of "spring" action. Thus, the open portion 122 can be slightly opened and/or closed with minimal force to allow the rail splice 110 to slide into each rail in such a manner that the installer has confidence that the rail splice 110 is properly secured and engaged within the rail(s).

Figure 8B:
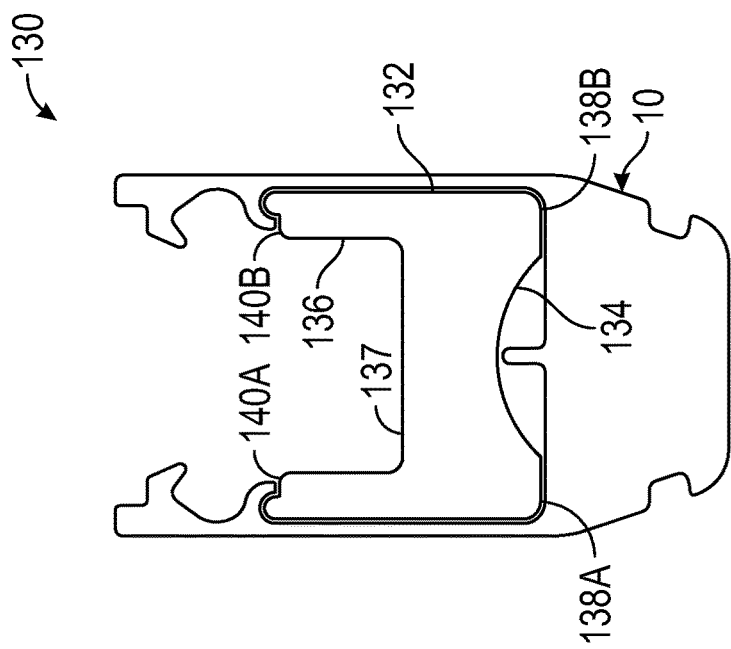
FIG. 8B is an end plan view of the rail splice of FIG. 8A.
Figure 8A:
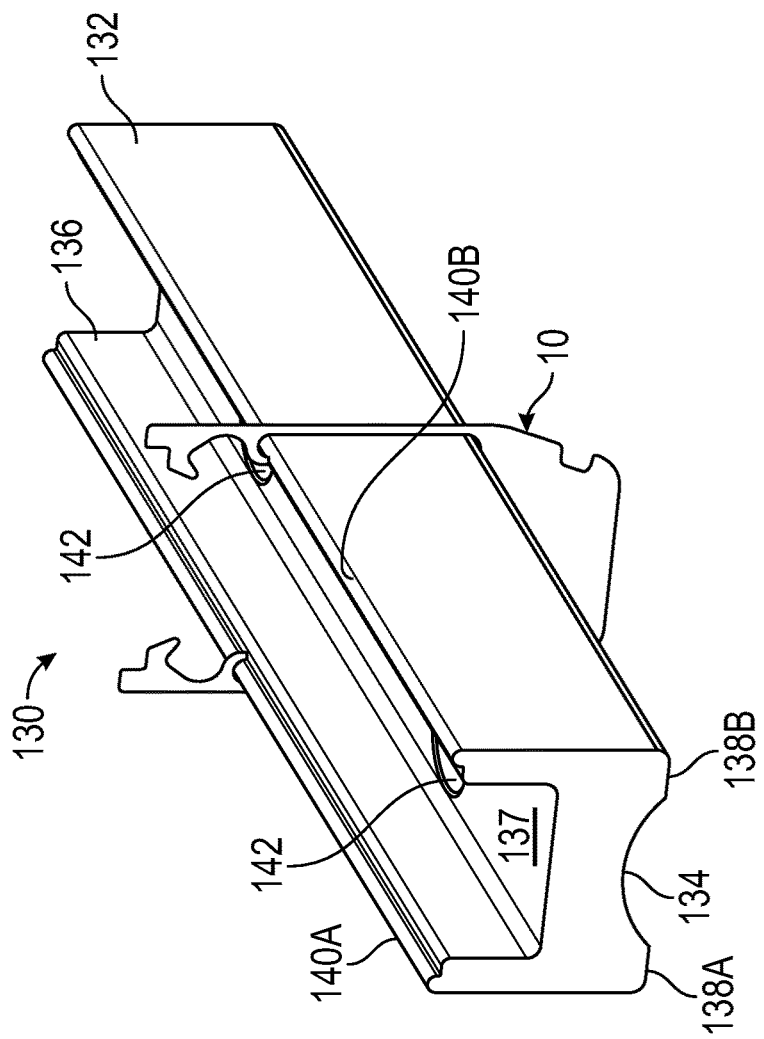
FIG. 8A is a top isometric view of a rail splice for use in a solar panel mounting system in accordance with another aspect of the present disclosure.
Figure 8C:
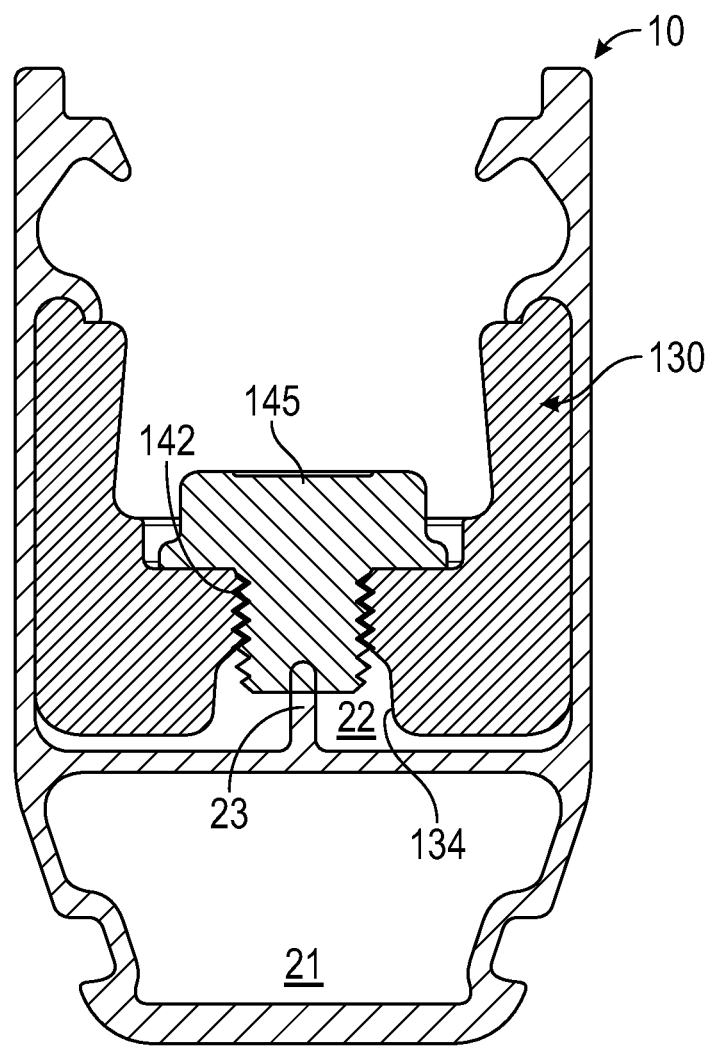
FIG. 8C is an end cross-sectional view of the rail splice of FIG. 8A positioned within a rail in accordance with an aspect of the present disclosure.

Next, referring to FIGS. 8A-8C, a rail splice 130 in accordance with another alternative aspect of the present disclosure is illustrated. Rail splice 130 may be sized and configured to fit within an end portion of a particular rail (e.g., rail 10) for improved securement and strength. Accordingly, the overall dimensions, contours, and profile of rail splice 130 may be specific to the internal dimensions contours, and profile of an associated rail design. Rail splice 130 may be formed of any appropriate electrically conductive material such as, e.g., aluminum, with such material having sufficient structural support to secure multiple rails to one another. Additionally, the rail splice 130 may be formed by another appropriate manufacturing method (e.g., extruding, forging, casting, milling, roll forming, stamping, etc.).

Rail splice 130 includes external sidewalls 132, a concave bottom surface 134, internal sidewalls 136, and an inset top surface 137. The external sidewalls 132 are substantially straight and perpendicular to the inset top surface 137, which enables rail splice 130 to fit snuggly within a rail having correspondingly flat and perpendicular wall surfaces such as, e.g., rail 10 shown and described above with respect to FIGS. 2A and 2B.

The concave bottom surface 134 is configured to extend linearly along the length of rail splice 130, accommodating the one or more ribs extending from a surface of the rail(s) and/or allowing water to flow therebelow, as is shown in FIG. 8C.

The bottom portion of external sidewalls 132 terminates in a pair of opposing bottom surface portions 138A, 138B, with the bottom surface portions 138A, 138B extending linearly along the length of rail splice 130. The bottom surface portions 138A, 138B may be spaced and sized so as to provide a support surface along an interior surface of the rail(s) such as, e.g., intermediate surface 16 shown and described with respect to FIGS. 2A and 2B.

Furthermore, a top portion of rail splice 130 includes opposing ridge portions 140A, 140B. Ridge portions 140A, 140B may have a curved and/or stepped interface such that the ridge portions 140A, 140B may slide or otherwise interact with an interior surface of the rail(s). For example, in one embodiment, ridge portions 140A, 140B may be configured to slide into the space formed below hook-like protrusions 26A, 26B of rail 10, thereby at least partially securing the rail splice 130 to the rail 10.

Referring still to FIGS. 8A-8C, the rail splice 130 may further include a pair of threaded through-holes 142 extending through the inset top surface 137 and the concave bottom surface 134. As described above, the threaded through-holes 142 are configured to accept fixing bolts 145, which may act as, e.g., set screws to secure the rail splice 130 to surfaces of adjoining rails such as, e.g., a top surface of one or more ribs 23 of the rail(s) 10, as is shown in FIG. 8C. In this way, once positioned at the end portions of adjacent rails, the fixing bolts 145 may be tightened so as to both secure the rail splice 130 to each of the rails 10 and to secure the adjacent rails 10 to one another. Additionally, the fixing bolts 145 may act to electrically bond the adjacent rails to one another, and the through-holes 142 may include a recessed portion which houses the heads of the fixing bolts, thereby allowing the heads of the fixing bolts to be flush (or near flush) with the inset top surface 137 to accommodate electrical wiring, etc., running through the rail and over the rail splice 130. When tightened, the fixing bolts 145 may partially deform the rib 23, thereby increasing the bond between each fixing bolt 145 and the rail 10.

Additionally, as shown in FIGS. 8A-8C, when the fixing bolts 145 are tightened such that they come into contact with the rib(s) extending from the rail(s), the fixing bolts 145 may cause a deformation in the rib(s) due to the compressive force applied to the top of the rib(s). However, when fixing bolts 145 are loosened and withdrawn, and no longer contact the rib(s), such a deformation of the rib(s) does not prevent movement and/or removal of the rail splice 130 relative to the rail(s), as the bottom surface concavity 134 is sized with adequate open area within the concavity 134 so as to accommodate such deformation without interference between the rail splice 130 and the rail(s) during removal and/or subsequent installation.

Figure 9B:
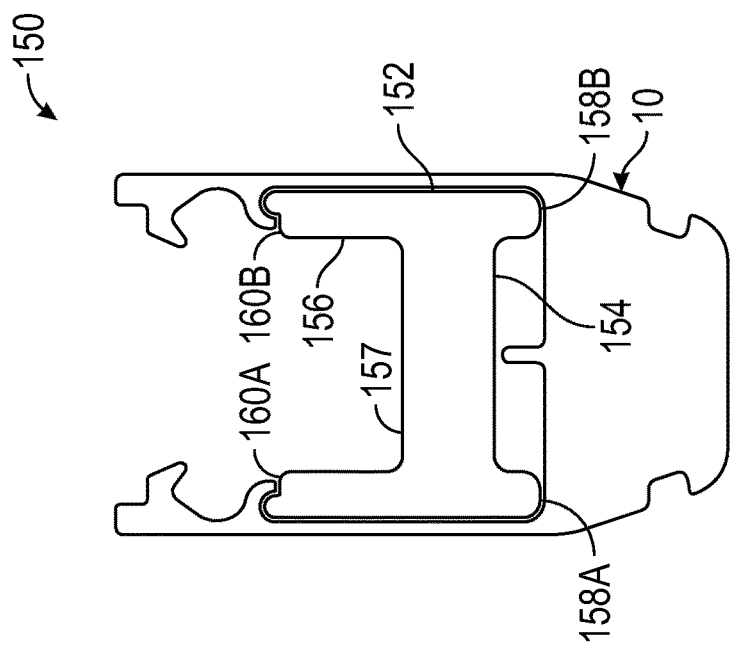
FIG. 9B is an end plan view of the rail splice of FIG. 9A.
Figure 9A:
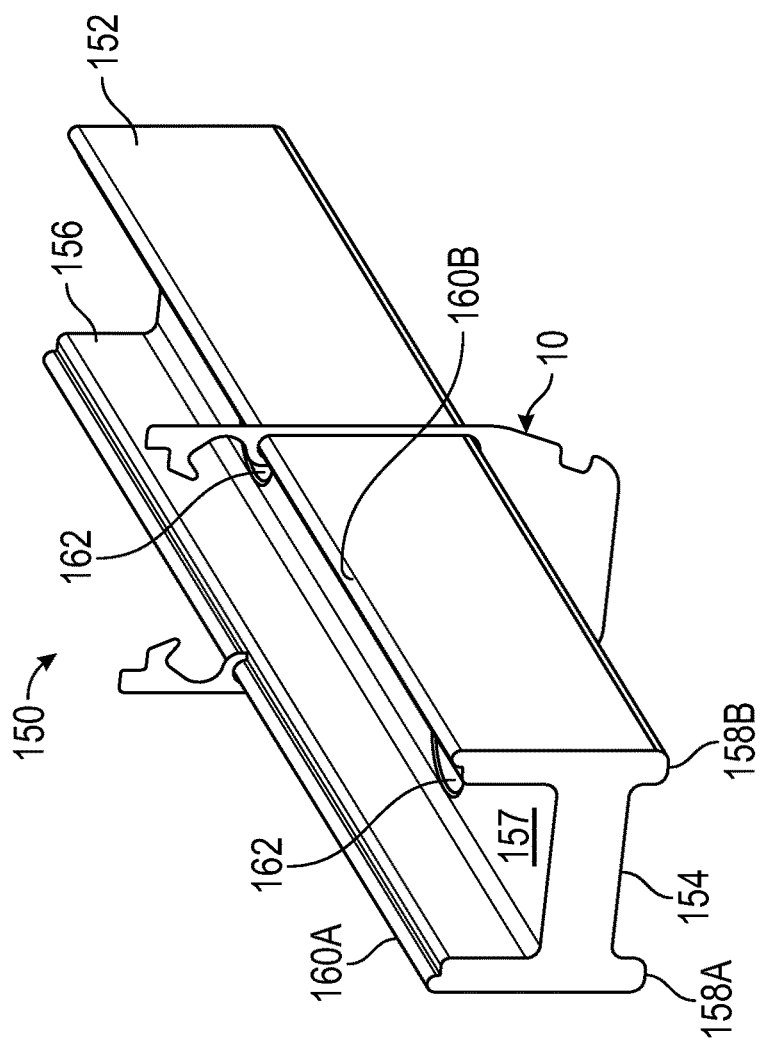
FIG. 9A is a top isometric view of a rail splice for use in a solar panel mounting system in accordance with another aspect of the present disclosure.
Figure 11A:
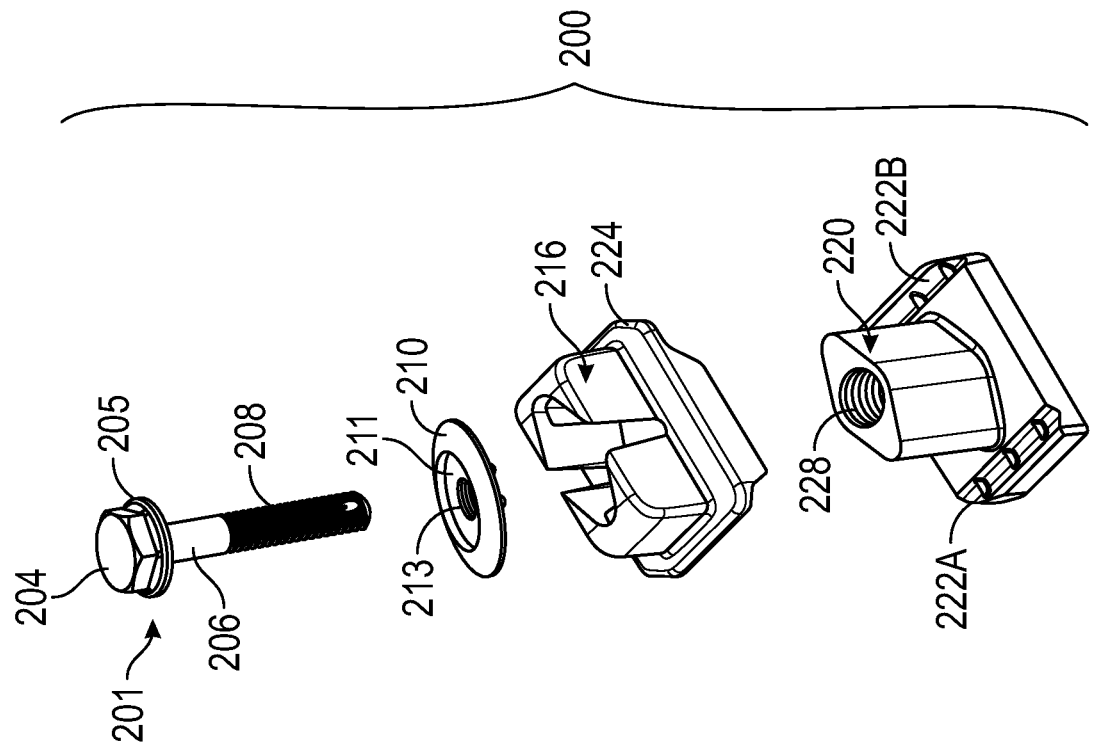
FIG. 11A is an exploded view of the mid-clamp assembly of FIGS. 10A-10C.

Referring now to FIGS. 9A and 9B, a rail splice 150 in accordance with another alternative aspect of the present disclosure is illustrated. Rail splice 150 may be sized and configured to fit within an end portion of a particular rail (e.g., rail 10) for improved securement and strength. Accordingly, the overall dimensions, contours, and profile of rail splice 150 may be specific to the internal dimensions, contours, and profile of an associated rail design. Rail splice 150 may be formed of any appropriate electrically conductive material such as, e.g., aluminum, with such material having sufficient structural support to secure multiple rails relative to one another. Additionally, the rail splice 150 may be formed by another appropriate manufacturing method (e.g., extruding, forging, casting, milling, roll forming, stamping, etc.).

Rail splice 150 includes external sidewalls 152, an inset bottom surface 154, internal sidewalls 156, and an inset top surface 157. The external sidewalls 152 are substantially straight and perpendicular to the inset top surface 157 and inset bottom surface 154, which enables rail splice 150 to fit snuggly within a rail having correspondingly flat and perpendicular wall surfaces such as, e.g., rail 10 shown and described above with respect to FIGS. 2A and 2B.

The inset bottom surface 154 is configured to extend linearly along the length of rail splice 150, accommodating the one or more ribs extending from a surface of the rail(s) and/or allowing water to pass therebelow.

The bottom portion of external sidewalls 152 terminates in a pair of opposing bottom surface portions 158A, 158B, with the bottom surface portions 158A, 158B extending linearly along the length of rail splice 150. The bottom surface portions 158A, 158B may be spaced and sized so as to provide a support surface along an interior surface of the rail(s) such as, e.g., intermediate surface 16 shown and described with respect to FIGS. 2A and 2B.

Furthermore, a top portion of rail splice 150 includes opposing ridge portions 160A, 160B. Ridge portions 160A, 160B may have a curved and/or stepped interface such that the ridge portions 160A, 160B may slide or otherwise interact with an interior surface of the rail(s). For example, in one embodiment, ridge portions 160A, 160B may be configured to slide into the space formed below hook-like protrusions 26A, 26B of rail 10, thereby at least partially securing the rail splice 150 to the rail 10.

As is also shown in FIGS. 9A and 9B, the rail splice 150 may further include a pair of threaded through-holes 162 extending through the inset top surface 157 and the inset bottom surface 154. As described above, the threaded through-holes 162 are configured to accept fixing bolts (not shown) which may act as, e.g., set screws to secure the rail splice 150 to surfaces of adjoining rails such as, e.g., a top surface of one or more ribs of the rails. In this way, once positioned at the end portions of adjacent rails, the fixing bolts may be tightened so as to both secure the rail splice 150 relative to each of the rails and to secure the adjacent rails relative to one another.

Additionally, the fixing bolts may act to electrically bond the adjacent rails to one another, and the through-holes 162 may include a recessed portion which houses the heads of the fixing bolts, thereby allowing the heads of the fixing bolts to be flush (or near flush) with the inset top surface 157 to accommodate electrical wiring, etc., running through the rail and over the rail splice 150. When tightened, the fixing bolts may partially deform the rib(s), thereby increasing the bond between each fixing bolt and the rail 10.

Furthermore, while not shown in FIGS. 9A and 9B, when the fixing bolts are tightened such that they come into contact with the rib(s) extending from the rail(s), the fixing bolts may cause a deformation in the rib(s) due to the compressive force applied to the top of the rib(s). However, when fixing bolts are loosened and withdrawn, and no longer contact the rib(s), such a deformation of the rib(s) does not prevent movement and/or removal of the rail splice 150 relative to the rail(s), as the bottom surface recess 154 is sized with adequate open area within the concavity so as to accommodate such deformation without interference between the rail splice 150 and the rail(s) during removal and/or subsequent installation. The threaded hole, counterbore, extension of fixing bolt into the recessed concavity 154, and the interference with the rib(s) of splice 150 are not shown in FIGS. 9A and 9B. However, these elements are substantially similar to those of splice 130 as shown and described with respect to FIGS. 8A-8C.

Additionally and/or alternatively, in another embodiment, rail splice 150 may be at least partially deflectable, similar to rail splice 110 described above. In such an embodiment, the rail splice 150 may include one or more tabs configured to secure and electrically bond the rail splice 150 to the rail(s) via a spring-like force applied against the inner walls of the rail(s). While one or more fixing bolts may still be utilized, a rail splice of this type may be configured such that fixing bolts are unnecessary for adequate retention.

Figure 10C:
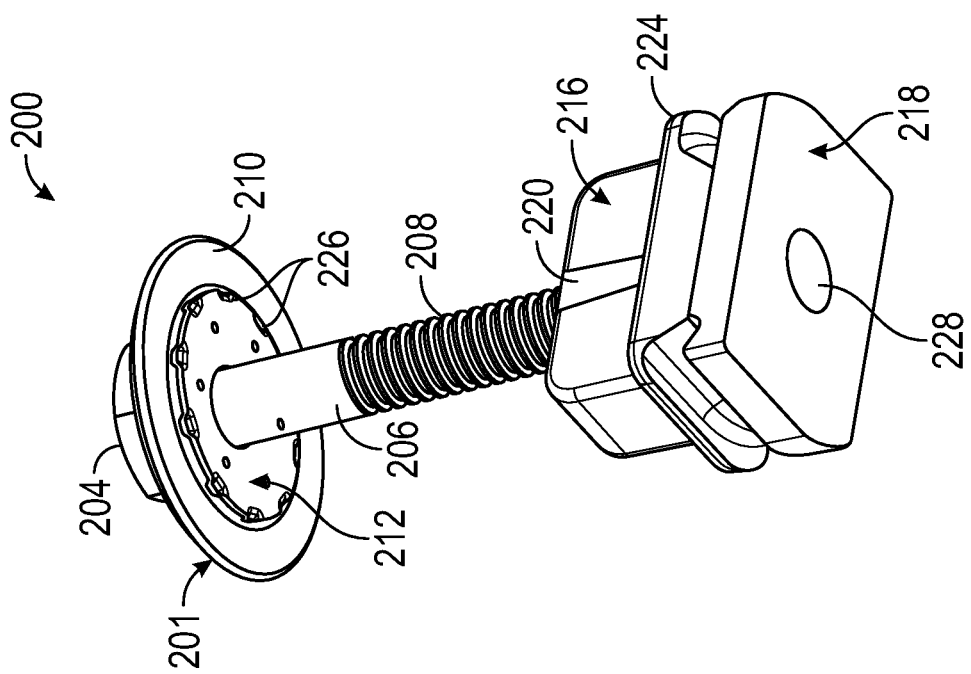
FIG. 10C is a bottom isometric view of the mid-clamp assembly of FIG. 10A.

Next, referring to FIGS. 10A-15E, various elements of a mid-clamp assembly 200 in accordance with an aspect of the present disclosure is shown. FIGS. 10A-10C illustrate the mid-clamp assembly 200 as a whole, with mid-clamp assembly 200 including a fastener member 202, an upper grip member 216, and a lower nut member 220. The mid-clamp assembly 200 is configured to be substantially universal, i.e., usable with solar panel frames having a wide range of thicknesses, heights, widths, etc.

When assembled and tightened relative to one another, the fastener member 202, upper grip member 216, and lower nut member 220 act to clamp up to two solar panels to a rail 30 (as shown in FIG. 10B), doing so at any desired location along a length of the rail. When a plurality of mid-clamp assemblies 200 are utilized together, the mid-clamp assemblies 200 act to at least partially retain the solar panels to the top surface of the rail in a secure, uniform, and aesthetically pleasing manner.

Referring first to FIGS. 10A-10C and also FIGS. 15A-15E, the details of fastener member 202 according to an embodiment of the present disclosure are set forth herein. Fastener member 202 includes an elongated bolt 201 having a non-threaded shank portion 206, a threaded portion 208, a top clamping washer 210, a bonding washer 212, a driver head portion 204, and an annular base 205 positioned at the base of the driver head portion 204, with the non-threaded shank portion 206 and the threaded portion 208 together forming an elongated portion of the bolt 201. In the embodiments shown in FIGS. 10A-10C, 15A, and 15B, the driver head 204 is configured as a conventional hexagonal head. However, it is to be understood that driver head 204 is not limited to such a head shape and may be configured to have any appropriate driver shape and/or interface.

Referring still to FIGS. 10A-10C and also FIGS. 15A and 15B, the threaded portion 208 extends from a distal end of the bolt 201 to the non-threaded shank portion 206, which extends from the non-threaded shank portion 206 to an annular base 205 of the driver head 204. However, in other embodiments, the threaded portion 208 may extend along the entirety of the bolt 201, and the non-threaded shank portion 206 may be omitted.

Figure 11B:
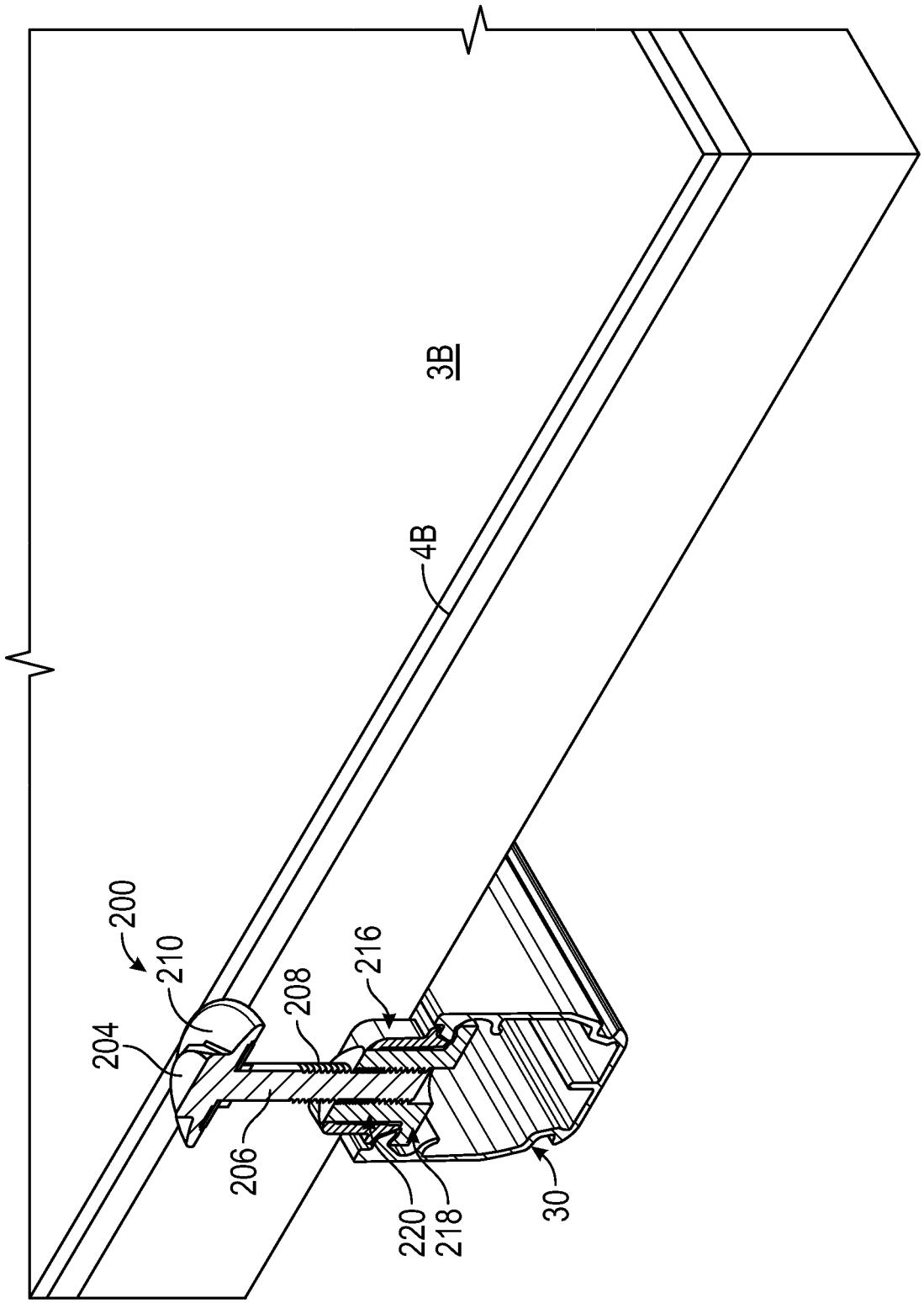
FIG. 11B is a partial isometric, cross-sectional view of the mid-clamp assembly of FIGS. 10A-10C coupled to a rail and solar panel frame.
Figure 11C:
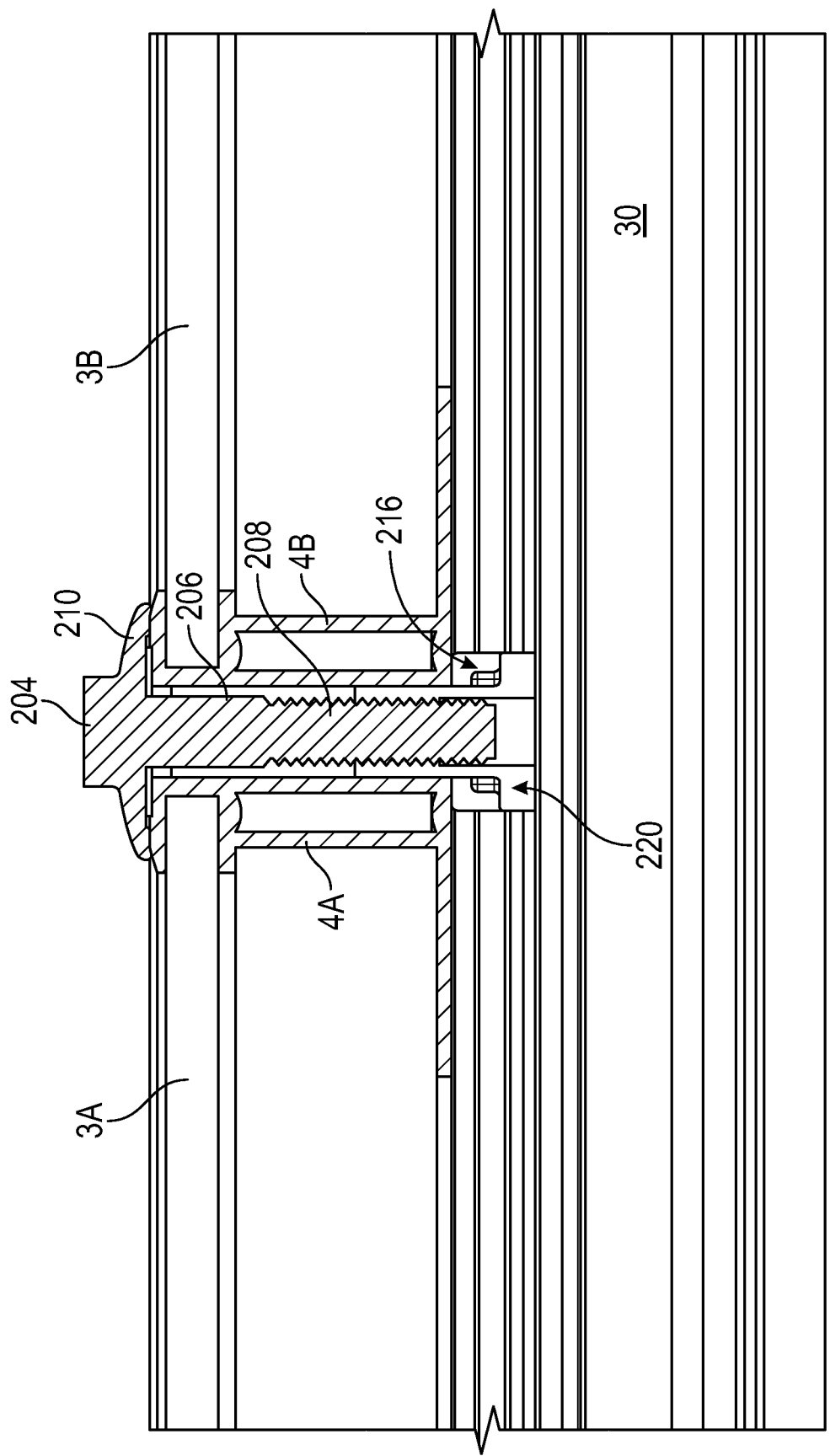
FIG. 11C is an end cross-sectional view of the mid-clamp assembly of FIGS. 10A-10C coupled to a rail and a pair of solar panel frames.

As shown in FIGS. 10A-10C, 15C, and 15D, fastener member 202 further includes a top clamping washer 210. The top clamping washer 210 is sized and configured so as to extend over portions of one or more solar panel frames such that when the mid-clamp assembly 200 is coupled to a rail and tightened, the top clamping washer 210 lowers onto and holds the solar panel frame(s) in place on the rail. The tightening of the fastener member 202 into the nut member 218 applies a clamping force between the bottom of the clamping washer 210 and the upper top surfaces 29A, 29B, securing the solar panel to the rail as shown in FIGS. 11B and 11C. The top clamping washer 210 includes a central through-hole 213, with the through-hole 213 sized so as to have a diameter substantially similar to that of the threaded portion 208 and or the non-threaded shank portion 206 of bolt 201, such that the elongated portion of the bolt including threaded portion 208 and non-threaded portion 206 extend through the through-hole 213 in the washer 210.

The top clamping washer 210 further includes an annular recess 211, with the top annular recess 211 being sized and configured to receive the annular base 205 of bolt 201. Similarly, a bottom surface of the top clamping washer 210 includes a bottom annular recess 215 formed therein, with the bottom annular recess 215 sized and configured to receive a grounding washer 212 therein. As shown in FIG. 15E, grounding washer 212 includes a flat plate portion, having a top surface and a bottom surface, which further includes a through-hole 260, a plurality of projections 226, retention tabs 262, and dimples 227. The projections 226 extend downward from the bottom surface of the grounding washer 212 such that they extend beyond the bottom surface of the clamping washer 210 and are located at or near the perimeter of the grounding washer 212. When top clamping washer 210 is tightened onto the solar panel frame(s), the projections 226 provide improved securement between the mid-clamp assembly 200, the rail, and the solar panel(s). Furthermore, in some embodiments, the projections 226 are configured to penetrate at least a surface layer of the solar panel frame(s), thereby providing effective electrical bonding between the solar panel frame and the clamp assembly 200. Accordingly, the grounding washer 212 is formed of an appropriate electrically conductive material such as, e.g., aluminum, stainless steel, carbon steel, titanium, etc.

The grounding washer 212 includes a central through-hole 260 sized so as to fit around the threaded portion 208 and the non-threaded shank portion 206 of the lag bolt 201, such that the elongated portion of the bolt including threaded portion 208 and non-threaded portion 206 extend through the hole 260 in the washer 212. In some embodiments, a plurality of inwardly extending retention tabs 262 extend annularly around the central through-hole 260, with the retention tabs 262 providing improved connection between the grounding washer 212 and bolt 201. The retention tabs 262 are bent downward, and are resilient and sized to apply pressure on the elongated portion of the bolt 201, allowing the grounding washer 212 to be pressed on/over the threaded portion 208 and the non-threaded portion 206 (if present) without having to rotate the grounding washer 212. When grounding washer 212 is pushed up into the recess 215, the retention tabs 262 press against the elongated portion of the bolt 201 and hold the grounding washer 212 in place. The force of the retention tabs 262 against the elongated portion is sufficient to retain the washer 212 in place but not great enough to prevent it from rotating around the bolt 201.

The grounding washer 212 includes dimples 227 which extend upward from the top surface of the grounding washer 212. The dimples 227 act as spacers between the top surface of grounding washer 212 and the bottom surface of bottom annular recess 215, thereby reducing the contact area and friction between the grounding washer 212 and the clamping washer 210. As the mid-clamp assembly 200 is tightened and the clamping washer 210 applies downward force, urging the solar panel frame down onto the upper top surfaces 29A and 29B of the rail 10, the projections 226 at least partially penetrate (or "bite into") the top surface of the solar panel frame. The reduced friction between the clamping washer 210 and the grounding washer 212 enables the clamping washer 210 to continue to rotate after the grounding washer 212 "bites into" the panel frame and is restricted from rotating, with such rotation occurring until the proper clamping force and torque has been achieved. While not shown in other embodiments of the present disclosure utilizing a bolt-and-washer fastener, it is to be understood that the features of grounding washer 212 such as, e.g., dimples 227, projections 226, etc., may be applied to other embodiments disclosed herein.

Referring to FIGS. 14A-14C, a fastener member 301 and related features in accordance with an alternative embodiment are illustrated. Similar to fastener member 202 described above with respect to FIGS. 10A-10C and 15A-15E, fastener member 301 is configured to provide a top clamping portion for the mid-clamp assembly 200. However, unlike fastener member 202, fastener member 301 does not include a separate top clamping washer. Instead, the top clamping washer portion 310 of fastener member 301 is incorporated into and is integral to a driver head portion 304 and an elongated portion 308. In this way, fastener member 301 requires fewer overall parts than fastener member 202, while fastener member 202 allows for greater rotational freedom between the respective parts. The embodiment shown in FIGS. 14A and 14B illustrates an elongated portion 308 that is fully threaded from the bottom of the washer portion 310 to the distal end 309. However, it is to be understood that elongated portion 308 may also include a non-threaded portion.

In the embodiment shown in FIGS. 14A and 14B, the driver head 304 is configured as a conventional hexagonal head. However, it is to be understood that driver head 204 is not limited to such a head shape and may be configured to have any appropriate driver shape and/or interface. The threaded portion 308 is configured to extend along the entirety of the fastener member 301, with no non-threaded shank portion located between the threaded portion 308 and the top clamping portion 310. However, in alternative embodiments, fastener member 301 may incorporate a non-threaded shank portion similar to that shown in FIGS. 15A and 15B.

Referring to FIGS. 14B and 14C, top clamping portion 310 is sized and configured so as to extend over portions of one or more solar panel frames (not shown) such that when the mid-clamp assembly 200 is coupled to a rail and tightened, the top clamping portion 310 lowers onto and holds the solar panel frame(s) in place on the rail. The bottom surface of top clamping portion 310 includes an annular recess sized and configured to receive a grounding washer 312 therein. As shown in FIGS. 14B and 14C, a plurality of projections 326 may extend downward from the perimeter of the grounding washer 312. When top clamping portion 310 is tightened onto the solar panel frame(s), the projections 326 provide improved securement between the mid-clamp assembly 200, the rail, and the solar panel(s). Furthermore, in some embodiments, the projections 326 are configured penetrate at least a surface layer of the solar panel frame(s), thereby providing effective electrical grounding. Accordingly, the grounding washer 312 is formed of an appropriate electrically conductive material such as, e.g., aluminum, stainless steel, carbon steel, titanium, etc.

Similar to grounding washer 212 described above, the grounding washer 312 includes dimples 327 which extend upward from the top surface of the grounding washer 312. The dimples 327 act as spacers between the top surface of grounding washer 312 and the bottom surface of the top clamping portion 310, thereby reducing the contact area and friction between the grounding washer 312 and the top clamping portion 310.

The grounding washer 312 further includes a central through-hole 320 sized so as to fit around the threaded portion 308 of fastener member 301. In the embodiment shown in FIGS. 14B and 14C, the central through-hole 320 includes no tabs or other features which aid in securement between the grounding washer 312 and the threaded portion 308. However, it is to be understood that in alternative embodiments, one or more tabs or other securement features may be provided in the central through-hole 320 of grounding washer 312.

While the top clamping washer 210 and top clamping washer portion 310 of the respective embodiments shown and described with respect to FIGS. 14A, 14B, 15A, and 15B are shown as being substantially circular in shape, it is to be understood that top clamping washer 210 and/or top clamping portion 310 could be configured in non-circular shapes such as, e.g., rectangular, oval, square, etc. Similarly, the respective grounding washers 212, 312, which are shown as being substantially circular, could also be configured in non-circular shapes such as, rectangular, oval, square, etc.

Referring still to FIGS. 10A-10C, and also to FIGS. 11A-13B, the fastener member 202 of the mid-clamp assembly 200 is configured to interact with the upper grip member 216 and lower nut member 220 so as to provide a desired clamping functionality. Alternatively, fastener member 301 may be substituted for fastener member 202 and interact with the upper grip member 216 and the lower nut member 220. As is shown in FIG. 10B, the upper grip member 216 includes laterally-extending support surfaces 224A, 224B extending from opposite sides thereof, with the laterally-extending support surfaces 224A, 224B being configured to rest atop, e.g., respective ledge top surfaces 28A, 28B extending linearly along the length of rail 30 (as shown in FIGS. 3A and 3B) or any of the rails described herein, when the mid-clamp assembly 200 is coupled to the rail. Additionally, the lower nut member 220 includes a lower engagement portion 218 having a pair of outwardly extending, opposing engagement wings 222A, 222B. The lower engagement portion 218, with opposing wings 222A, 222B extending from two of four opposing sides, is substantially rectangular, having a longer length and a shorter width. Although the embodiments shown are substantially rectangular, it is to be understood that the general shape of the engagement portion 218 could be any appropriate shape such as, e.g., an oval, a parallelogram, etc., so long as the engagement portion 218 as a length longer than its width. When engaged with the fastener assembly 202 and tightened, the engagement wings 222A, 222B of the lower nut member 220 are configured to interact with the projections 25A, 25B of the rail 30, thereby retaining the lower nut member 220 (and the entirety of mid-clamp assembly 200) in position on the rail 30. Additionally, the interaction of the support surfaces 224A, 224B on top of respective ledge surfaces 28A, 28B and the engagement wings 222A, 222B below projections 25A, 25B (effectively sandwiching the projections 25A, 25B) acts to hold the clamp assembly upright in position on the rail 30, even before tightening of the clamp assembly 200. The engagement wings 222A, 222B may also be configured to electrically bond the lower nut member 220 (and, thus, the mid-clamp assembly 220) to the rail.

The engagement wings 222A, 222B include grooves 247 configured to align and at least partially receive the angled interface formed by the projections 25A, 25B of rail 10 (or comparable projections of any rail shown and described herein). The grooves 247 include raised portions 248 which project from the bottoms of the grooves and are sharp or otherwise configured to penetrate at least a surface coating of the angled interfaces thereby forming an electrical bond between the clamp assembly 200 and the rail 10, 30, 50. The raised portions can be considered ribs and extend perpendicularly across the length of the grooves.

As is shown in FIGS. 10A-10C, the upper grip member 216 is engageable with a portion of lower nut member 220. Specifically, referring to FIGS. 12A-12B, the upper grip member 216 includes an opening 234 extending therethrough, with the size and shape of the opening 234 corresponding to the exterior size and shape of an upstanding central portion 244 of the lower nut member 220 so as to allow for conforming engagement between the upper grip member 216 and the lower nut member 220. Such engagement and conforming shapes substantially prevent the upper grip member 216 and lower nut member 220 from rotating relative to one another when coupled, allowing upper grip member 216 to act as a grip or handle for the lower nut member 220 so as to ease installation and removal of the mid-clamp assembly 200 on the rail. In the embodiment shown in FIGS. 12A-12B, both the opening 234 and the upstanding central portion 244 are substantially diamond-shaped with rounded corners. However, it is to be understood that neither the opening 234 nor the upstanding central portion 244 are limited to such a shape and/or configuration.

Figure 12B:
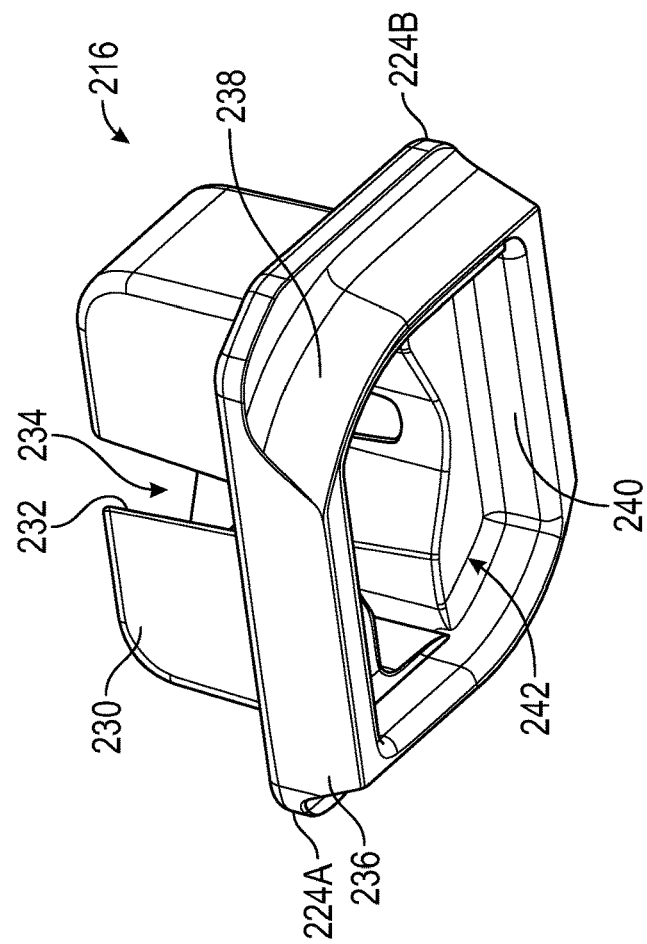
FIG. 12B is a bottom isometric view of the clamp top of the mid-clamp assembly of FIGS. 10A-10C.
Figure 12A:
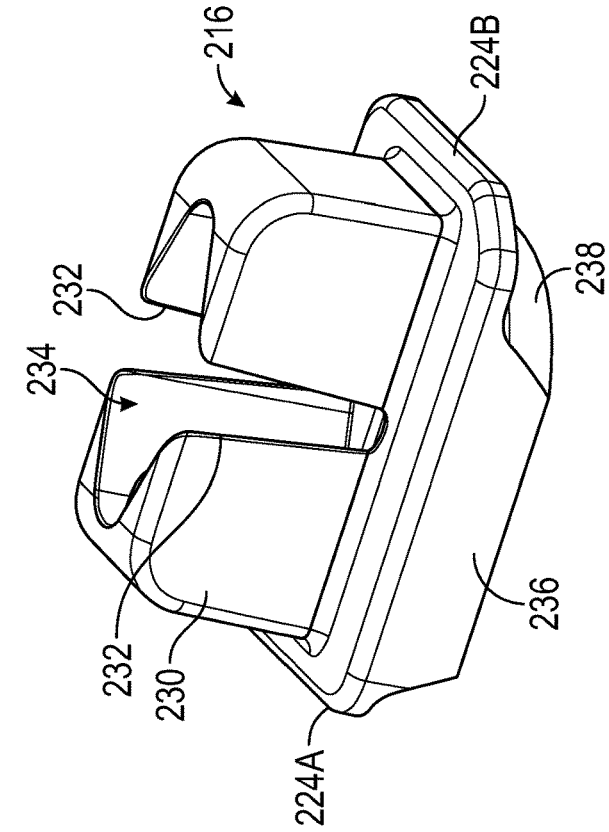
FIG. 12A is a top isometric view of the clamp top of the mid-clamp assembly of FIGS. 10A-10C.

FIGS. 12A and 12B illustrate the various features of upper grip member 216 in further detail. As noted above, the upper grip member 216 includes an opening 234, with the opening passing entirely through a top portion 230. Top portion 230 includes a pair of substantially U-shaped slots 232 in opposing sidewalls, with the U-shaped slots 232 providing a space for the upstanding central portion 244 to extend at least partially therethrough. Upstanding portion 244 extends upward from the top surface 246 substantially above the upper top surfaces 29A, 29B of the rails such that when the clamp assembly 200 is coupled to the rail 10, 30, 50 and a pair of solar panels are coupled to the rails by the mid clamp assemblies 200, the upstanding central portion 244 is configured to act as a spacer between neighboring solar panel frames. As upstanding central portion 244 is formed of a metallic material as opposed to a plastic or composite material of the top portion 230, the U-shaped slots 232 enable the stronger metallic material of the central portion 244 to be externally accessible. While shown and described as U-shaped, it is to be understood that slots 232 may be any appropriate shape (or shapes) which allow the central portion 244 to be at least partially externally accessible.

Below the laterally-extending support surfaces 224A, 224B, the upper grip member 216 further comprises an exterior sidewall 236, an interior sidewall 240, and a recess 242 formed therein. The exterior sidewall 236 may comprise at least one rounded corner 238, and preferably comprises a pair of rounded corners 238 on opposing corners of the exterior sidewall 236. Both the upper grip member 216 and lower nut member 220 are initially inserted on the rail in a first position (i.e., longitudinally parallel to the longitudinal axis of the rail). The width of the lower nut member 220 and the width of the upper grip member 216 are aligned and similarly less than the opening 20, 40, 60 created by the distance between the projections 25A, 25B, 45A, 45B, 65A, 65B, respectively. Then, once in a desired position on the rail, the upper grip member 216 is rotated about 90° such that the laterally-extending support surfaces 224A, 224B contact, e.g., the respective ledge surfaces 28A, 28B extending linearly along the length of rail 10. Concurrently, the engagement wings 222A, 222B are rotated into the recesses 27A, 27B. With rounded corner(s) 238 and 250, such rotation is made possible, as the exterior sidewall 236 of the upper grip member 216 and the engagement portion 218 of the lower nut member 220 does not contact (or minimally contacts) the rail during rotation.

In some embodiments, the upper grip member 216 is formed of a non-metallic material such as, e.g., plastic. In this way, the upper grip member 216 may be more easily manufactured by way of, e.g., molding, etc. However, it is to be understood that upper grip member 216 may be formed of any appropriate material or materials, including metallic materials. Furthermore, in some embodiments, the coupling of upper grip member 216 and lower nut member 220 is intended to be permanent. The two parts are press-fit together and, while it is possible to separate them by applying sufficient force, there is no necessity to perform such a separation, thereby allowing the two parts stay together throughout (and permanently after) the installation process. Thus the upper grip member 216 acts as a handle for the mid-clamp assembly 200, providing a comfortable and convenient way to hold the mid-clamp assembly 200 while installing it in the rail 10, 30, 50.

Referring to FIGS. 13A and 13B, various features of lower nut member 220 are illustrated in further detail. As noted above, lower nut member 220 includes an upstanding central portion 244 extending from a lower engagement portion 218. A threaded through-hole 228 is centrally bored through the upstanding central portion 244 and the lower engagement portion 218, with the threaded through-hole 228 configured to engage with the threaded portion 208 of fastener member 202.

A pair of opposing engagement wings 222A, 222B extend laterally from the lower engagement portion 218 so as to provide an appropriate engagement surface between the lower nut member 220 and the projections of a rail. Furthermore, a plurality of raised portions or ribs 248 may extend across grooves 247 which are recessed in the top surface 246 across the engagement wings 222A, 222B. The raised portions or ribs 248 as shown do not extend above the top surface 246 of the lower engagement portion 218. The ribs 248 may provide additional strength and reinforcement to the engagement wings 222A, 222B, thereby preventing bending and/or fracture of the engagement wings 222A, 222B when engaged with the rail. Additionally and/or alternatively, in some embodiments, the ribs 248 may be shaped and configured such that at least a portion of the ribs 248 may penetrate a surface of the rail when tightened thereto, which may electrically bond the lower nut member 220 to the rail, as well as reduce sliding of the mid-clamp assembly 200 on the rail once properly tightened into place.

Similar to upper grip member 216, lower nut member 220 also comprises at least one rounded corner 250, and preferably comprises a pair of rounded corners 250 on opposing corners of the lower engagement portion 218. As detailed above, the lower nut member 220 may be initially inserted on the rail in a first position (i.e., longitudinally parallel to the longitudinal axis of the rail). Then, once in a desired position on the rail, the lower nut member 220 (with the upper grip member 216) can be rotated about 90° such that the engagement wings 222A, 222B are positioned within, e.g., the recesses 27A, 27B extending linearly along the length of rail 10. With rounded corner(s) 250, such rotation is made possible, as the lower engagement portion 218 of the lower nut member 220 does not contact (or minimally contacts) the rail during rotation.

In some embodiments, the lower nut member 220 is formed of a metallic material such as, e.g., aluminum, stainless steel, carbon steel, titanium, etc., and may be formed by any appropriate manufacturing method such as, e.g., casting, milling, etc. However, it is to be understood that lower nut member 220 may be formed of any appropriate material or materials, including non-metallic materials, and may be formed by other manufacturing methods.

Next, referring to FIGS. 16A-17B, a universal end clamp assembly 400 in accordance with another aspect of the present disclosure is illustrated. Unlike mid-clamp assembly 200 described above, which may be clamped at various intermediate positions along the length of the rail and/or solar panel frame, universal end clamp assembly 400 is configured to be limited to terminal end solar panel-to-rail clamping locations, i.e., locations where two solar panels are not adjacent and the clamping of only one solar panel frame is required.

As shown in FIGS. 16A and 16B, the universal end clamp assembly 400 includes a fastener member 401, a top frame clamp member 402, an upper grip member 416, and a lower nut member 420. The construction and details regarding upper grip member 416 and lower nut member 420 are substantially the same as those of upper grip member 216 and lower nut member 220 described above with respect to FIGS. 10A-13B. Accordingly, the details and function of upper grip member 416 and lower nut member 420 will not be reiterated herein.

Figure 17C:
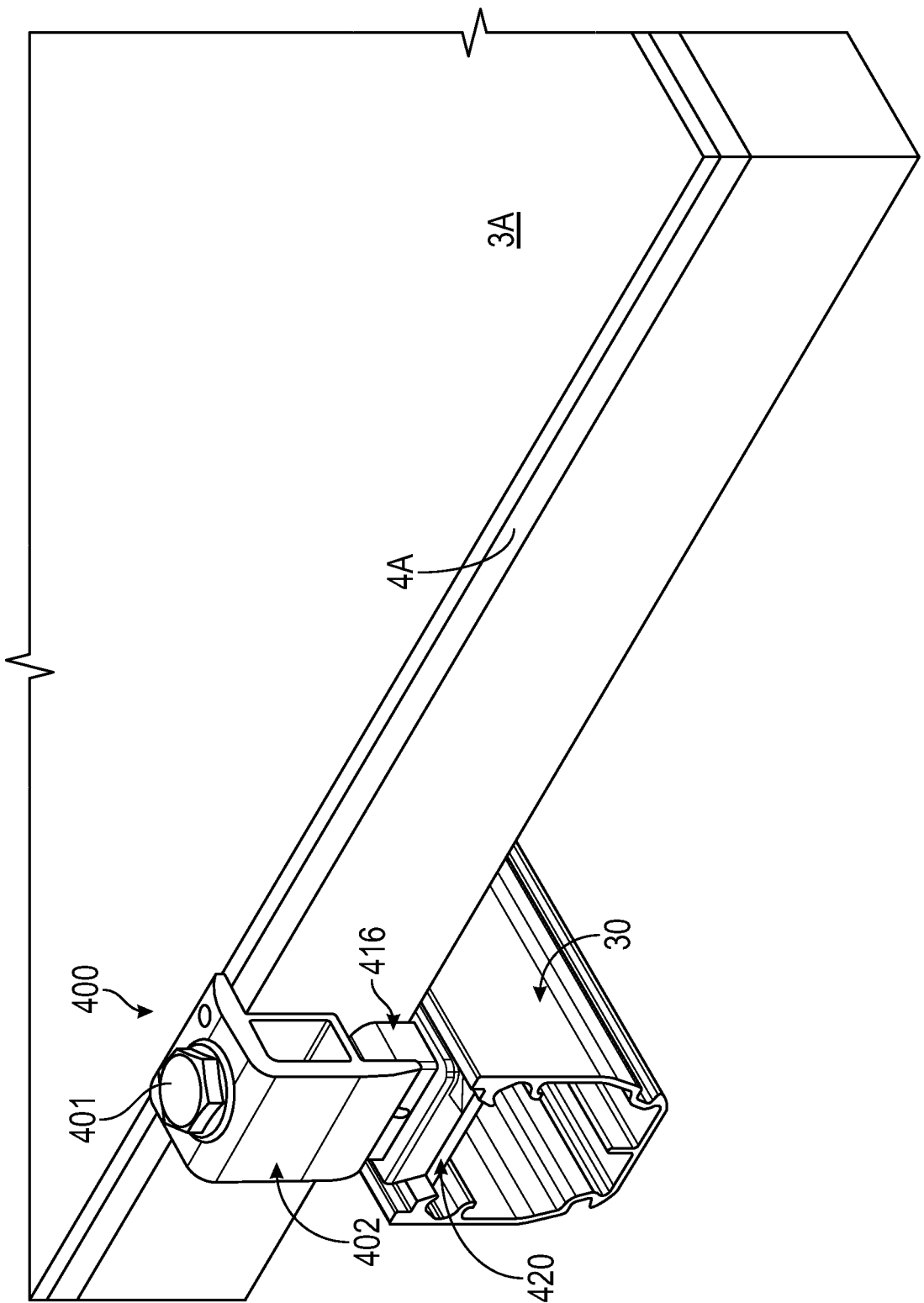
FIG. 17C is a partial isometric view of the universal end clamp assembly of FIG. 16A coupled to a rail and solar panel frame.
Figure 17D:
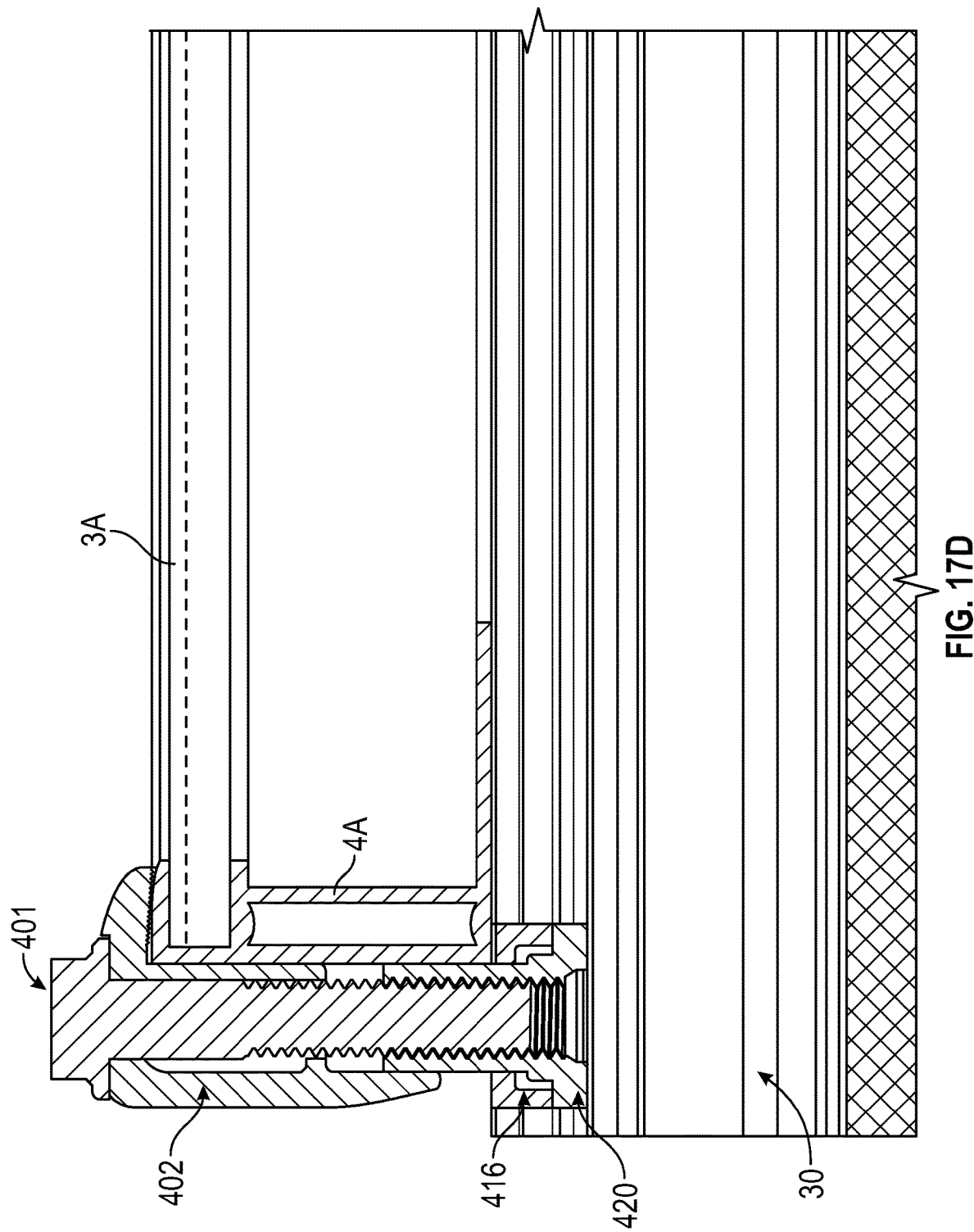
FIG. 17D is a partial side cross-sectional view of the universal end clamp assembly of FIG. 17A coupled to a rail and a solar panel frame.

The fastener member 401 includes a driver head portion 404 and a threaded portion 408, with the threaded portion 408 configured to engage a corresponding threaded portion of the lower nut member 420. The threaded portion 408 of the fastener member 401 also passes through an upper hole 428 and a lower hole 424 formed in the top frame clamp member 402 (shown in FIG. 16C). Accordingly, as the fastener member 401 is tightened to the lower nut member 420 while coupled to a rail (e.g., rail 30, as shown in FIGS. 17A and 17B), the top frame clamp member 402 is configured to clamp onto a top surface of one or more solar panel frames to provide securement of the solar panel frame(s) to the rail.

Referring to FIG. 16C, additional details of the top frame clamp member 402 in accordance with an aspect of the present disclosure are illustrated. The top frame clamp member 402 includes a top surface member 412, as well as a side surface member 410 extending substantially downward from the top surface member 412 so as to form a substantially L-shaped clamping member. With this configuration, the side surface member 410 acts to hide other features of the universal end clamp assembly 400 when coupled to the rail, providing for a more aesthetically pleasing assembly on the visible (i.e., terminal or end) portions of the solar panel array. Furthermore, the side surface member 410 provides for increased structural support under extreme loading, and also aids in installation of the universal end clamp assembly 400. That is, the side surface member 410 includes a lower downwardly extending side surface, which contacts and reacts against the side of upper grip member 416 (and an upstanding portion similar to upstanding portion 244 described above) as torque is increased during the installation process, thereby reducing the amount and possibility of the universal end clamp assembly 400 rotating and or pulling away from the solar panel frame during installation and tightening.

Extending below the top surface member 412 and coupled to both the top surface member 412 and the side surface member 410 is a substantially L-shaped reinforcing portion 417. The reinforcing portion 417 not only provides added structural rigidity to the top frame clamp member 402, but it also provides for a passage for the threaded portion 408 of the fastener member 401. As noted above, the top surface member 412 comprises an upper hole 428 formed therethrough, while the reinforcing portion 417 includes the lower hole 424, with a hollow region 418 formed within (or therebetween) the reinforcing portion 417 between the upper hole 428 and lower hole 424. In this way, the threaded portion 408 of the fastener member 401 can extend through the top frame clamp member 402 and maintain a substantially straight and square orientation of the top frame clamp member 402 relative to the upper grip member 416 and lower nut member 420.

As shown in FIG. 16C, the top surface member 412 may include a recessed portion 426 formed around the upper hole 428, with the recessed portion 426 being sized and configured to accommodate at least a portion of the driver head portion 404 of the fastener member 401. Furthermore, top surface member 412 comprises a lower clamping face 414. In some embodiments, lower clamping face 414 may include a plurality of ridges or other surface texturization configured to increase friction between the top surface member 412 and a solar panel frame(s) when clamped.

Additionally, one or more bonding pins 422 may also project from the lower clamping face 414 of the top surface member 412. The bonding pin(s) 422, which are formed of an electrically conductive material, are configured to penetrate at least a surface layer of a solar panel frame when the universal end clamp assembly 400 is in a clamped configuration onto the solar panel(s) and rail(s). In this way, the universal end clamp assembly 400 may be electrically bonded to the solar panel frame(s) and the rail.

In one embodiment, the top frame clamp member 402 is formed of a metallic material such as, e.g., aluminum, stainless steel, carbon steel, titanium, etc., and may be formed by any appropriate manufacturing method such as, e.g., casting, milling, etc. However, it is to be understood that top frame clamp member 402 may be formed of any appropriate material or materials, including non-metallic materials, and may be formed by other manufacturing methods.

Referring now to FIGS. 18A-20D, a hidden end clamp assembly 500 (and associated components) in accordance with another aspect of the present disclosure is illustrated. While universal end clamp assembly 400 described above is configured to clamp on top of a frame member of one or more solar panels (and is therefore visible when installed), the hidden end clamp assembly 500 is specifically configured to remain substantially unseen when mounted to a rail.

Figure 18B:
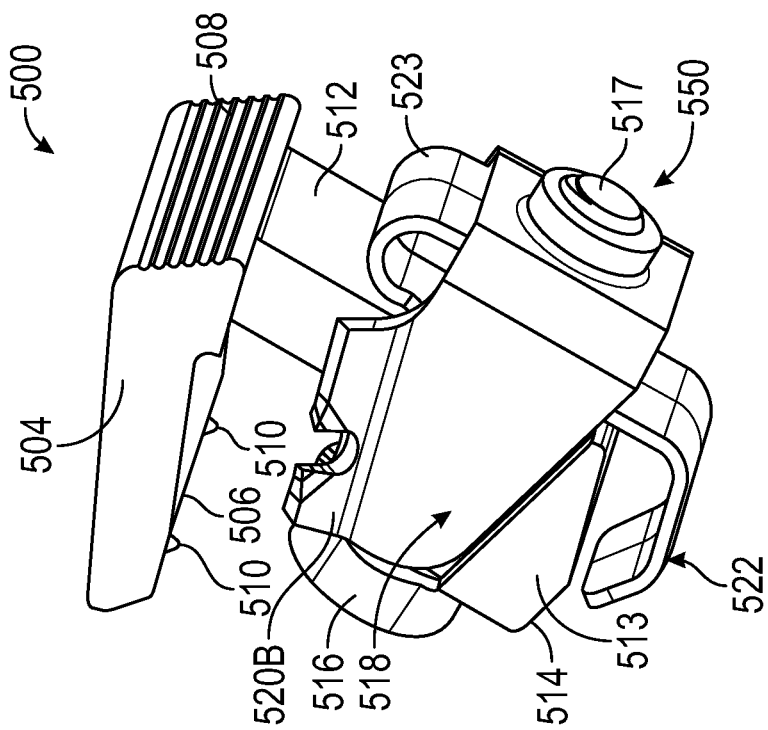
FIG. 18B is a rear isometric view of the hidden end clamp assembly of FIG. 18A.
Figure 18A:
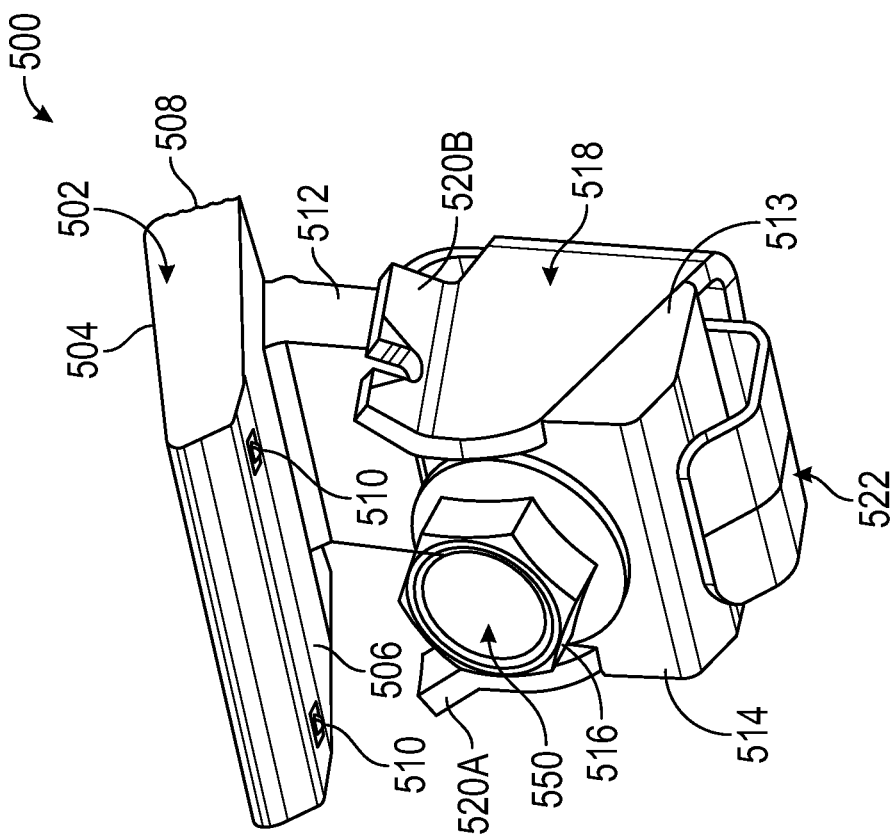
FIG. 18A is a front isometric view of a hidden end clamp assembly in accordance with an aspect of the present disclosure.
Figure 19A:
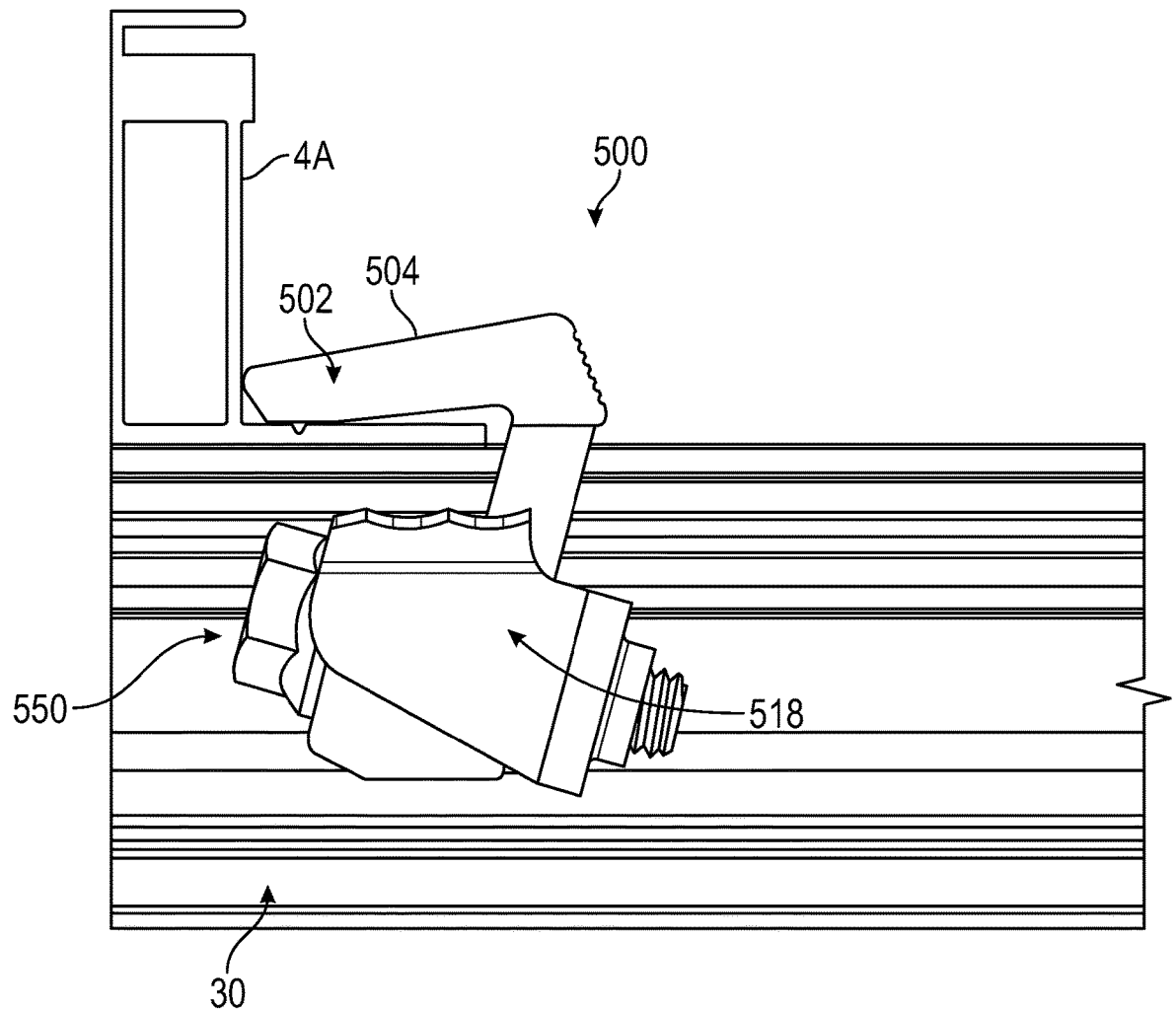
FIG. 19A is a partial side view of the hidden end clamp assembly of FIGS. 18A-18B coupled to a rail and a solar panel frame in accordance with an aspect of the present disclosure.
Figure 19B:
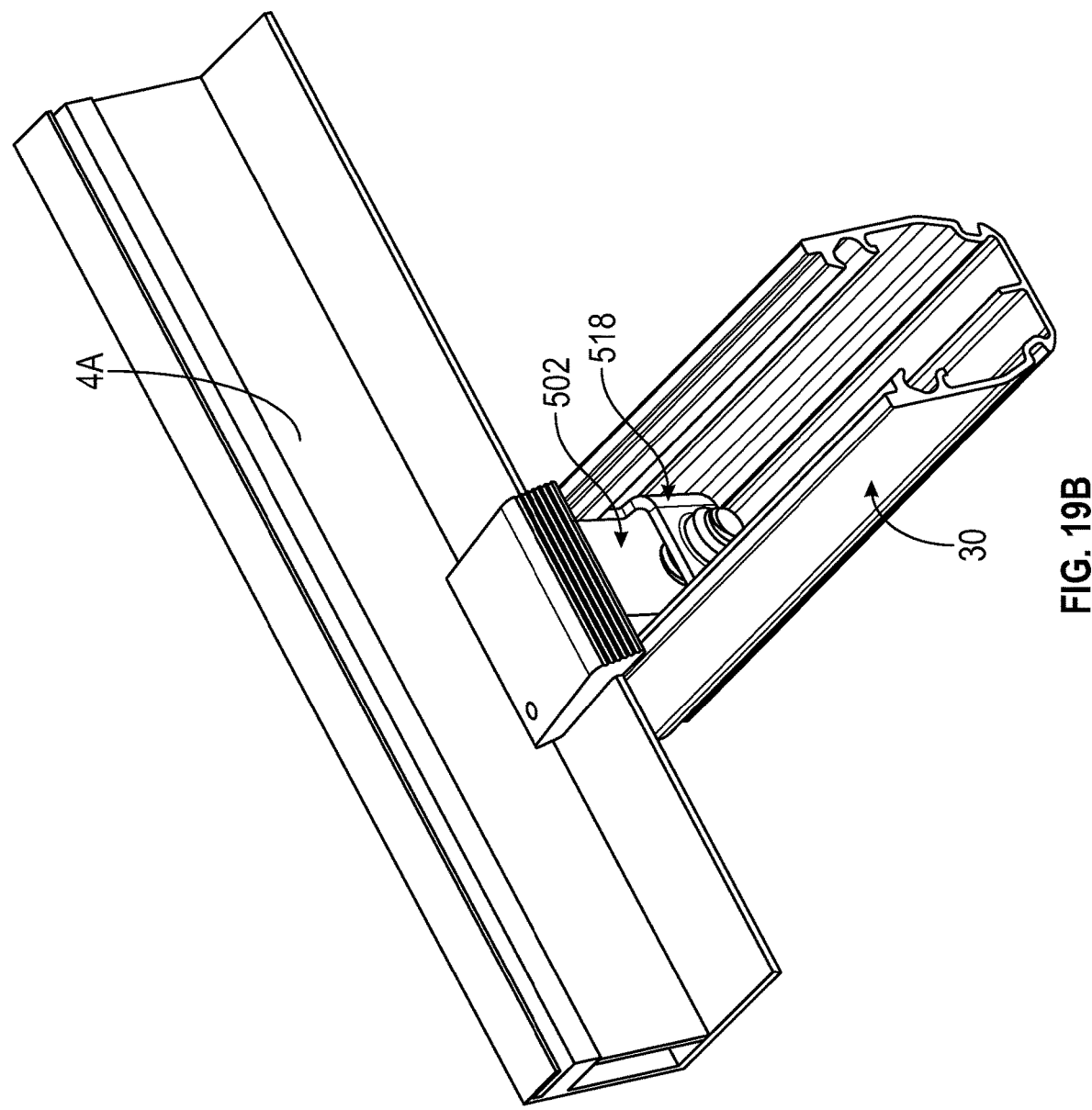
FIG. 19B is a rear isometric view of the hidden end clamp assembly of FIGS. 18A-18B coupled to a rail and a solar panel frame in accordance with an aspect of the present disclosure.
Figure 19C:
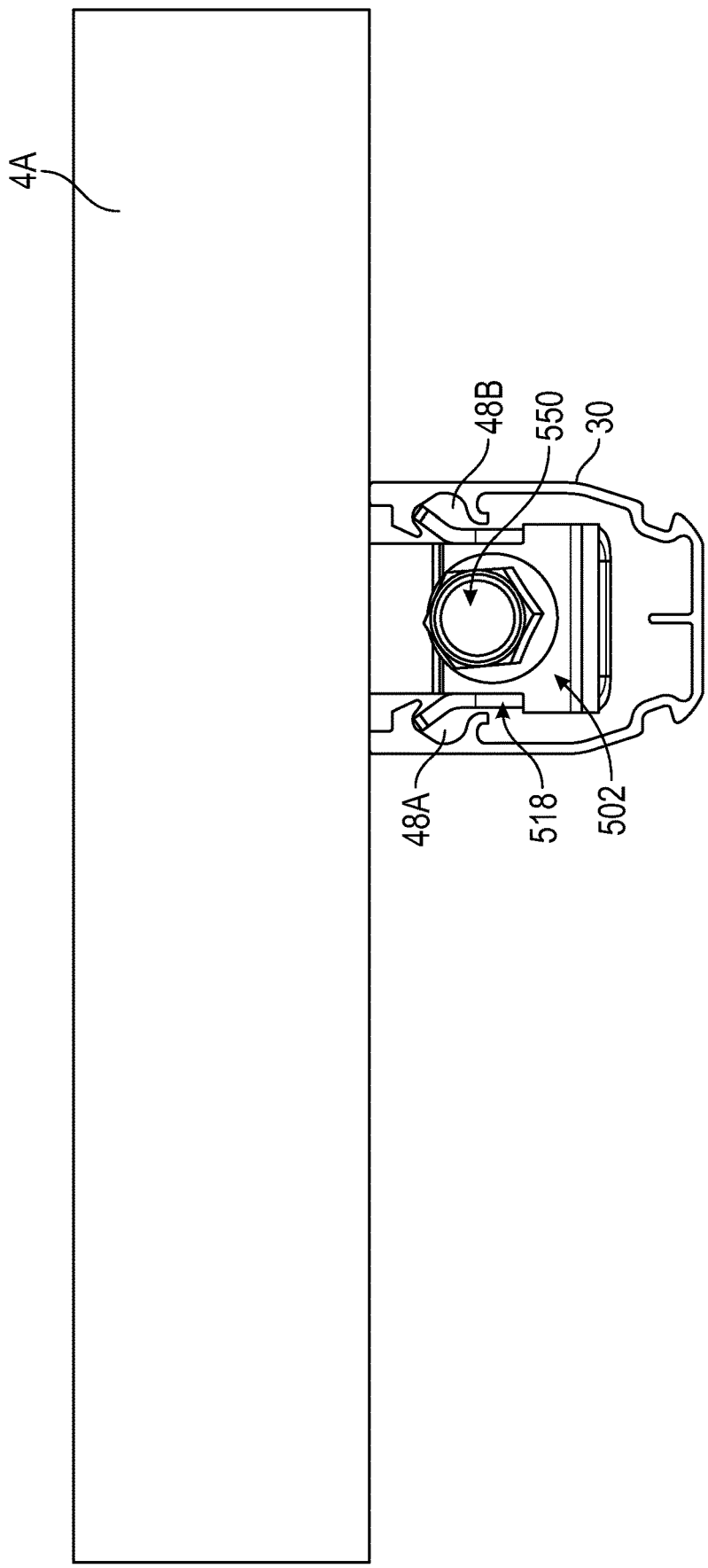
FIG. 19C is an end view of the hidden end clamp assembly of FIGS. 18A-18B coupled to a rail and a solar panel frame in accordance with an aspect of the present disclosure.

Referring to FIGS. 18A and 18B, hidden end clamp assembly 500 is shown in an assembled state. The hidden end clamp assembly 500 includes a clamping body 502, a nut member 518, a retaining member 522, and a fastener member 550. As shown in FIG. 19, the nut member 518 is configured to slidably engage, e.g., the pair of elongated recesses 48A, 48B formed along the length of the rail 30 (and comparable elongated recesses formed along the length of any rail disclosed herein), with the retaining member 522 acting to support the clamping body 502 relative to the nut member 518, even when the fastener member 550 is in a loosened state, thus holding the top clamping portion up above the top of the upper top surfaces 39A, 39B of the rail 30. As will be described in further detail below, as the fastener member 550 is tightened, the clamping body 502 is configured to move downward relative to the nut member 518 and the retaining member 522. In this way, a top clamping portion 504 of the clamping body 502 also moves downward relative to a top surface of the rail 30. Accordingly, when a solar panel is positioned over the rail 30, the top clamping portion 504 can initially be positioned over a bottom flange portion of the solar panel frame 4A, as is shown in FIGS. 19A and 19B. As the fastener member 550 is tightened, this top clamping portion 504 of clamping body 502 is configured to slide downward onto the bottom portion of the solar panel frame, while the nut member 518 resists upward movement due to its engagement with the elongated recesses 48A, 48B formed along the length of the rail 30, thereby providing a clamping force between the top clamping portion 504 and the upper top surfaces 39A, 39B on the lower flange portion of solar panel frame 4A and acting to clamp and secure the solar panel frame 4A to the rail 30.

Referring again to FIGS. 18A and 18B, and also to FIG. 20A, various details of clamping body 502 according to an aspect of the present disclosure will be described. As noted above, clamping body 502 includes a top clamping portion 504, with top clamping portion 504 having a lower clamping surface 506. In some embodiments, one or more bonding portions 510 may extend from the lower clamping surface 506, with bonding portion(s) 510 formed of an electrically conducting material and capable of at least partially penetrating a surface of a solar panel frame so as to provide electrical grounding. The clamping body 502 itself may be formed of any appropriate material such as, e.g., aluminum, stainless steel, carbon steel, titanium, etc. However, it is to be understood that clamping body 502 may be formed of any appropriate material, including non-metallic materials. While the embodiments shown in FIGS. 18A-23A illustrate bonding portions 510 having a sharp piercing point capable of penetrating a surface of solar panel frames, it is understood that other piercing elements of alternate shapes and configurations may be incorporated into the lower clamping surface in order to electrically bond the solar panel frame to the hidden end clamp assembly. Such alternate shapes and configuration may include, e.g., raised ridges, blades, or any appropriate piercing shape.

In some embodiments, a rear surface 508 of top clamping portion 504 may be provided with a plurality of parallel ribs or other textured features. The textured rear surface 508 may provide added grip to a user when installing and/or removing the hidden end clamp assembly 500 to/from a rail. In particular, the textured rear surface 508 provides a convenient area to pull the hidden end clamp assembly 500 and the top clamping portion 504 toward and over the bottom flange of the solar panel frame.

The clamping body 502 further comprises a downwardly-extending leg portion 512. The leg portion 512 extends from lower clamping surface 506 at an acute angle, thereby providing for an angled interface relative to the nut member 518 when the hidden end clamp assembly 500 is fully assembled. In part, this angled interface enables a downward clamping force to be applied by the clamping body 502 to retain a solar panel frame surface relative to a rail, as will be described in further detail hereinbelow.

Figure 20A:
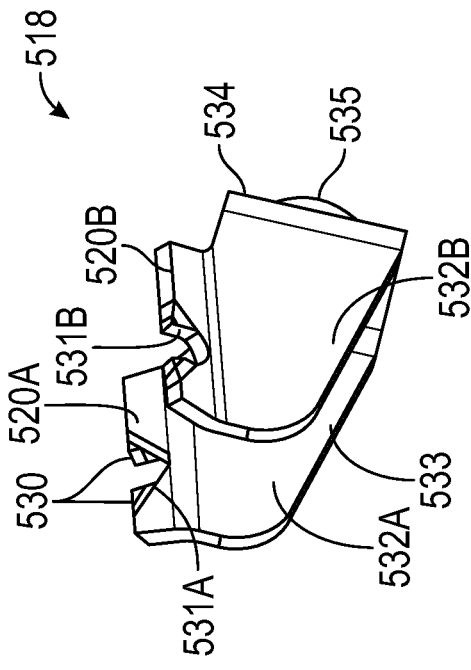
FIG. 20A is a top isometric view of an upper clamping portion of the hidden end clamp assembly of FIGS. 18A-18B.

Referring still to FIG. 20A, a distal end of the leg portion 512 includes a base portion 514, with base portion 514 having a pair of elongated openings 526, 528 formed therethrough. The elongated openings 526, 528 are sized and configured so as to allow a threaded shank 517 (shown in FIG. 20D) of the fastener member 550 to pass therethrough. However, because elongated openings 526, 528 extend relative to a vertical axis of the base portion 514, the clamping body 502 is capable of linear movement relative to the same vertical axis, while minimizing any horizontal movement between the clamping body 502 and nut member 518.

As shown in FIG. 20A, the base portion 514 may have an open (or hollow) interior extending between elongated openings 526, 528, thereby reducing the weight and material associated with base portion 514. However, in other embodiments, it is to be understood that base portion 514 may be formed as a unitary or solid structure. Furthermore, the base portion 514 includes a front face 515, which is configured to provide an interface surface with a bottom face 542 of a drive head 516 (shown in FIG. 20D) of the fastener member 550. As shown in FIG. 20A, in some embodiments, a surface plane of the front face 515 is configured to be parallel to the leg portion 512. Below the front face 515, the base portion 514 may also include an angled face 519. The angled face 519 may be configured to match the angulation of a lip 540 formed on the retaining member 522 (shown in FIG. 20C), thereby enabling a bottom retaining portion 539 of the retaining member 522 to support and at least partially retain the clamping body 502 relative to both the nut member 518 and the retaining member 522, even when the fastener member 550 is in a loosened state.

Figure 20B:
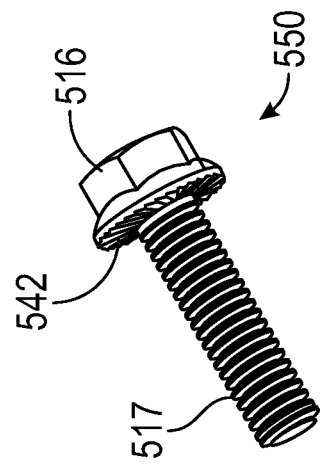
FIG. 20B is a top isometric view of a connection nut portion of the hidden end clamp assembly of FIGS. 18A-18B.

Next, referring to FIG. 20B, the nut member 518 includes a pair of flanges 532A, 532B extending from a rear portion 534. The flanges 532A, 532B are spaced apart so as to allow the base portion 514 of clamping body 502 to closely fit therebetween, with the flanges 532A, 532B flanking the respective side surfaces of the base portion 514. Furthermore, the rear portion 534 of nut member 518 is angled to substantially match the angle of leg portion 512 of clamping body 502. The rear portion 534 includes a threaded opening 535, with the internal threads of threaded opening 535 being configured to engage the external threads of threaded shank 517 of fastener member 550.

Referring still to FIGS. 18A-20B, base portion 514 of clamping body 502 includes projecting side surfaces 513 with angled top edges forming sloping ledges 511. Nut member 518 includes side flanges 532A, 532B with angled bottom edges forming sloping flange bottom surfaces 533. As the fastener member 550 is rotated clockwise to tighten and counterclockwise to loosen, the sloping flange bottom surfaces 533 engage the sloping ledges 511. As the fastener member 550 is tightened, the rear portion 534 is drawn closer to the leg portion 512, the fastener member 550 moves vertically within elongated opening 526, 528, the flanges move across the sides of the base portion 514, the sloping flange bottom surfaces 533 ride along the sloping ledges 511, a pair of wing projections 520A, 520B engage the recesses 27A, 27B and bottom surfaces of projections 25A, 25B, and, thus, the nut member 518 is urged upward and the clamping body 502 is urged downward in relation to one another.

Additionally, the pair of flanges 532A, 532B comprise the respective wing projections 520A, 520B, with each wing projection 520A, 520B angled outwardly relative to the flanges 532A, 532B. In this way, the wing projections 520A, 520B are configured to slidably interface with a pair of elongated recesses formed in a rail, thereby allowing the nut member 518 to slide with respect to the rail. For example, in one embodiment, the wing projections 520A, 520B may slidably interface with the elongated recesses 48A, 48B are formed along the length of rail 30 shown in FIGS. 2A and 2B. It is understood that the wing projections may equivalently slidably interface with elongated recesses of any rail described herein.

Referring still to FIG. 20B, the wing projections 520A, 520B include respective notches 531A, 531B formed therein, with an upper portion of each notch 531A, 531B including a pair of piercing projections 530 extending therefrom. The piercing projections 530 are configured to pierce at least a surface layer of, e.g., an interior surface of the elongated recesses of the rail when the fastener 550 is fully tightened, thereby providing for an electrical ground between the nut member 518 and the rail. Relatedly, in some embodiments, the nut member 518 is formed of an electrically conducting material such as, e.g., aluminum, stainless steel, carbon steel, titanium, etc. However, in alternative embodiments, nut member 518 may be formed of a non-electrically conducting material, including non-metallic material(s).

Figure 20C:
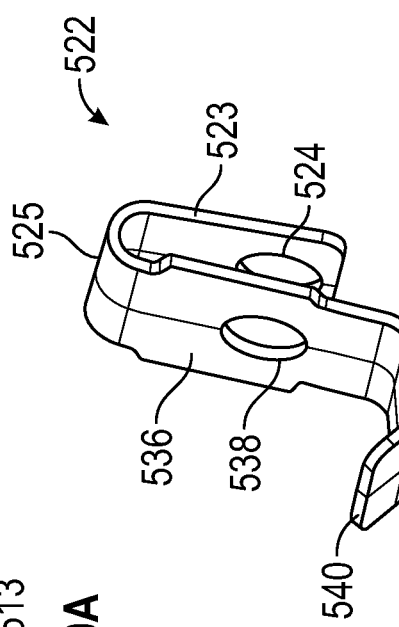
FIG. 20C is a top isometric view of an angled clip member of the hidden end clamp assembly of FIGS. 18A-18B.
Figure 20D:
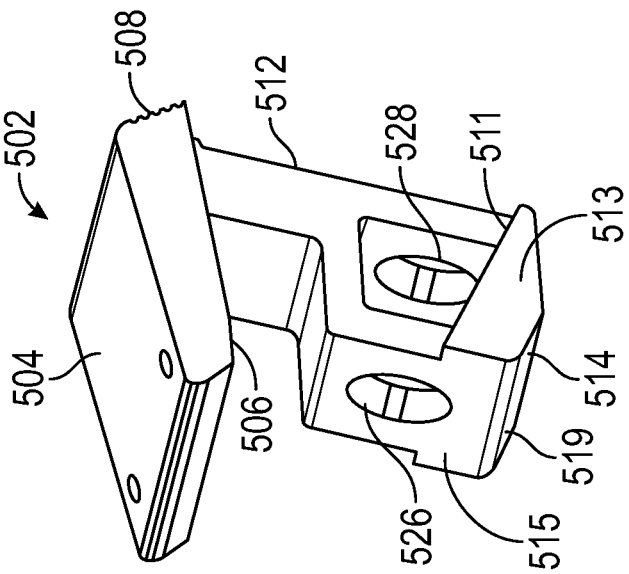
FIG. 20D is an isometric view of a clamping bolt of the hidden end clamp assembly of FIGS. 18A-18B.

FIG. 20C illustrates the retaining member 522 of the hidden end clamp assembly 500. As is shown in FIGS. 18A and 18B, the retaining member 522 is configured to be coupled to the clamping body 502 and the nut member 518 by the fastener member 550. Specifically, the retaining member 522 includes a rear extension 523 which sits within rear portion 534 and acts as a spring to urge the rear portion 534 away from the leg portion 512 of clamping body 502. The rear extension 523 includes a rear through-hole 524 sized and configured to allow the threaded shank 517 of fastener member 550 to pass therethrough. A front extension 536 extends between leg portion 512 and rear portion 534, spaced apart but coupled to the rear extension 523 by way of a curved portion 525. The front extension 536 includes a front through-hole 538, which is configured to substantially align with both the elongated opening 528 of clamping body 502 and the threaded opening 535 of nut member 518, thereby allowing the threaded shank 517 of fastener member 550 to pass therethrough. With this configuration, the front extension 536 and rear extension 534 may deflect relative to one another. In some embodiments, retaining member 522 is formed of an elastic material, such as, e.g., aluminum, steel, plastic, etc., thereby allowing retaining member 522 to return to its original shape when the fastener member is loosened.

As noted above, the retaining member 522 further includes a bottom retaining portion 539, with the bottom retaining portion 539 having an upwardly-angled lip 540 projecting from a distal end thereof. The bottom retaining portion 539 and/or the lip 540 are configured to enable retaining member 522 to support and at least partially retain the clamping body 502 relative to both the nut member 518 and the retaining member 522, even when the fastener member 550 is in a loosened state. As such, an installer can slide the entire hidden end clamp assembly 500 into a desired position along the rail prior to tightening of the fastener member 550 without concern for the various components of the hidden end clamp assembly 500 separating.

As is shown in FIG. 19A, when coupled to clamping body 502 and nut member 518 and secured to the rail 30, the fastener member 550 is disposed at an angle relative to the longitudinal axis of the rail 30. In this way, access to the fastener member 550 through an end opening of the rail 30 for, e.g., tightening/loosening by an installer is improved.

Next, referring to FIGS. 21-23B, a hidden end clamp assembly 2000 in accordance with another aspect of the present disclosure is illustrated. Similar to hidden end clamp assembly 500 described above, the hidden end clamp assembly 2000 is specifically configured to remain substantially unseen when mounted to a rail.

Figure 21:
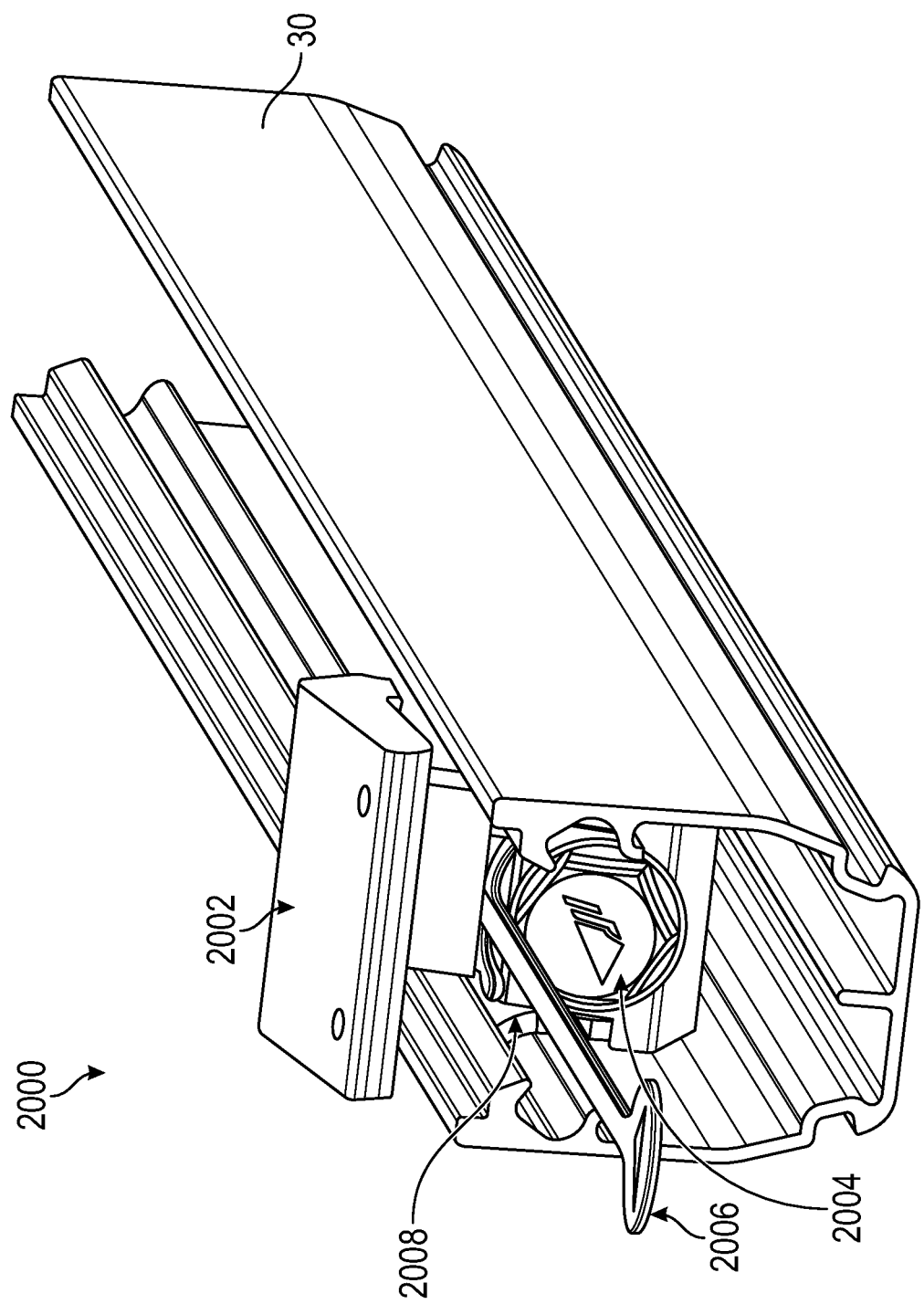
FIG. 21 is a top isometric view of a hidden end clamp assembly coupled to a rail in accordance with another aspect of the present disclosure.

Referring to FIGS. 21, hidden end clamp assembly 2000 is shown in a fully assembled state mounted to a rail 30. The hidden end clamp assembly 2000 includes a clamping body 2002, a nut member 2008, a tether 2006, and a fastener member 2004. The nut member 2008 is configured to slidably engage, e.g., the pair of elongated recesses 48A, 48B formed along the length of the rail 30 (shown in FIGS. 3A and 3B) or any pair of elongated recesses of any rail described herein. As will be described in further detail below, as the fastener member 2004 is tightened, the clamping body 2002 is configured to move downward relative to the nut member 2008. In this way, a top clamping portion 2024 of the clamping body 2002 (shown in FIGS. 22C and 23A) also moves downward, thereby providing a clamping force relative to a top surface of the rail 30. Accordingly, when a solar panel (not shown) is positioned over the rail 30, the top clamping portion 2024 can initially be positioned over a bottom portion of the solar panel frame. As the fastener member 2004 is tightened, this top clamping portion 2024 of clamping body 2002 is configured to slide downward onto the bottom portion of the solar panel frame, thereby acting to clamp and secure the solar panel frame to the rail 30.

Figure 22B:
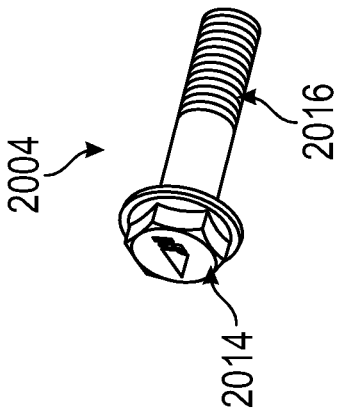
FIG. 22B is an isometric view of a clamping bolt of the hidden end clamp assembly of FIG. 21.
Figure 22D:
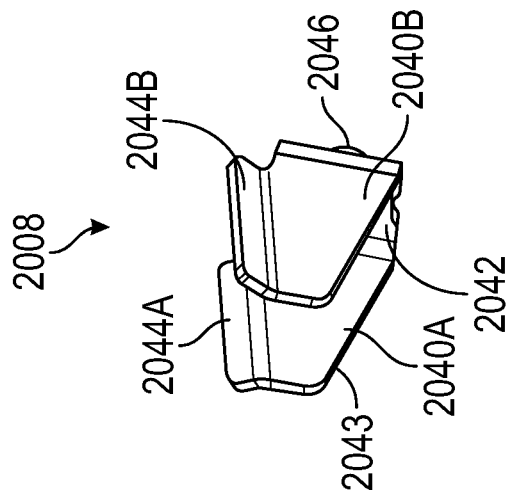
FIG. 22D is an isometric view of the connection nut portion of the hidden end clamp assembly of FIG. 21.
Figure 22A:
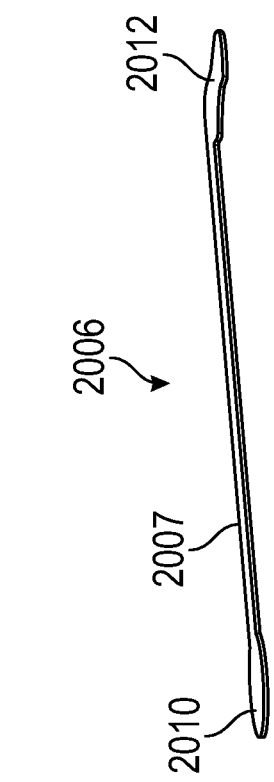
FIG. 22A is an isometric view of a tether of the hidden end clamp assembly of FIG. 21.
Figure 22C:
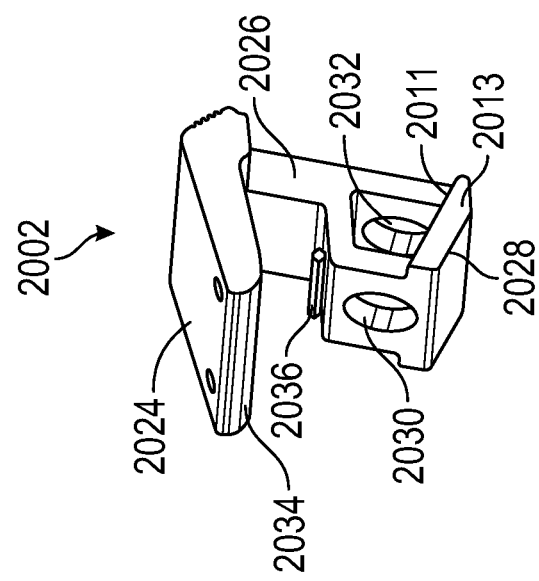
FIG. 22C is an isometric view of an upper clamping portion of the hidden end clamp assembly of FIG. 21.
Figure 23B:
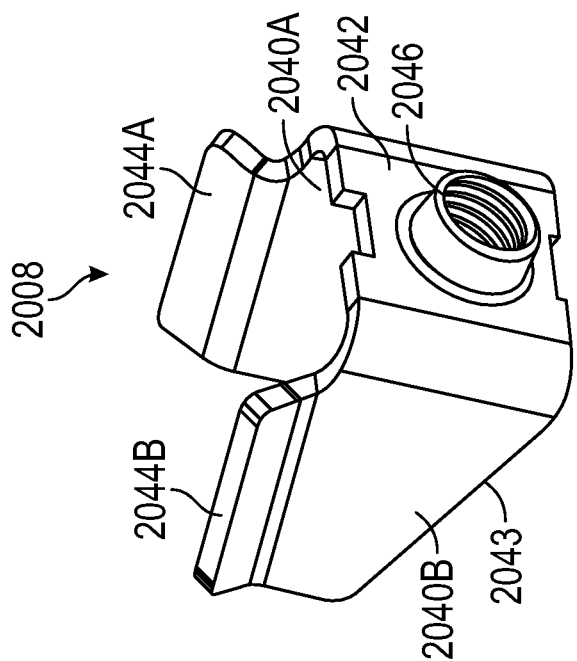
FIG. 23B is a rear isometric view of the connection nut portion of the hidden end clamp assembly of FIG. 21.
Figure 23A:
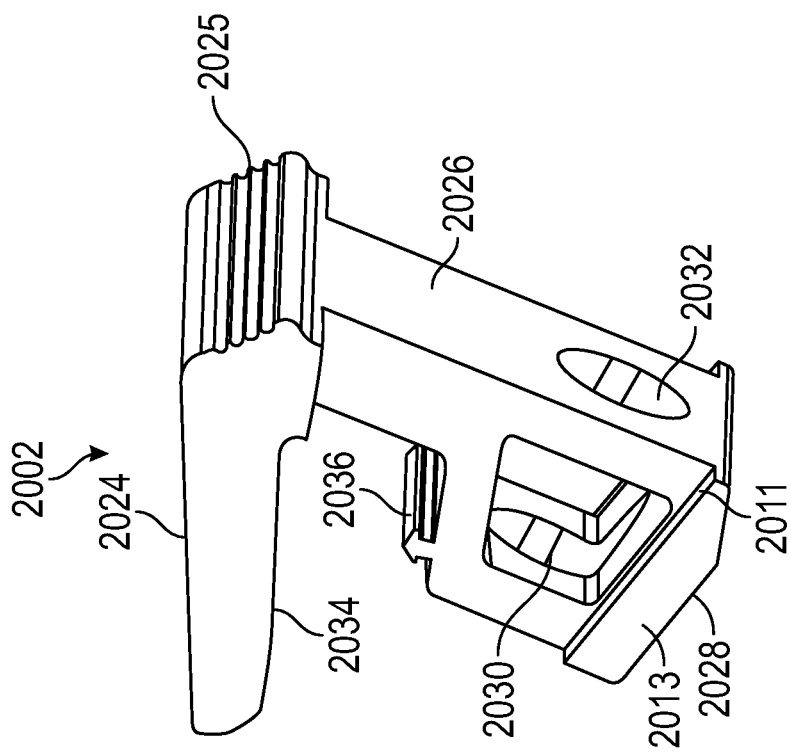
FIG. 23A is a rear isometric view of the upper clamping portion of the hidden end clamp assembly of FIG. 21.

Referring to FIGS. 22C and 23A, various details of clamping body 2002 according to an aspect of the present disclosure will be described. As noted above, clamping body 2002 includes a top clamping portion 2024, with top clamping portion 2024 having a lower clamping surface 2034. In some embodiments, one or more bonding pins or other piercing members may extend from the lower clamping surface 2034, with piercing members formed of an electrically conducting material and capable of at least partially penetrating a surface of a solar panel frame so as to provide electrical bonding. The clamping body 2002 itself may be formed of any appropriate material such as, e.g., aluminum, stainless steel, carbon steel, titanium, etc. However, it is to be understood that clamping body 2002 may be formed of any appropriate material, including non-metallic materials.

In some embodiments, a rear surface 2025 of top clamping portion 2024 may be provided with a plurality of parallel ribs or other textured features. The textured rear surface 2025 may provide added grip to a user when installing the hidden end clamp assembly 2000 and moving it into place with the clamping portion 2024 over the bottom portion of the solar panel frame member.

The clamping body 2002 further comprises a downwardly-extending leg portion 2026. The leg portion 2026 extends from lower clamping surface 2034 at an acute angle, thereby providing for an angled interface between the clamping body 2002 and the nut member 2008 when the hidden end clamp assembly 2000 is fully assembled. In part, this angled interface enables a downward clamping force to be applied by the clamping body 2002 to retain a solar panel frame surface relative to a rail, as will be described in further detail hereinbelow.

Referring still to FIGS. 22C and 23A, a distal end of the leg portion 2026 includes a base portion 2028, with base portion 2028 having a pair of elongated openings 2030, 2032 formed therethrough. The elongated openings 2030, 2032 are sized and configured so as to allow a threaded shank 2016 (shown in FIG. 22B) of the fastener member 2004 to pass therethrough. However, because elongated openings 2030, 2032 extend relative to a vertical axis of the base portion 2028, the clamping body 2002 is capable of linear movement relative to the same vertical axis.

A top surface of the base portion 2028 further includes an upwardly-extending, linear barb connector 2036. As will be described in further detail below, the barb connector 2036 is configured to provide a secure coupling point for a corresponding opening of the tether 2006. While the embodiment shown in FIGS. 22C and 23A shows a projecting barb connector 2036 of the clamping body 2002 to connect the tether to the hidden end clamp assembly 2000, it is understood that other connectors could be incorporated into the clamping body 2002 such as, e.g., a projection or recess configured to accept a correspondingly shaped and sized tether end.

Next, referring to FIGS. 22D and 23B, the nut member 2008 includes a pair of flanges 2040A, 2040B extending from a rear portion 2042. The flanges 2040A, 2040B are spaced apart so as to allow the base portion 2028 of clamping body 2002 to closely fit therebetween, with the flanges 2040A, 2040B flanking the respective side surfaces of the base portion 2028. Furthermore, the rear portion 2042 of nut member 2008 is angled to substantially match the angle of leg portion 2026 of clamping body 2002. The rear portion 2042 includes a threaded opening 2046, with the internal threads of threaded opening 2046 being configured to engage the external threads of threaded shank 2016 of fastener member 2004.

Additionally, the pair of flanges 2040A, 2040B comprise respective wing projections 2044A, 2044B, with each wing projection 2044A, 2044B angled outwardly relative to the flanges 2040A, 2040B. In this way, the wing projections 2044A, 2044B are configured to slidably interface with a pair of elongated recesses formed in a rail, thereby allowing the nut member 2008 to slide with respect to the rail. For example, in one embodiment, the wing projections 2044A, 2044B may slidably interface with the elongated recesses 48A, 48B formed along the length of rail 30 shown in FIGS. 3A and 3B.

In some embodiments, the wing projections 2044A, 2044B may include one or more piercing projections (not shown) extending therefrom. In some embodiments the top edge of the wing projections 2044A, 2044B may be sufficiently hard and sharp so as to penetrate at least a surface layer of, e.g., an interior surface of the elongated recesses of the rail when the fastener 2004 is fully tightened, thereby providing for an electrical bond between the nut member 2008 and the rail. Relatedly, in some embodiments, the nut member 2008 is formed of an electrically conducting material such as, e.g., aluminum, stainless steel, carbon steel, titanium, etc. However, in alternative embodiments, nut member 2008 may be formed of a non-electrically conducting material, including non-metallic material(s).

FIG. 22B illustrates the fastener member 2004. As disclosed above, the fastener member 2004 includes an at least partially threaded shank 2016 configured to threadingly engage with the threaded opening 2046 of the nut member 2008. Furthermore, the fastener member 2004 includes a drive head 2014, which may be configured as any appropriate drive head such as, e.g., a hexagonal drive head, etc.

FIG. 22A illustrates the tether 2006 of the hidden end clamp assembly 2000. The tether 2006 includes an elongated central portion, a pulling end portion 2010, and a coupling end portion 2012. While not shown, coupling end portion 2012 includes an opening sized and configured to tightly surround the barb connector 2036 of clamping body 2002. The tether 2006 may be formed of any appropriate material such as, e.g., rubber, plastic, etc.

Referring to FIG. 21, the tether 2006 is coupled to the clamping body 2002 such that at least the pulling end portion 2010 is accessible from an end of the rail 30 when the hidden end clamp assembly 2000 is initially positioned on/within the rail 30. Thus, the installer can utilize tether 2006 to pull the entire hidden end clamp assembly 2000 into a desired position relative to a solar panel frame (not shown) prior to tightening of the fastener member 2004. After the tether 2006 is pulled and the hidden end clamp assembly 2000 is in a desired position, the tether 2006 can be either be removed (via, e.g., cutting) or tucked into an open channel portion of the rail such that the tether 2006 does not interfere with, e.g., an end camp installed on the rail.

Referring still to FIGS. 21-23B, base portion 2028 of clamping body 2002 includes projecting side surfaces 2013 with angled top edges forming sloping ledges 2011. Nut member 2008 includes side flanges 2040A, 2040B with angled bottom edges forming sloping flange bottom surfaces 2043. As the fastener member 2004 is rotated clockwise to tighten and counterclockwise to loosen, the sloping flange bottom surfaces 2043 engage the sloping ledges 2011. As the fastener member 2004 is tightened, the rear portion 2042 is drawn closer to the leg portion 2026, the fastener member 2004 moves vertically within elongated openings 2030, 2032, the flanges 2040A, 2040B move across the sides of the base portion 2028, the sloping flange bottom surfaces 2043 ride along the sloping ledges 2011, the pair of wing projections 2044A, 2044B engage the recesses 27A, 27B and bottom surfaces of projections 25A, 25B, and, thus, the nut member 2008 is urged upward and the clamping body 2002 is urged downward in relation to one another. While the recesses 27A, 27B and the projections 25A, 25B are specific to rail 10, it is understood that the hidden end clamp 2000 may interact with the recesses and projections of any rail described herein.

Figure 24B:
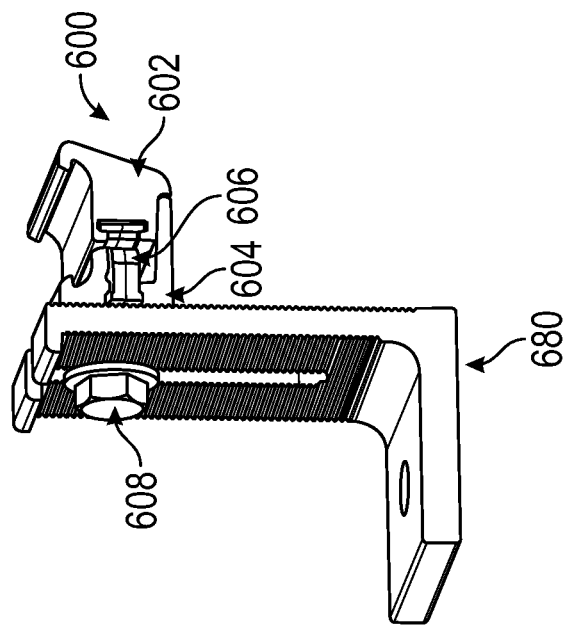
FIG. 24B is an isometric view of a rail mounting bracket assembly in accordance with another aspect of the present disclosure.
Figure 24A:
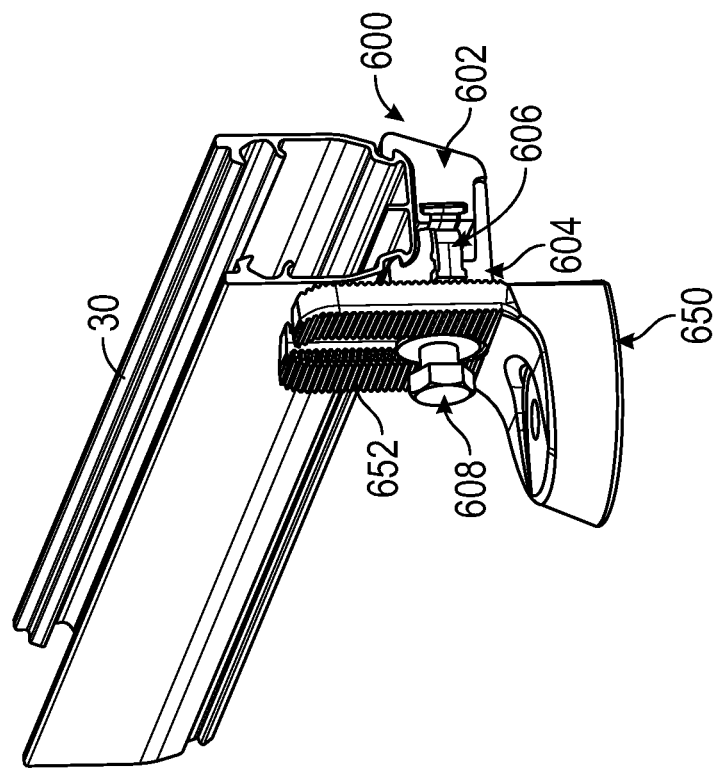
FIG. 24A is an isometric view of a rail mounting bracket assembly in accordance with an aspect of the present disclosure.

Next, referring to FIGS. 24A-26D, a rail attachment bracket assembly 600 in accordance with another aspect of the present disclosure is illustrated. As shown in FIG. 24A, the rail attachment bracket assembly 600 is configured to retain a rail (e.g., rail 30) relative to a mounting bracket 650, wherein the mounting bracket 650 is affixed to, e.g., a rooftop or other suitable surface, as is shown and described with respect to FIGS. 1A and 1B. While shown as an L-shaped bracket, it is to be understood that mounting bracket 650 is not limited to such a configuration and could be any appropriate mounting bracket suitable for retention of one or more rails. For example, referring to FIG. 24B, another type of L-shaped mounting bracket 680 may be utilized for the retention of rail attachment bracket 600. Additionally other mounting brackets for installation on various roof types including tile, slate, shake, metal shingle, membrane, sheet metal, corrugated, etc. are contemplated and included herein.

The rail attachment bracket assembly 600 comprises four primary components: a fastener member 608, a first clamp portion 604, a coupling member 606, and a second clamp portion 602. As will be discussed in further detail, these four components enable rail attachment bracket 600 to be height adjustable relative to the mounting bracket 650, couplable to the mounting bracket 650, and capable of securing a rail (e.g., rail 30).

Figure 25:
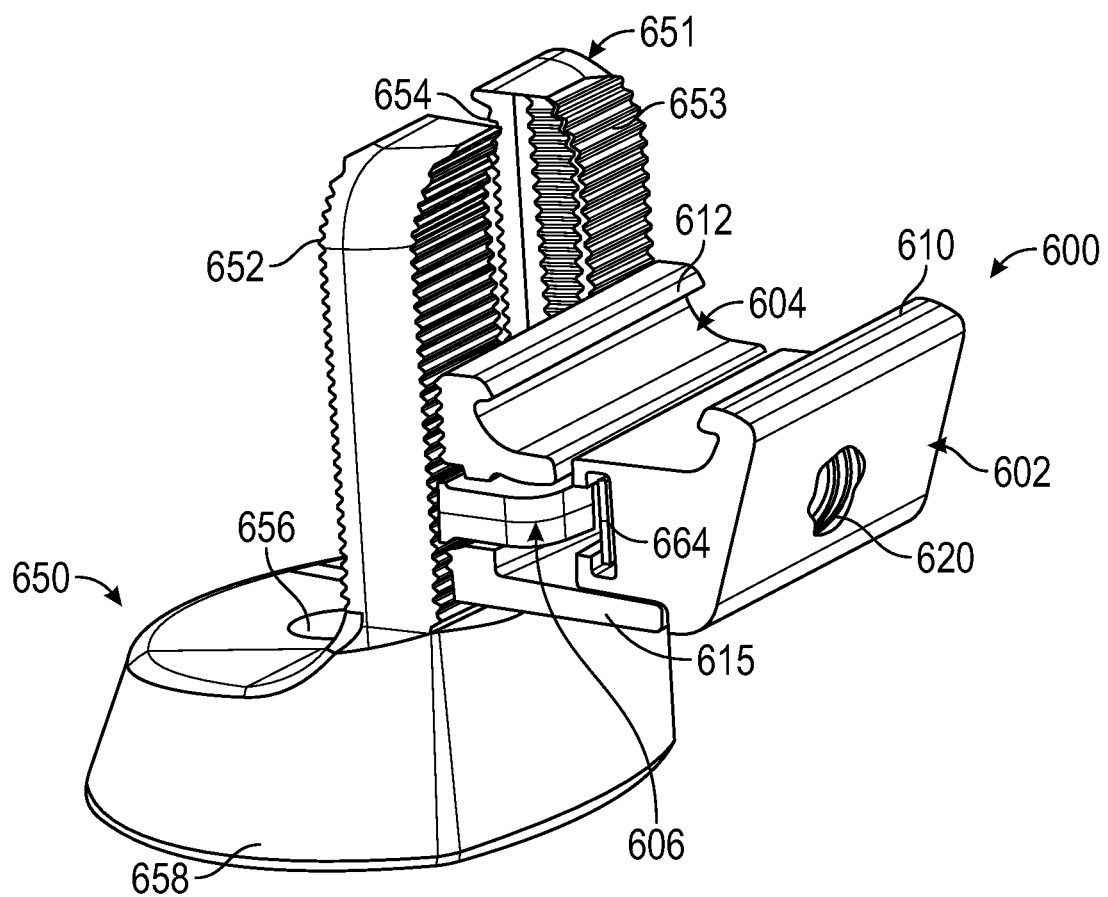
FIG. 25 is an isometric view of a rail attachment bracket coupled to a mounting bracket of the rail mounting bracket assembly of FIG. 24A.
Figure 26:
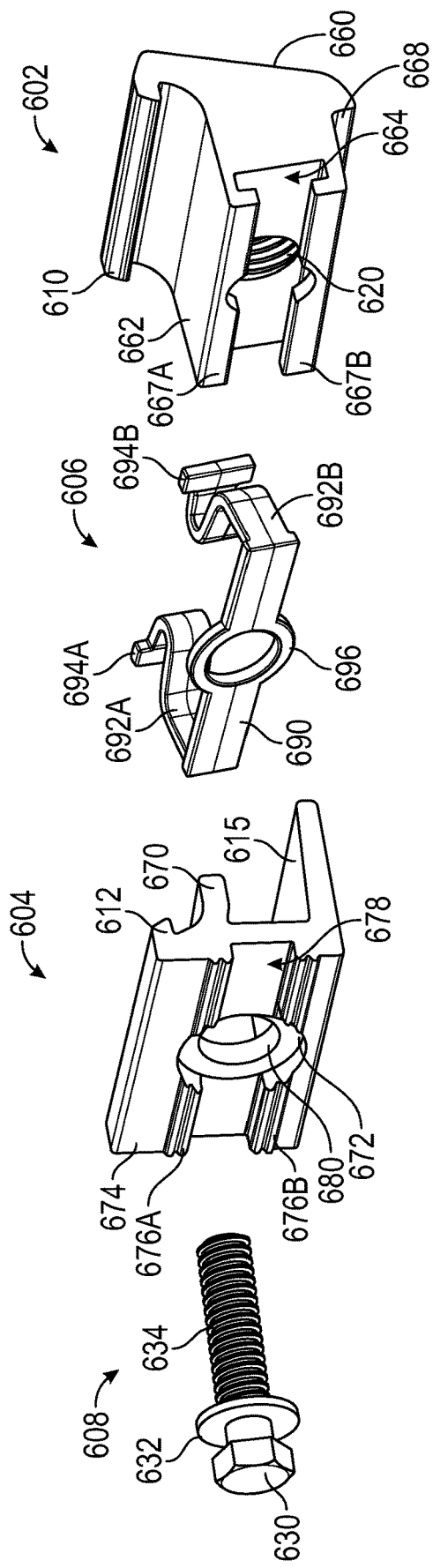
FIG. 26A is an isometric view of a bolt of the rail attachment bracket of FIG. 25.
FIG. 26B is an isometric view of a first clamp portion of the rail attachment bracket of FIG. 25.
FIG. 26C is an isometric view of a coupling member of the rail attachment bracket of FIG. 25.
FIG. 26D is an isometric view of a second clamp portion of the rail attachment bracket of FIG. 25.

Referring to FIG. 25, additional details regarding mounting bracket 650 in accordance with an aspect of the present disclosure are illustrated. Mounting bracket 650 includes a mounting base 658 having a mounting hole 656 passing therethrough, wherein the mounting hole 656 is sized and configured to receive an appropriate fastener such as, e.g., a screw, a lag bolt, etc. for affixing the mounting base 658 to, e.g., a rooftop. Extending upward from the mounting base 658 is an upwardly-extending leg 651. In the embodiment shown in FIG. 25, the upwardly-extending leg 651 that forms a pair of members extending from opposing sides of the mounting base 658, which in turn forms an aperture 654 therebetween. As shown in FIG. 24A, the aperture 654 is sized and configured to accommodate at least a portion of the shank of the fastener member 608 of the rail attachment bracket assembly 600 such that a rail (e.g., rail 30) can be selectively coupled to the mounting bracket 650. The aperture 654 is sized so as to allow for vertical height adjustment of the rail attachment bracket assembly 600 along the leg 651.

Additionally, referring to FIG. 25, it is to be understood that one or both of the pair of members of the leg 651 may include a plurality of first horizontal ridges 652 extending along an inner face thereof and/or a plurality of second horizontal ridges 653 extending along an outer face thereof. As will be described in further detail below, these horizontal ridges 652 or 653 act to retain the rail attachment bracket 600 (specifically the first clamp portion 604) more securely when tightened against the leg 651. As horizontal ridges 652, 653 are provided on opposing sides of the leg 651, rail attachment bracket 600 is capable of being couplable on either side of the leg 651, providing for a more customizable mounting configuration dependent upon varying factors such as roof size, mount location in relation to solar panel mounting area, aesthetic considerations, etc.

Referring now to FIGS. 26A-26D, the various individual components of rail attachment bracket 600 will be described in greater detail. First, FIG. 26A illustrates a fastener member 608 which includes a threaded shank 634, a drive head 630, and a washer portion 632. In some embodiments, the washer portion 632 is unitarily formed with the drive head 630. However, in other embodiments, the washer portion 632 may be a separate component, but may be captured through any appropriate method so as not to travel down the threaded shank 634. The drive head 630 shown in FIG. 26A is a hexagonal drive head, but it is to be understood that any appropriate drive head may be utilized.

Next, referring to FIG. 26B, first clamp portion 604 of rail attachment bracket assembly 600 is shown in greater detail. First clamp portion 604 includes an elongated upper extension 612 which may run along the entire length of clamp portion 604. Upper extension 612 is configured to provide a hook-like interface with, e.g., a channel 24A, 44A, 64A of rail 10, 30, 50 respectively when the rail 10, 30, 50 is coupled to the rail attachment bracket 600 (as shown in FIG. 24A). First clamp portion 604 also includes an upper base portion 670 which extends laterally to provide a support surface for the bottom surface of a rail coupled thereto (e.g., exterior bottom surface 38 of rail 30 shown in FIGS. 3A and 3B). Below the upper base portion 670, a lower base portion 615 also extends laterally, with the lower base portion 615 having a greater width than the upper base portion 670. As shown in FIGS. 24A and 25, the lower base portion 615 is configured to provide both a travel limit and a lower support surface between the first clamp portion 604 and the second clamp portion 602.

Referring still to FIG. 26B, first clamp portion 604 includes a rear surface 674. Rear surface 674 is configured as a substantially vertical face to allow for proper mating with leg 651 of the mounting bracket 650. Specifically, rear surface 674 is configured to include a plurality of horizontally-extending corrugations 676A, 676B which are sized and spaced so as to mate with one or both of the plurality of first horizontal ridges 652 extending along an inner face of the leg 651 and/or a plurality of second horizontal ridges 653 extending along an outer face of the leg 651. In this way, corrugations 676A, 676B enable the first clamp portion 604 to engage with the leg 651 more securely, while also allowing for vertical adjustment of the height of the rail attachment bracket 600 with respect to the leg 651.

As shown in FIG. 26B, the respective corrugations 676A, 676B are positioned above and below a through-hole 680 formed in the first clamp portion 604, with the through-hole 680 providing for passage of the threaded shank 634 of the fastener member 608. However, it is to be understood that more or fewer corrugations may be provided on rear surface 674. Additionally, the respective corrugations 676A, 676B are formed on opposite sides of a groove 678 formed in the rear surface 674. As will be described below in further detail with respect to FIG. 26C, the groove 678 is sized and shaped to accommodate and at least partially support portions of the coupling member 606.

With reference to FIG. 26D, the second clamp portion 602 is illustrated in further detail. Similar to first clamp portion 604, second clamp portion 602 includes an elongated upper extension 610 which may run along the entire length of clamp portion 602. Upper extension 610 is configured to provide a hook-like interface with, e.g., a channel 44B of rail 30 when the rail 30 is coupled to the rail attachment bracket 600 (as shown in FIG. 24A). Second clamp portion 602 also includes an upper base portion 662 which extends laterally to provide a support surface for the bottom surface of a rail coupled thereto (e.g., exterior bottom surface 38 of rail 30 shown in FIGS. 3A and 3B).

Second clamp portion 602 further includes a rear surface 660. In the embodiment shown in FIG. 26D, rear surface 660 is angled so as to substantially match the angle/contour of at least a portion of the rail when coupled thereto. However, it is to be understood that rear surface 660 need not be angled in such a manner. At a bottom portion of the second clamp portion 602, an abutment surface 668 is provided. Abutment surface 668 provides a stop or limit surface for the lower base portion 615 of the first clamp portion 604 when the rail attachment bracket 600 is assembled and tightened on a rail.

Referring still to FIG. 26D, the second clamp portion 602 also includes a substantially T-shaped slot 664 formed between respective inner surfaces 667A, 667B, with the T-shaped slot 664 sized and configured to accommodate and engage portions of the coupling member 606. A threaded hole 620 is also formed through the second clamp portion 602, with the internal threads of threaded hole 620 configured to engage with the external threads of the threaded shank 634 of fastener member 608. In this way, the second clamp portion 602 acts essentially as a nut member of the rail attachment bracket 600, capable of being drawn toward the first clamp portion 604 and the mount guide when the fastener member 608 is tightened to provide a clamping force for securement of the rail.

Referring once again to FIG. 26C, the coupling member 606 of rail attachment bracket 600 is shown in greater detail. Coupling member 606 includes a support portion 690 and a pair of resilient arms 692A, 692B extending from opposite ends of support portion 690. The support portion 690 is sized and shaped so as to fit within the groove 678 on the rear surface 674 of first clamp portion 604, as described above with respect to FIG. 26B. Additionally, a central region of the support portion 690 includes a ring 696 having a through-hole, with the through-hole sized to allow the threaded shank 634 of the fastener member 608 to pass through the through-hole of the ring in support portion 690. The ring 696 is also sized and configured to fit within a substantially annular recess 672 formed in the rear surface 674 of the first clamp portion 604 when the coupling member 606 is mated with the first clamp portion 604.

As is shown in FIG. 26C, the resilient arms 692A, 692B are configured to include an S-bend to allow for accordion-like elastic deformation relative to the support portion 690. Furthermore, each resilient arm 692A, 692B includes a respective T-shaped head portion 694A, 694B. The T-shaped head portions 694A, 694B are sized and configured to fit within the slot 664 of the second clamp portion 602 so as to engage the coupling member 606 with the second clamp portion 602.

Referring also to FIGS. 24A and 25, the resilient arms 692A, 692B of coupling member 606 are shown to wrap around the respective ends of first clamp portion 604, with the T-shaped head portions 694A, 694B engaging with the slot 664 of second clamp portion 602. In this way, coupling member 606 movably couples first clamp portion 604 and second clamp portion 602 to one another. The resilient arms 692A, 692B are preloaded to provide limited separation between the first clamp portion 604 and second clamp portion 602 when the fastener member 608 is in a loosened state, thereby inherently providing limited separation between the respective upper extensions 610, 612 such that the rail 30 can be more easily inserted into or removed from the rail attachment bracket 600. As the rail (e.g. rail 30) is pushed downward onto the rail attachment bracket 600 and into the space between the upper extensions 610, 612, the first clamp portion 604 and the second clamp portion 602 are forced to separate and allowed to separate by the flexibility of the resilient arms 692A, 692B. This separation continues until the extensions 610, 612 snap into the channels 44A and 44B, at which point the resilient arms 692A, 692B pull the first clamp portion 604 and the second clamp portion 602 back to the preloaded limited separation position. This effectively holds the rail (e.g. rail 30) in a loosely coupled arrangement with the mounting bracket 650 until the fastener member 608 is tightened and the rail is securely connected to the rail attachment bracket 600 and the mounting bracket 650. However, when the fastener member 608 is sufficiently tightened, the resilient arms 692A, 692B compress so as to allow the second clamp portion 602 to move closer to the first clamp portion 604, thereby providing a clamping force on the base of the rail 30 via the respective upper extensions 610, 612 to secure the rail 30 to the mounting bracket 650.

In one embodiment, both the first clamp portion 604 and the second clamp portion 602 are formed of an electrically conducting material such as, e.g., aluminum, stainless steel, carbon steel, titanium, etc. Furthermore, in one embodiment, the coupling member 606 may be formed of a non-metallic material such as, e.g., plastic. However, in other embodiments, it is to be understood that one or both of first clamp portion 604 and second clamp portion 602 may be formed of a one or more different materials, including non-metallic materials, and the coupling member 606 is not limited to non-metallic materials and may be formed of, e.g., aluminum, steel, titanium, etc.

Figure 27:
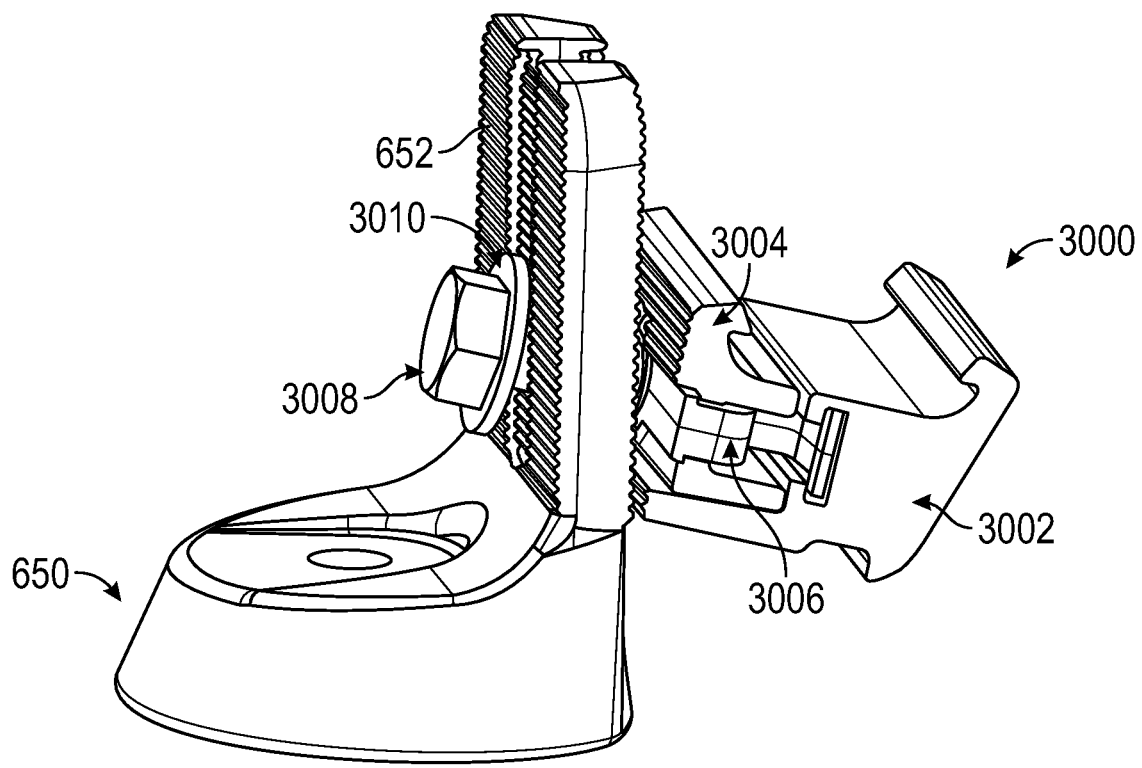
FIG. 27 is an isometric view of a rail attachment bracket in accordance with another aspect of the present disclosure.

Next, referring to FIGS. 27-28E, a rail attachment bracket 3000 in accordance with another aspect of the present disclosure is illustrated. As shown in FIG. 27, the rail attachment bracket 3000 is configured to retain a rail (not shown) relative to a mounting bracket 650, wherein the mounting bracket 650 is affixed to, e.g., a rooftop or other suitable surface, as is shown and described with respect to FIGS. 1A and 1B. While shown as an L-shaped bracket, it is to be understood that mounting bracket 650 is not limited to such a configuration and could be any appropriate mounting bracket suitable for retention of one or more rails. For example, referring to FIG. 24B, another type of L-shaped mounting bracket 680 may be utilized for the retention of rail attachment bracket 600.

Similar to rail attachment 600 described above with respect to FIGS. 24A-26D, rail attachment bracket 3000 comprises four primary components: a fastener member 3008, a first clamp portion 3004, a coupling member 3006, and a second clamp portion 3002. As will be discussed in further detail, these four components enable rail attachment bracket 3000 to be height adjustable relative to the mounting bracket 650, couplable to the mounting bracket 650, and capable of securing a rail. As mounting bracket 650 is described in detail above, the details of mounting bracket 650 will not be reiterated herein.

Referring now to FIGS. 28A-28E, the various individual components of rail attachment bracket 3000 will be described in greater detail. First, FIG. 28A illustrates a fastener member 3008 which includes a threaded shank 3034 and a drive head 3030. Additionally, FIG. 28B illustrates a washer 3010, which is configured to allow the threaded shank 3034 to pass therethrough. In the embodiments shown in FIGS. 28A and 28B, the washer 3010 is a separate component from fastener member 3008. However, in other embodiments, the washer 3010 may be unitarily formed with the drive head 3030. The drive head 3030 shown in FIG. 28A is a hexagonal drive head, but it is to be understood that any appropriate drive head may be utilized.

Next, referring to FIG. 28C, first clamp portion 3004 of rail attachment bracket 3000 is shown in greater detail. First clamp portion 3004 includes an elongated upper extension 3012 which may run along the entire length of clamp portion 3004. Upper extension 3012 is configured to provide a hook-shaped interface with a channel of a rail when the rail is coupled to the rail attachment bracket 3000. First clamp portion 3004 also includes an upper base portion 3070 which extends laterally to provide a support surface for the bottom surface of a rail coupled thereto. Below the upper base portion 3070, a lower base portion 3015 also extends laterally, with the lower base portion 3015 having a lesser width than the upper base portion 3070. As is shown in FIG. 27, and as will be described in further detail below, the lower base portion 3015 is configured to allow a portion of the second clamp portion 3002 to pass thereunder.

Referring still to FIG. 28C, first clamp portion 3004 includes a rear surface 3078. Rear surface 3078 is configured as a substantially vertical face to allow for proper mating with guide 651 of the mounting bracket 650. Specifically, rear surface 3078 is configured to include a plurality of horizontally-extending corrugations 3076 which are sized and spaced so as to mate with one or both of the plurality of first horizontal ridges 652 extending along an inner face of the guide 651 and/or a plurality of second horizontal ridges 653 extending along an outer face of the guide 651. In this way, corrugations 3076 enable the first clamp portion 3004 to engage with the guide 651 more securely, while also allowing for vertical adjustment of the height of the rail attachment bracket 3000 with respect to the guide 651.

As shown in FIG. 28C, the corrugations 3076 are positioned substantially above a through-hole 3072 formed in the first clamp portion 3004, with the through-hole 3072 providing for passage of the threaded shank 3034 of the fastener member 3008. However, it is to be understood that more or fewer corrugations may be provided on rear surface 3078. Additionally, as will be described in further detail below, the rear surface 3078 not having corrugations 3076 is sized and shaped to accommodate and at least partially support portions of the coupling member 3006.

With reference to FIG. 28E, the second clamp portion 3002 is illustrated in further detail. Similar to first clamp portion 3004, second clamp portion 3002 includes an elongated upper extension 3011 which may run along the entire length of clamp portion 3002. Upper extension 3011 is configured to provide a hook-like interface with a channel of a rail when the rail is coupled to the rail attachment bracket 3000. Second clamp portion 3002 also includes an upper base portion 3062 which extends laterally to provide a support surface for the bottom surface of a rail coupled thereto.

Second clamp portion 3002 further includes a rear surface 3060. In the embodiment shown in FIG. 28E, rear surface 3060 is angled so as to substantially match the angle/contour of at least a portion of the rail when coupled thereto. However, it is to be understood that rear surface 3060 need not be angled in such a manner.

Second clamp portion 3002 also includes an elongated lower portion 3068. As shown in FIG. 27, the elongated lower portion 3068 extends below the lower base portion 3015 of the first clamp portion 3004 so as to provide a supporting surface for the lower base portion 3015. Furthermore, a distal end of the elongated lower portion 3068 includes at least one corrugation 3080 extending therefrom. Similar to corrugations 3076 described above, the at least one corrugation 3080 is configured to mate with the guide 651 of the mounting bracket 650. Thus, unlike rail attachment bracket 600 described above, which was only configured such that the first clamp portion 604 mated with the guide 651, the rail attachment bracket 3000 is configured such that both the first clamp portion 3002 and the second clamp portion 3004 mate with the guide 651. While only one corrugation 3080 is shown in FIG. 28E, it is to be understood that more than one corrugation may be utilized on elongated lower portion 3068.

Referring still to FIG. 28E, the second clamp portion 3002 also includes a substantially T-shaped slot 3064 formed between respective inner surfaces 3067A, 3067B, with the T-shaped slot 3064 sized and configured to accommodate and engage portions of the coupling member 3006. A threaded hole 3020 is also formed through the second clamp portion 3002, with the internal threads of threaded hole 3020 configured to engage with the external threads of the threaded shank 3034 of fastener member 3008. In this way, the second clamp portion 3002 acts essentially as a nut member of the rail attachment bracket 3000, capable of being drawn toward the first clamp portion 3004 when the fastener member 3008 is tightened to provide a clamping force for securement of the rail.

Referring once again to FIG. 28D, the coupling member 3006 of rail attachment bracket 3000 is shown in greater detail. Coupling member 3006 includes a support portion 3090 and a pair of resilient arms 3092A, 3092B extending from opposite ends of support portion 3090. The support portion 3090 is sized and shaped so as to fit on the rear surface 3078 of first clamp portion 3004, as described above with respect to FIG. 28C. Additionally, a central region of the support portion 3090 includes a ring 3096 having a through-hole, with the through-hole sized to allow the threaded shank 3034 of the fastener member 3008 to pass through-hole.

As is shown in FIG. 28D, the resilient arms 3092A, 3092B are configured to include an S-bend to allow for accordion-like elastic deformation relative to the support portion 3090. Furthermore, each resilient arm 3092A, 3092B includes a respective T-shaped head portion 3094A, 3094B. The T-shaped head portions 3094A, 3094B are sized and configured to fit within the slot 3064 of the second clamp portion 3002 so as to engage the coupling member 3006 with the second clamp portion 3002.

Referring also to FIGS. 27 and 28D, the resilient arms 3092A, 3092B of coupling member 3006 are shown to wrap around the rear surface 3078 of first clamp portion 3004, with the T-shaped head portions 3094A, 3094B engaging with the slot 3064 of second clamp portion 3002. In this way, coupling member 3006 movably couples first clamp portion 3004 and second clamp portion 3002 to one another. Each resilient arm 3092A, 3092B may further include a curved retaining tab 3095A, 3095B, respectively, with curved retaining tabs 3095A, 3095B providing a deflectable surface for an improved press-fit coupling between the coupling member 3006 and the rear surface 3078 of the first clamp portion 3004.

The resilient arms 3092A, 3092B are preloaded to provide limited separation between the first clamp portion 3004 and second clamp portion 3002 when the fastener member 3004 is in a loosened state, thereby inherently providing separation between the respective upper extensions 3011, 3012 such that the base of a rail can be more easily inserted into or removed from the rail attachment bracket 3000. As the rail (e.g., rail 30) is pushed downward onto the rail attachment bracket 3000 and into the space between the upper extensions 3011, 3012, the first clamp portion 3004 and the second clamp portion 3002 are forced to separate and allowed to separate by the flexibility of the resilient arms 3092A, 3092B. This separation continues until the extensions 3011, 3012 snap into the channels 44A and 44B, at which point the resilient arms 3092A, 3092B pull the first clamp portion 3004 and the second clamp portion 3002 back to the preloaded limited separation position. This effectively holds the rail (e.g., rail 30) in a loosely coupled arrangement with the mounting bracket 650 until the fastener member 3008 is tightened and the rail is securely connected to the rail attachment bracket 3000 and the mounting bracket 650. However, when the fastener member 3008 is sufficiently tightened, the resilient arms 3092A, 3092B compress so as to allow the second clamp portion 3002 to move closer to the first clamp portion 3004, thereby providing a clamping force on the base of the rail 30 via the respective upper extensions 3011, 3012 to secure the rail 30 to the mounting bracket 650. When the fastener member 3008 is sufficiently tightened, the resilient arms 3092A, 3092B compress so as to allow the second clamp portion 3002 to move closer to the first clamp portion 3004, thereby providing a clamping force on the base of the rail via the respective upper extensions 3011, 3012 to secure the rail to the mounting bracket 650.

In one embodiment, both the first clamp portion 3004 and the second clamp portion 3002 are formed of an electrically conducting material such as, e.g., aluminum, stainless steel, carbon steel, titanium, etc. Furthermore, in one embodiment, the coupling member 3006 may be formed of a non-metallic material such as, e.g., plastic. However, in other embodiments, it is to be understood that one or both of first clamp portion 3004 and second clamp portion 3002 may be formed of a one or more different materials, including non-metallic materials, and the coupling member 3006 is not limited to non-metallic materials and may be formed of, e.g., aluminum, steel, titanium, etc.

Figure 29B:
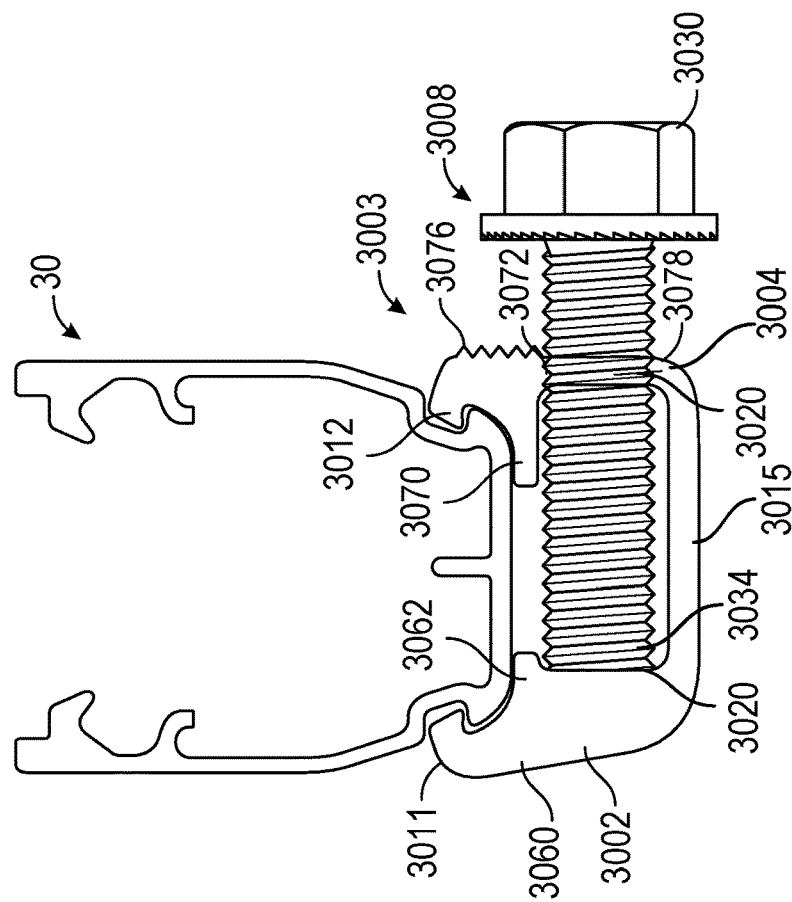
FIG. 29B is a side cut away view of the one piece rail attachment bracket of FIG. 29A.
Figure 29A:
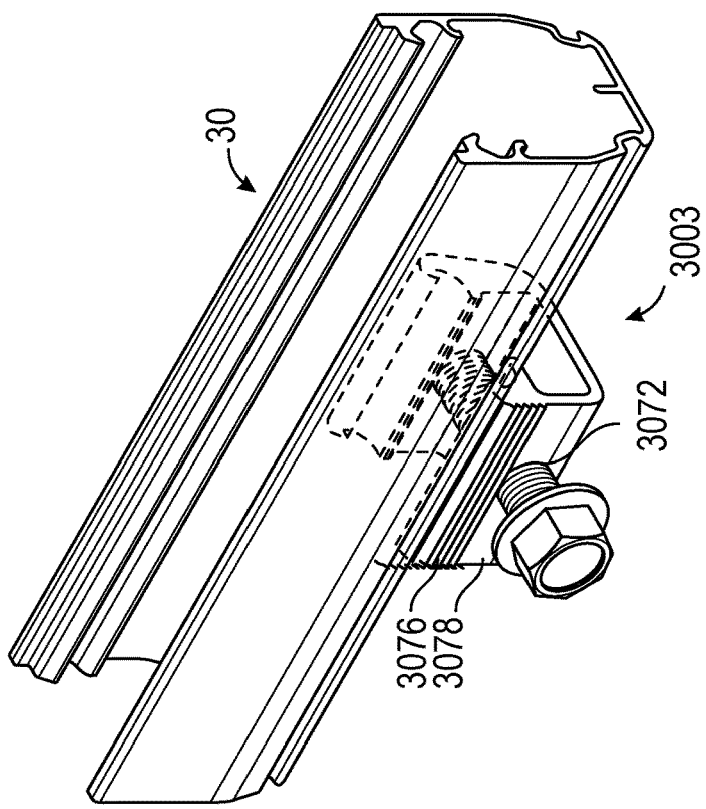
FIG. 29A is an isometric view of a one piece rail attachment bracket.

In another embodiment, referring to FIGS. 29A-29B, the first clamp portion 3004 and the second clamp portion 3002 are formed together as a single clamp portion 3003. The first clamp portion 3004 includes a rear surface 3078. Rear surface 3078 is configured as a substantially vertical face to allow for proper mating with guide 651 of the mounting bracket 650. Specifically, rear surface 3078 is configured to include a plurality of horizontally-extending corrugations 3076 which are sized and spaced so as to mate with one or both of the plurality of first horizontal ridges 652 extending along an inner face of the guide 651 and/or a plurality of second horizontal ridges 653 extending along an outer face of the guide 651. In this way, corrugations 3076 enable the first clamp portion 3004 to engage with the guide 651 more securely, while also allowing for vertical adjustment of the height of the single clamp portion 3003 with respect to the guide 651. The corrugations 3076 are positioned substantially above a through-hole 3072 formed in the first clamp portion 3004, with the through-hole 3072 providing for passage of the threaded shank 3034 of the fastener member 3008. However, it is to be understood that more or fewer corrugations may be provided on rear surface 3078. Additionally, as will be described in further detail below, the rear surface 3078 not having corrugations 3076 is sized and shaped to accommodate and at least partially support portions of the coupling member 3006. Although not shown in FIG. 29A or 29B, coupling member 3006 may be used in the embodiment with the single clamp portion 3003. The first clamp portion 3004 includes an elongated upper extension 3012 which may run along the entire length of clamp portion 3004. Upper extension 3012 is configured to provide a hook-shaped interface with a channel of a rail when the rail is coupled to the single clamp portion 3003. First clamp portion 3004 also includes an upper base portion 3070 which extends laterally to provide a support surface for the bottom surface of a rail coupled thereto. Below the upper base portion 3070, a lower base portion 3015 also extends laterally, with the lower base portion 3015 having a lesser width than the upper base portion 3070.

Similar to first clamp portion 3004, second clamp portion 3002 includes an elongated upper extension 3011 which may run along the entire length of clamp portion 3002. Upper extension 3011 is configured to provide a hook-like interface with a channel of a rail when the rail is coupled to the single clamp portion 3003. Second clamp portion 3002 also includes an upper base portion 3062 which extends laterally to provide a support surface for the bottom surface of a rail coupled thereto. The second clamp portion 3002 further includes a rear surface 3060. The rear surface 3060 may be angled so as to substantially match the angle/contour of at least a portion of the rail when coupled thereto. However, it is to be understood that rear surface 3060 need not be angled in such a manner. The second clamp portion 3002 connects and is adjoined to the first clamp portion 3004 by the lower base portion 3015. The single clamp portion 3003 is configured such that the first clamp portion 3002 mates with the guide 651.

Referring still to FIGS. 29A and 29B, a threaded hole 3020 is also formed through the first end clamp portion 3004 and second clamp portion 3002, with the internal threads of threaded hole 3020 configured to engage with the external threads of the threaded shank 3034 of fastener member 3008. In this way, the second clamp portion 3002 acts essentially as a nut member of the single clamp portion 3003, capable of being drawn toward the first clamp portion 3004 when the fastener member 3008 is tightened to provide a clamping force for securement of the rail.

Figure 30A:
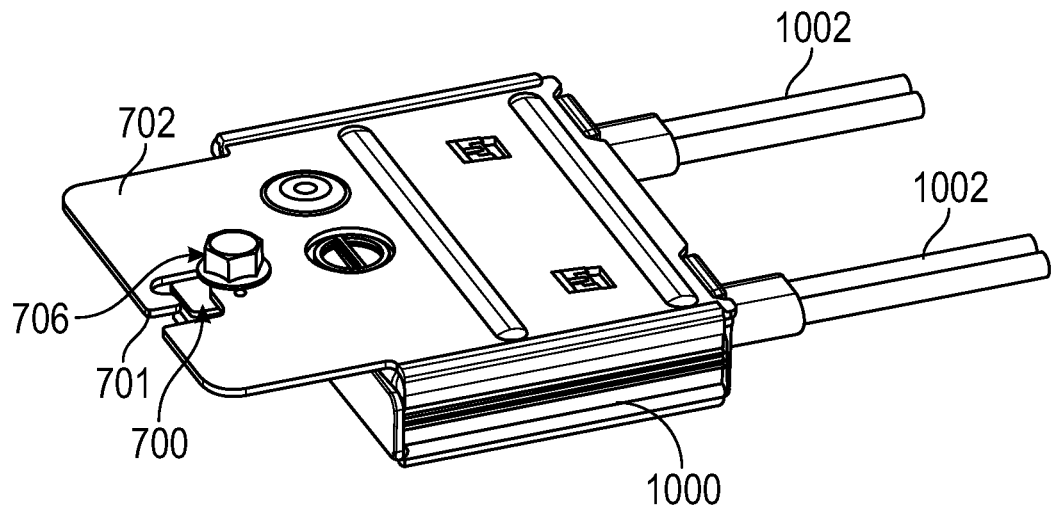
FIG. 30A is a top isometric view of a module-level power electronics (MLPE) mount assembly coupled to a MLPE in accordance with an aspect of the present disclosure.
Figure 30B:
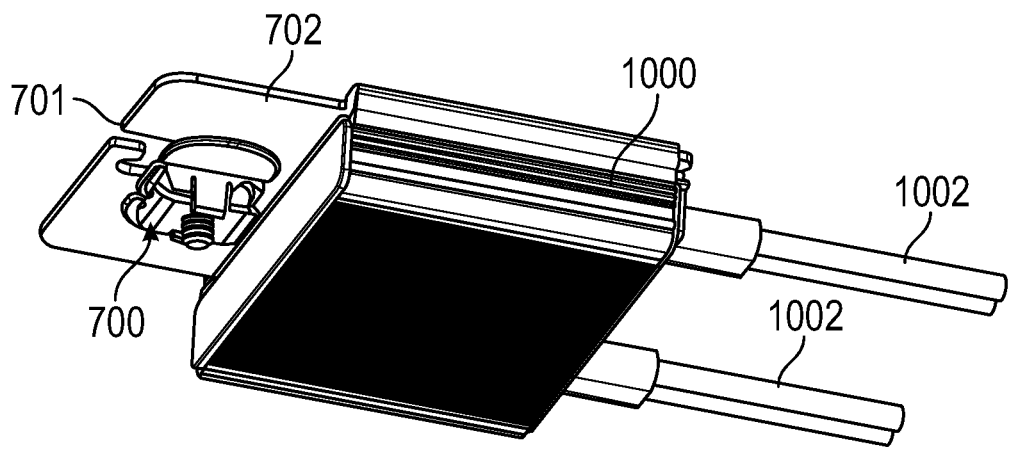
FIG. 30B is a bottom isometric view of the MLPE mount assembly coupled to a MLPE of FIG. 29A.
Figure 31A:
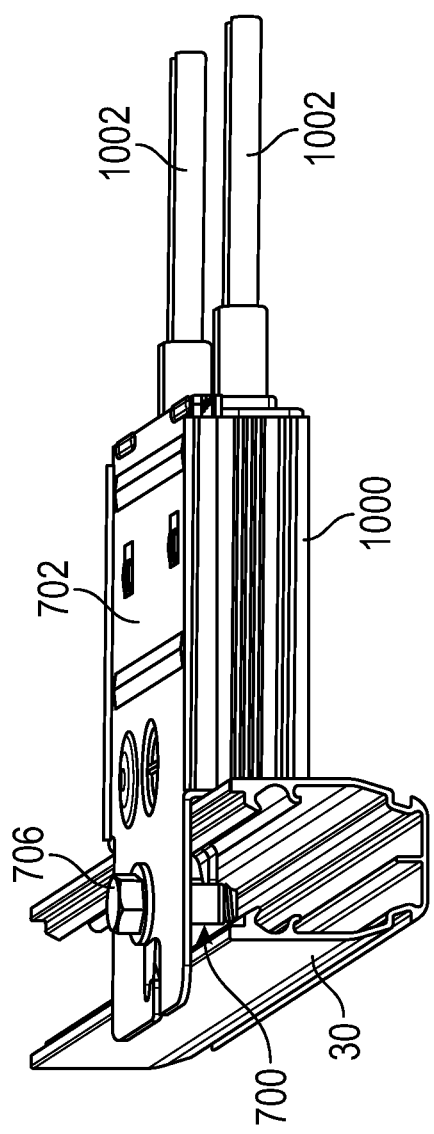
FIG. 31A is an isometric view of the MLPE mount assembly coupled to a MLPE of FIGS. 29A-29B coupled to a rail in accordance with an aspect of the present disclosure.
Figure 31B:
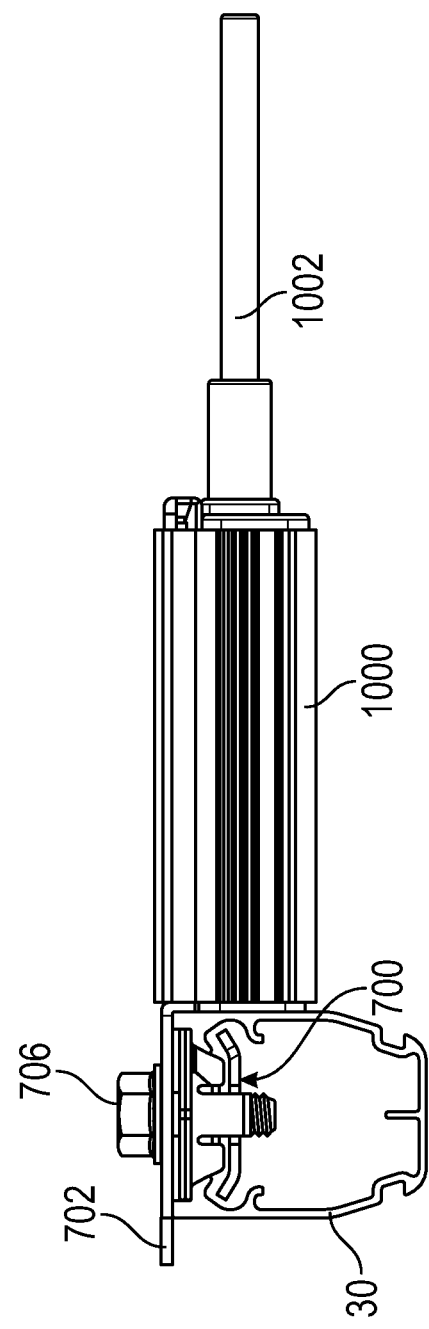
FIG. 31B is an end view of the MLPE mount assembly coupled to a MLPE of FIGS. 29A-29B coupled to a rail in accordance with an aspect of the present disclosure.

Next, referring to FIGS. 30A-30B, various features of a module-level power electronics (MLPE) mount assembly in accordance with an aspect of the present disclosure. First, as is shown in FIGS. 30A-30B, an MLPE mounting clamp 700 is coupled to a mounting plate 702, with the mounting plate 702 configured to retain an electronic auxiliary component 1000 relative to a rail (e.g., rail 30, as shown in FIGS. 31A and 31B). However, in some embodiments, mounting plate 702 and electronic auxiliary component 1000 are not separate components, as the mounting plate may be integrated into the (and form an extension of) the housing/body of the electronic auxiliary component 1000. In some embodiments, the electronic auxiliary component 1000 may include a plurality of cables or conduits 1002 extending therefrom. Examples of such electronic auxiliary components are one or more of, e.g., an electronic inverter, an electronic information-processing unit (optimizer), an electrical junction box, etc., the details of which are known in the art and will not be described further herein.

The mounting plate 702 may include a slot 701 formed therein, with the slot 701 sized and configured to provide an interface between a fastener member 706 of the MLPE mounting clamp 700 and the mounting plate 702. As will be described in further detail below, the MLPE mounting clamp 700 is configured to provide a clamping interface between the mounting plate 702 and a rail so as to securely mount an electronic auxiliary component 1000 to the rail.

Referring to FIGS. 32A-32B, details of the MLPE mounting clamp 700 in accordance with an aspect of the present disclosure are shown. MLPE mounting clamp 700 comprises an upper mounting support 720, a lower nut member 730, and a fastener member 706. The upper mounting support 720 includes a pair of opposing support wings 722A, 722B extending from a central portion 723. As is shown in FIG. 30B, the support wings 722A, 722B are configured to provide a relatively large support surface on an underside of the mounting plate 702. Furthermore, the support wings 722A, 722B are configured to fold upwards via a respective living hinge 729A, 729B, thereby allowing support wings 722A, 722B to act as a handle or grip for eased installation of the MLPE mounting clamp 700. That is, the folded up support wings 722A, 722B allow a user to hold the mounting clamp 700, align the mounting clamp 700 in a first orientation, insert the mounting clamp 700 into the rail opening and into a first position within the rail, and rotate the MLPE mounting clamp 700 into a second position within the rail. The support wings 722A, 722B can then be folded back down to a substantially flat position below the upper top surfaces 49A, 49B and the plate 702 of the MLPE.

A through-hole 726 is provided in the central portion 723 to allow a threaded shank 712 of the fastener member 706 to pass therethrough. Additionally, between the opposing support wings 722A, 722B, opposing edge regions of the central portion 723 extend outwardly from the central portion 723 and include support tabs 724A, 724B. As shown in FIG. 28B, when the mounting clamp 700 is in the second position, these support tabs 724A, 724B may rest atop the ledge surfaces of the rail, regardless of whether the MLPE mounting clamp 700 is in a tightened or untightened state.

Figure 33B:
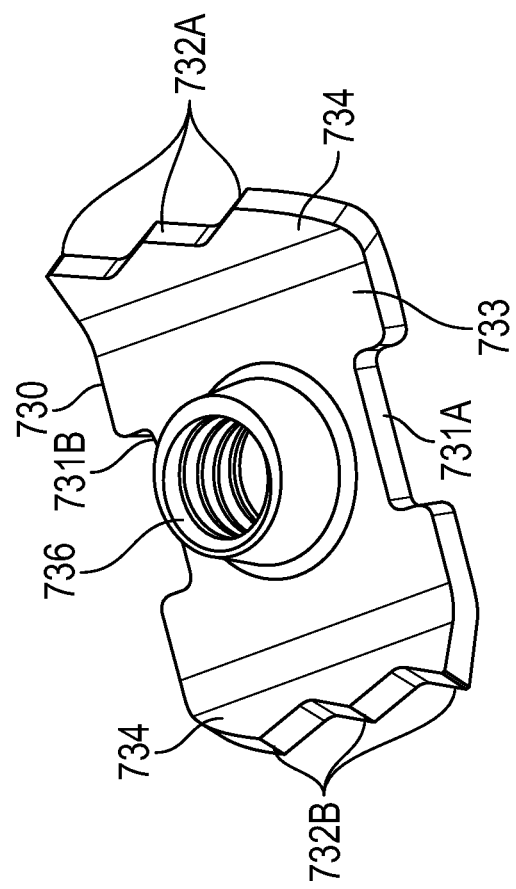
FIG. 33B is a top isometric view of a lower portion of the MLPE mounting clamp of FIGS. 32A-32B.
Figure 33A:
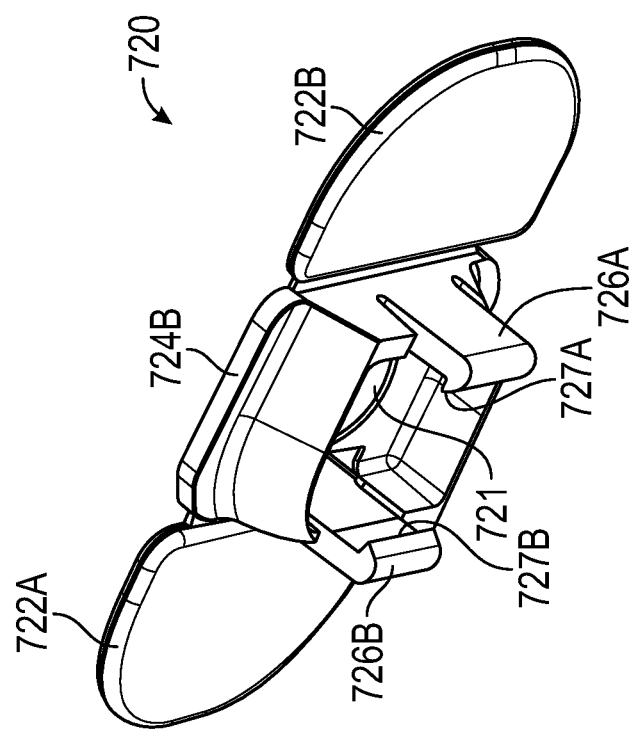
FIG. 33A is a bottom isometric view of an upper portion of the MLPE mounting clamp of FIGS. 32A-32B.

The upper mounting support 720 also includes a pair of deflectable, downwardly-extending clips 726A, 726B, wherein the clips 726A, 726B are configured to releasably engage with respective notches 731A, 731B of the lower nut member 730 (shown in FIG. 33B). The clips 726A, 726B include downwardly extending resilient tabs or flanges, which flanges include inwardly extending lips 727A, 727B. As the upper mounting support 720 is pressed onto the lower nut member 730, the clips 726A, 726B are located in the notches 731A, 731B and are forced apart by a tapering inner surface on the lips 727A, 727B. When the top surface of the lips 727A, 727B pass over the bottom surface of the lower nut member 730, the resilient tabs snap back towards each other, locking the resilient flanges into the notches 731A, 731B. In this way, the upper mounting support 720 may be clipped to the lower nut member 730, and the upper mounting support and the lower nut member 730 may be loosely coupled to one another even in the absence of the fastener member 706.

Referring again to FIG. 33B, the lower nut member 730 includes a central plate portion 733 which defines a protruding threaded hole 736 with internal threads configured to mate with the external threads of the threaded shank 712 of fastener member 706. Central plate portion 733 includes notches 731A, 731B for receiving the flanges of retaining clips 726A, 726B. Opposing ends of lower nut member 730 also include upwardly-angled flanges 734A, 734B that engage the elongated recesses 27A, 27B of rail 10. The upwardly angled flanges 734A, 734B include piercing portions 732A, 732B that may be formed as a serrated edge. These piercing portions 732A, 732B are sufficiently hard and sharp so as to penetrate an inner surface layer of the recesses of a rail when the MLPE mounting clamp 700 is tightened on the rail, thereby electrically bonding the MLPE mounting clamp 700 to the rail.

As shown in FIGS. 32A-33B, the support tabs 724A, 724B and/or the piercing portions 732A, 732B may include one or more rounded corners, which enable the upper mounting support 720 and/or the lower nut member 730 to be rotated 900 (but not beyond 90°) so as to ease positioning and tightening of the MLPE mounting clamp 700 within the rail.

Additionally, referring again to FIGS. 32A and 32B, the fastener member 706 may include a captured (or integrated) washer 710, with an underside of the washer 710 having a plurality of sharp ridges or raised portions formed thereon. These ridges on washer 710 allow for an improved coupling and electrical bonding between the mounting plate 702 and the mounting clamp 700 when the MLPE mounting clamp 700 is sufficiently tightened.

In one embodiment, the upper mounting support 720 may be formed of a non-metallic material such as, e.g., plastic, while the lower nut member 730 may be formed of an electrically conducting material such as, e.g., aluminum, stainless steel, carbon steel, titanium, etc. However, in other embodiments, it is to be understood that one or both of upper mounting support 720 and lower nut member 730 may be formed of a one or more different materials, including non-metallic materials, and upper mounting support 720 is not limited to non-metallic materials and may be formed of, e.g., aluminum, steel, titanium, etc.

Figures 34A, 34B:
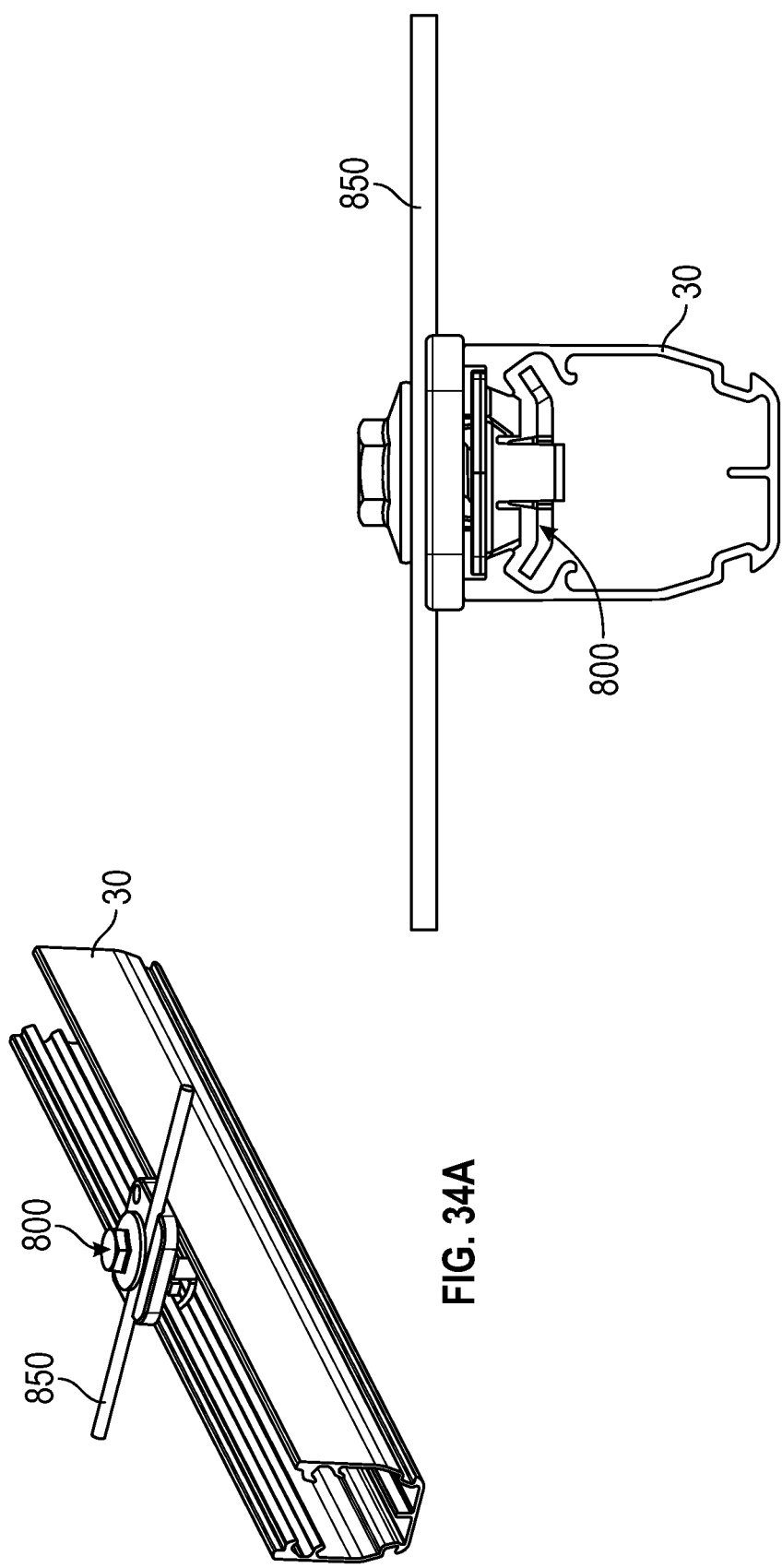
FIG. 34A is a top isometric view of a grounding lug mount assembly coupled to a rail and grounding wire in accordance with an aspect of the present disclosure.
FIG. 34B is an end view of the grounding lug mount assembly coupled to a rail of FIG. 34A.

Next, referring to FIGS. 34A-36B, various components of a grounding lug clamp assembly 800 in accordance with another aspect of the present disclosure are illustrated. As is shown in FIGS. 34A and 34B, the grounding lug clamp assembly 800 is configured to conductively couple a grounding wire 850 to a rail 30, thereby electrically grounding the rail 30. For the purpose of illustration, grounding wire 850 is truncated in FIGS. 34A and 34B, but it is to be understood that grounding wire 850 may extend between other components of an overall solar panel array in accordance with embodiments of the present disclosure.

Referring now to FIGS. 35A-36B, features of grounding lug clamp assembly 800 are shown in greater detail. Grounding lug clamp assembly 800 includes a top plate 802 having a top surface 804 and a bottom surface 806. Top plate 802 may be formed of an electrically-conductive material so as to provide for suitable conduction between the grounding wire 850 and the lug clamp assembly 800. As is shown in FIG. 36A, the top surface 804 includes a wire groove 810 formed thereon, with wire groove 810 sized and configured to accommodate a portion of the grounding wire 850. The wire groove 810 is positioned in proximity to a through-hole 811, with the through-hole 811 sized and configured to accommodate a shank of a fastening member (e.g., threaded shank 825 of fastener member 820 shown in FIG. 35B). Such positioning of wire groove 810 and through-hole 811 provides for a secure clamping interface for the grounding wire 850 between the top plate 802 and the fastener member 820.

Figure 36B:
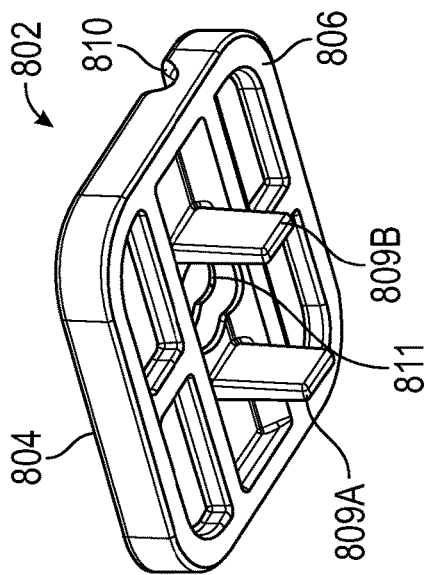
FIG. 36B is a bottom isometric view of the grounding plate of FIG. 36A.

As is shown in FIG. 36B, top plate 802 also includes a pair of downwardly-extending tabs 809A, 809B. The tabs 809A, 809B are configured to couple the top plate 802 to an upper mounting support 830 of the grounding lug clamp assembly 800, as will be described in further detail below.

Figure 35B:
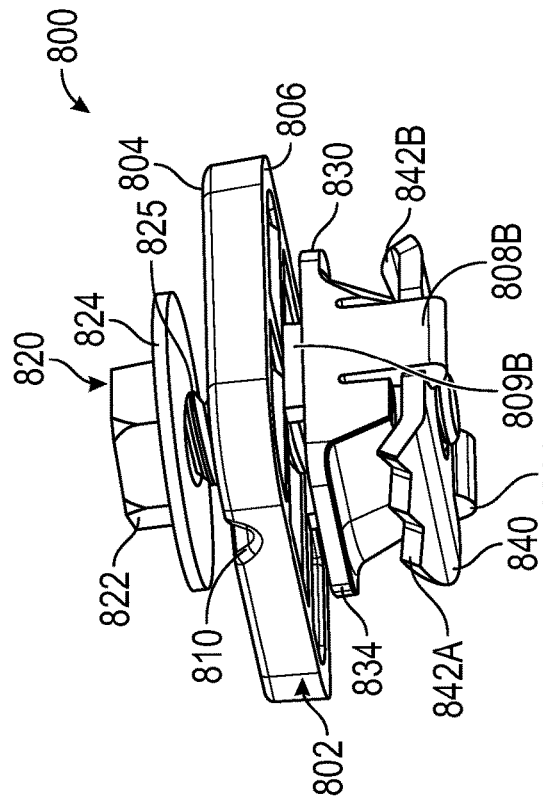
FIG. 35B is a bottom isometric view of the grounding lug mount assembly of FIG. 34A.
Figure 35A:
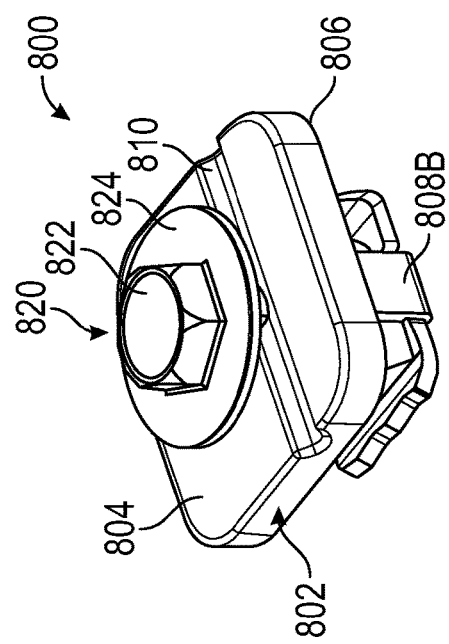
FIG. 35A is a top isometric view of a grounding lug mount assembly in accordance with an aspect of the present disclosure.
Figure 36A:
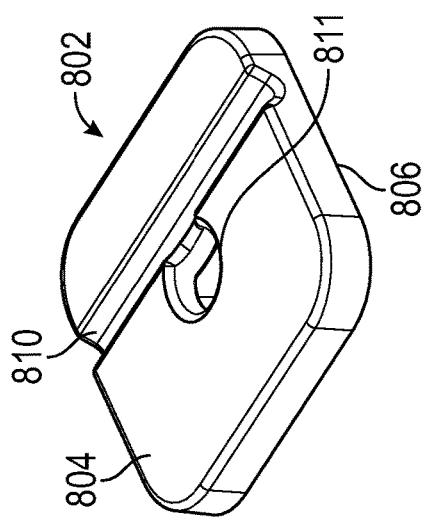
FIG. 36A is a top isometric view of a grounding plate for use with the grounding lug mount assembly of FIGS. 35A-35B.

Referring to FIGS. 35A and 35B, grounding lug clamp assembly 800 comprises an upper mounting support 830, a lower nut member 840, and a fastener member 820. The upper mounting support 830, lower nut member 840, and fastener member 820 function substantially similarly to the comparable features of MLPE mounting clamp 700 described above. Accordingly, not all features of the grounding lug clamp assembly 800 will be shown and described herein. The upper mounting support 830 is substantially similar to upper mounting support 720, with the notable difference that upper mounting support 830 does not include support wings 722A, 722B. Upper mounting support 830 includes a through-hole (not shown but substantially similar to hole 721 shown in FIG. 33A) to allow the threaded shank 825 of the fastener member 820 to pass therethrough. Also, while not shown in FIGS. 35A and 35B, it is to be understood that upper mounting support 830 includes slotted openings similar to slotted openings 731A, 731B formed in upper mounting support 720 shown and described with respect to FIG. 32A, with these slotted openings configured to receive tabs 809A, 809B of top plate 802. As is shown in FIG. 34B, opposing support surfaces of the upper mounting support 830 are configured to rest atop the ledge surfaces of the rail 30, regardless of whether the grounding lug clamp assembly 800 is in a tightened or untightened state.

The upper mounting support 830 also includes a pair of deflectable, downwardly-extending clips 808A, 808B, wherein the clips 808A, 808B are configured to releasably engage with respective notches (not shown) of the lower nut member 840 (shown in FIG. 35B). This clip engagement is similar to that discussed above in regard to upper mounting support 720 and nut member 730. In this way, the upper mounting support 830 and lower nut member 840 may be loosely coupled to one another, even in the absence of the fastener member 820.

The lower nut member 840 includes a central protruding threaded hole, like central protruding threaded hole 736 of nut member 730, with internal threads configured to mate with the external threads of the threaded shank 825 of fastener member 820. Accordingly, as fastener member 820 is rotated in a tightening direction, the lower nut member 840 is drawn upwards relative to the top plate 802 and upper top surfaces of the rail. Opposing ends of lower nut member 840 also include upwardly-angled flanges 844A, 844B. These flanges 844A, 844B include piercing portion 842A, 842B which are sufficiently hard and sharp so as to penetrate an inner surface layer of the recesses of a rail (e.g., recesses 48A, 48B of rail 30) when the grounding lug clamp assembly 800 is tightened on the rail, providing for sufficient electrical bonding between the grounding lug clamp assembly 800 and the rail.

As shown in FIGS. 35A and 35B, the support tabs of the upper mounting support 830 and/or the upwardly-angled flanges 844A, 844B may include one or more rounded corners, which enable the upper mounting support 830 and/or the lower nut member 840 to be rotated 90° (but not beyond 90°) so as to ease positioning and tightening of the grounding lug clamp assembly 800 within the rail. Similar to the MLPE mounting clamp 700, the grounding lug clamp assembly can be inserted into the rail in a first position, then rotated 90 degrees to a second position. In the second position the upwardly angled flanges 844A, 844B of the nut member 840 are located within the recesses of the rail and the support tabs 834A, 834B of the upper mounting support 830 are on top of the ledge top surfaces of the rail.

Additionally, referring again to FIGS. 35A and 35B, the fastener member 820 may include a drive head 822 and a washer 824. In some embodiments, the washer 824 is configured as a captured (or integrated) washer 824. The washer 824 is sized and configured such that the underside of the washer 824 provides a compressive surface in order to clamp the grounding wire 850 between the washer 824 and the top plate 802, thus providing an electrical bond between the grounding wire and the washer 824 and the grounding lug clamp assembly 800.

In one embodiment, the upper mounting support 830 may be formed of a non-metallic material such as, e.g., plastic, while the lower nut member 840 may be formed of an electrically conducting material such as, e.g., aluminum, stainless steel, carbon steel, titanium, etc. However, in other embodiments, it is to be understood that one or both of upper mounting support 830 and lower nut member 840 may be formed of a one or more different materials, including non-metallic materials, and upper mounting support 830 is not limited to non-metallic materials and may be formed of, e.g., aluminum, steel, titanium, etc.

As shown throughout FIGS. 1A-36B and the associated descriptions pertaining to these figures set forth above, the various components of the rail-based solar panel mounting system disclosed herein are configured to be electrically bonded with respect to one another. In this way, the system disclosed herein is a fully electrically bonded system which, when connected to ground, fulfils and complies with regulatory requirements related to electrical grounding. For example, referring to all embodiments disclosed above, the solar panel frames are electrically bonded to the mid-clamp assemblies, the universal end clamp assemblies, and/or the hidden end clamp assemblies as described in specific detail above. Furthermore, the mid-clamp assemblies, the universal end clamp assemblies, and/or the hidden end clamp assemblies are themselves electrically bonded to the rail(s). Rail splices between adjoining rails are electrically bonded to the rail(s) themselves, thereby creating the electrical bond between the rails. Even further, the rail(s) are electrically bonded to respective rail attachment bracket(s) which, in turn, are electrically bonded to mounting brackets affixed to a roof or other surface. Other accessories such as MLPE mount assemblies and grounding lug mount assemblies are also configured to electrically bond accessories and wires to the rail(s) and, thus, the entire system to which the rail(s) are attached. Accordingly, the rail-based solar panel mounting system(s) described herein provide for a fully integrated, electrically bonded system.

Next, referring to FIGS. 37-39B, various features of a skirt assembly 900 in accordance with another aspect of the present disclosure are shown. As is known in the art, skirt assemblies are provided on the periphery of solar panel arrays to improve the overall aesthetics of the array, improve water, snow, and ice shedding, etc. The skirt assembly 900 in accordance with an aspect of the present disclosure is configured to be coupled to a solar panel frame member 912 and includes a skirt member 901 removably couplable to a clamp assembly 920, as will be described in further detail below.

Figure 37:
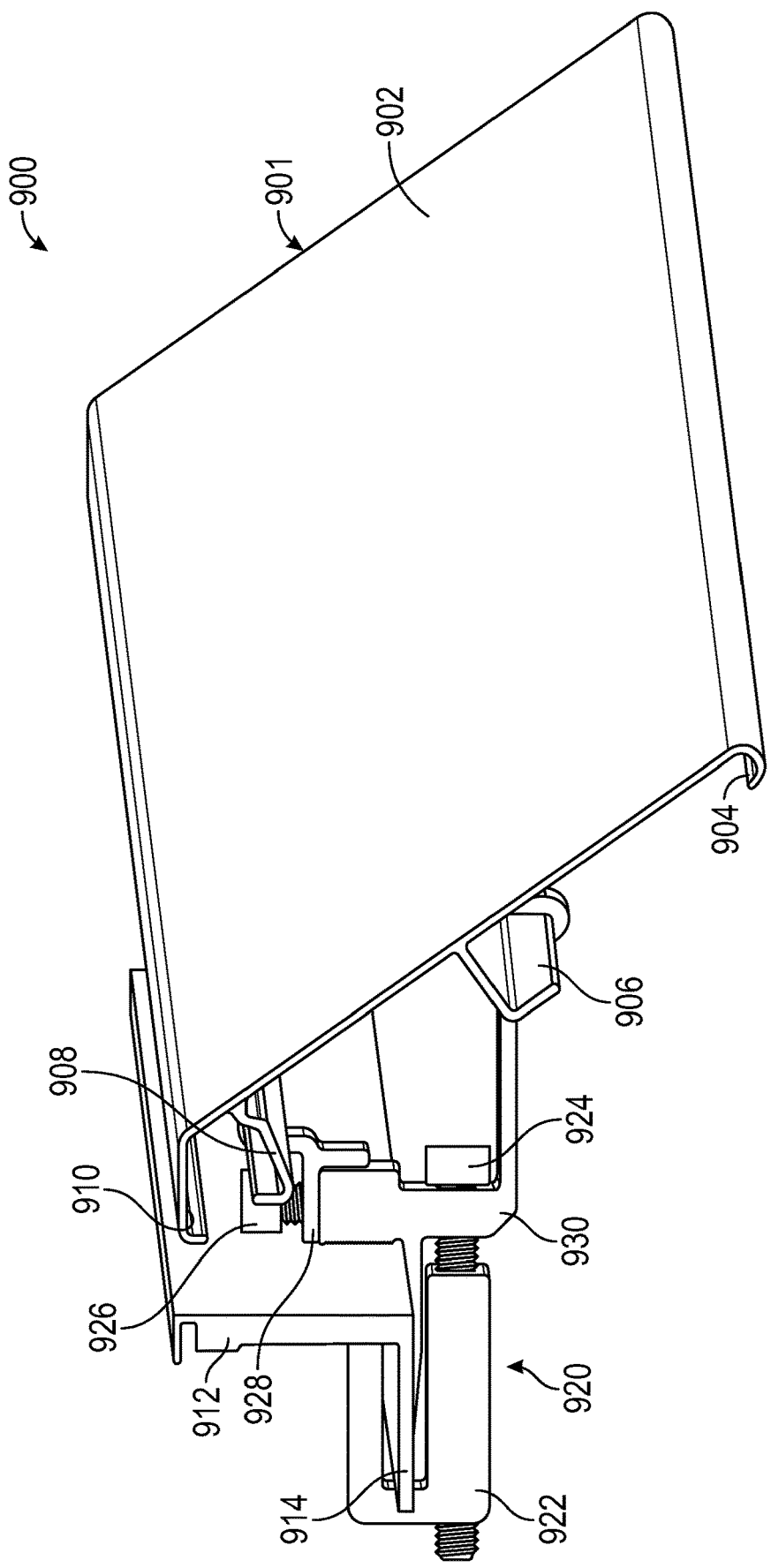
FIG. 37 is an isometric view of a skirt assembly in accordance with an aspect of the present disclosure.
Figure 38:
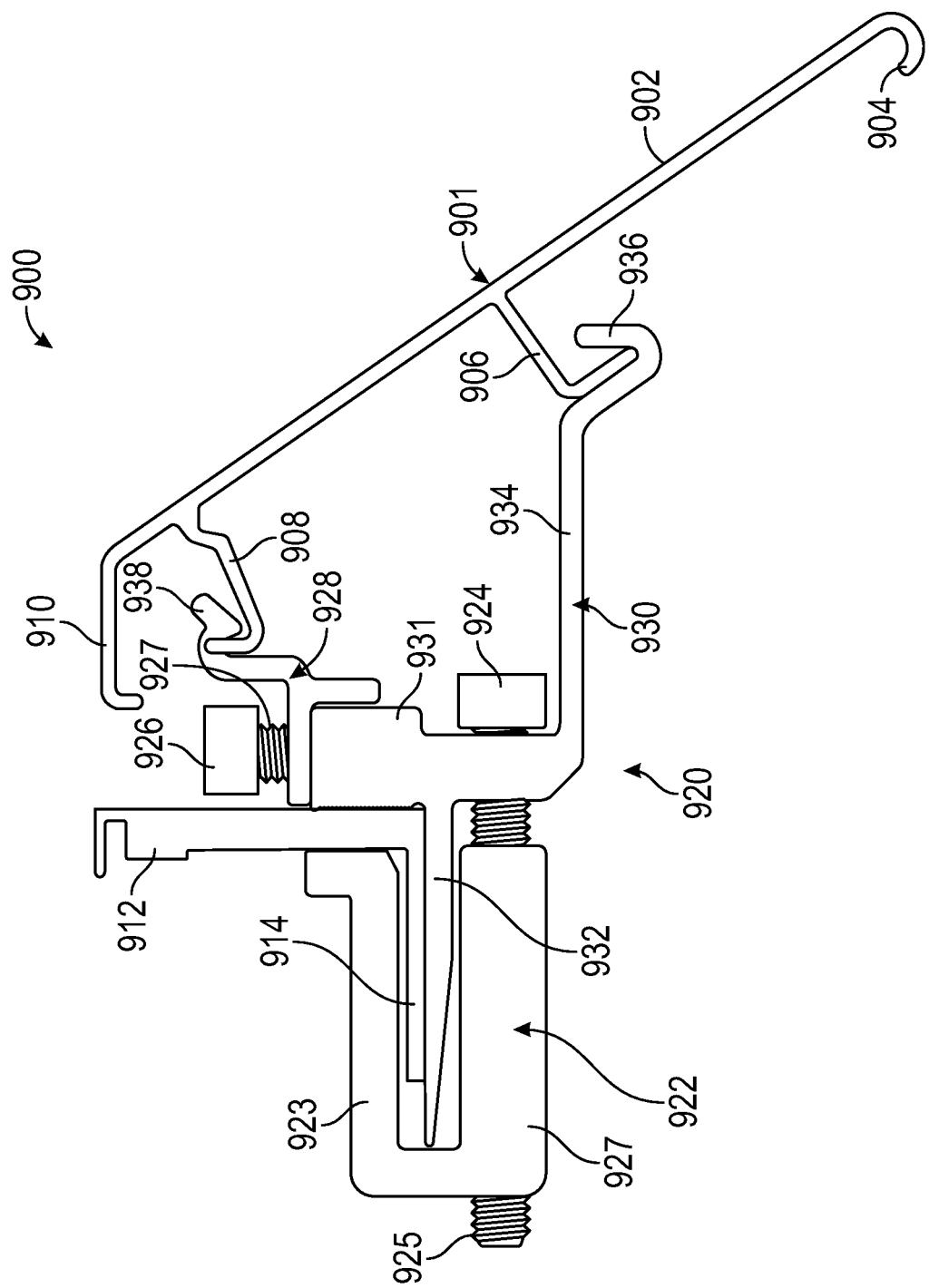
FIG. 38 is an end view of the skirt assembly of FIG. 37.

As shown in FIGS. 37 and 38, skirt member 901 is an elongated member extending approximately the length of one or more solar panels. The skirt member 901 includes an angled face 902, a bottom portion 904, a middle coupling portion 906, and an upper coupling portion 908. In some embodiments, the middle coupling portion 906 and/or upper coupling portion 908 extend along the entire length of may skirt member 901 and may be curved and/or bent so as to provide a hook-like interface with features of the clamp assembly 920, as will be described below. The skirt member 901 may also include a top portion 910, which provides a flat surface above the angled face 902. Furthermore, while skirt member 901 is shown having an angled face 902, in other embodiments of the present disclosure, it is to be understood that the "face" may be curved in either a concave or convex manner.

The skirt member 901 may be formed of any appropriate material and by any appropriate manufacturing method. For example, in one embodiment, the skirt member 901 may be formed of extruded aluminum. However, it is to be understood that skirt member may be formed of any appropriate material such as, e.g., stainless steel, carbon steel, titanium, plastic, etc. Additionally, the skirt member 901 may be formed by any appropriate manufacturing method such as, e.g., extrusion, molding, forging, casting, milling, roll forming, stamping, etc.

Referring still to FIGS. 37 and 38, and also to FIGS. 39A and 39B, the skirt member 901 is configured to be removably coupled to an elongated solar panel frame member 912 by way of a clamp assembly 920. The clamp assembly 920 includes a rear clamping member 922, a front clamping member 930, and an upper clamping member 928, with each of these clamping members being formed as separate components of the clamp assembly 920. The front clamping member 930 and rear clamping member 922 are couplable via a first fastener member 924 having a threaded shank 925, while the upper clamping member 928 is couplable to a portion of the front clamping member 930 via a second fastener member 926.

The rear clamping member 922 may be substantially U-shaped and includes an upper extending arm 923 and a lower extending arm 927, with a rear portion 940 connecting the upper extending arm 923 and the lower extending arm 927. While not shown, lower extending arm 927 includes a threaded through-hole formed therein, with the threaded through-hole containing internal threads configured to interface with external threads of the treaded shank 925 of first fastener member 924. As is shown in FIG. 39A, a proximal surface of the upper extending arm 923 further includes a serrated face 942. The serrated face 942 provides for an improved frictional interface between the rear clamping member 922 and a rear surface of the solar panel frame member 912 when the clamp assembly 920 is in a tightened configuration.

The front clamping member 930 includes a substantially vertical portion 931, a single rearwardly-extending arm 932 extending from a middle portion of a rear face of vertical portion 931, and a single forwardly-extending arm 934 extending from a bottom portion of a front face of vertical portion 931. The rearwardly-extending arm 932 may have a substantially flat top surface and bottom surface with a tapered bottom surface portion, as shown in FIG. 38. The top surface of the rearwardly-extending arm 932 may remain flush against a lower surface of a bottom frame portion 914 of the solar panel frame member 912 when the clamp assembly 920 is in a tightened state, while the tapered bottom surface of rearwardly-extending arm 932 may allow for simplified insertion of the rearwardly-extending arm 932 into the rear clamping member 922.

The forwardly-extending arm 934 of front clamping member 930 may include a hook interface 936 on a distal end thereof. As shown in FIG. 38, the hook interface 936 is curved upwardly so as to provide a suitable interface with the middle coupling portion 906 of the skirt member 901. In this way, the skirt member 901 can be at least partially coupled to the front clamping member 930.

While not shown in FIGS. 37-39B, it is to be understood that the vertical portion 931 of front clamping member 930 may include a pair of through-holes formed therein. A first through-hole is configured to allow the threaded shank 925 of first fastener member 924 to pass therethrough, while the second through-hole is configured to receive a threaded portion of the second fastener member 926, with at least the second through-hole having internal threads to provide a threaded connection between the vertical portion 931 and the second fastener member 926.

Referring to FIG. 39B, a rear-facing face of the vertical portion 931 may include a serrated face 943. Similar to the serrated face 942 of the rear clamping member 922 described above, serrated face 943 provides for an improved frictional interface between the front clamping member 930 and a front surface of the solar panel frame member 912 when the clamp assembly 920 is in a tightened configuration.

Referring still to FIGS. 37-39B, the upper clamping member 928 includes a downwardly-extending leg 950, a rearwardly-extending leg 952, and an upwardly-extending leg 951. The rearwardly-extending leg 952 is configured to interface with a top surface of the vertical portion 931 of front clamping member 930 and includes a threaded or unthreaded through-hole to allow the threaded shank of second fastener member 926 to pass therethrough. The downwardly-extending leg 950 is configured to align with a front face of the vertical portion 931. At a distal end of the upwardly-extending leg 951, the upper clamping member 928 is provided with a downward-facing hook interface 938. As is shown in FIG. 38, this downward-facing hook interface 938 provides a suitable interface with the upper coupling portion 908 of the skirt member 901. In this way, the skirt member 901 can be at least partially coupled to the upper clamping member 928.

In one embodiment, the front clamping member 930, rear clamping member 922, and the upper clamping member 928 are each formed of a metallic material such as, e.g., aluminum, stainless steel, carbon steel, titanium, etc. However, in other embodiments, one or more of these clamping members may be formed of a non-metallic material such as, e.g., plastic.

During installation of the skirt assembly 900 on a solar panel array, the rear clamping member 922 and front clamping member 930 of the clamp assembly 920 are first coupled to the solar panel frame member 912, with the rear clamping member 922 and front clamping member 930 clamped to the solar panel frame member 912 via tightening of the first fastener member 924. It is to be understood that more than one clamp assembly 920 may be positioned along the solar panel frame members 912, as needed. To be clear, an array of solar panels having solar panel frame members may be installed with the frame members aligned relatively in order to form a substantially straight array edge. Multiple skirt clamp assemblies 900 can be clamped to the solar panel frame members of solar panels making up the perimeter substantially straight edge of the array. Then, the skirt member 901 is positioned relative to the front clamping member 930 such that the middle coupling portion 906 fits within the hook interface 936 of the front clamping member 930. Next, the upper clamping member 928 is positioned such that the downward-facing hook interface 938 captures the upper coupling portion 908 of the skirt member 901. Once in this position, the second fastener member 926 may be tightened, thereby snuggly coupling the upper clamping member 928 to the front clamping member 930 and securely coupling the skirt member 901 to the overall clamp assembly 920.

Figure 41:
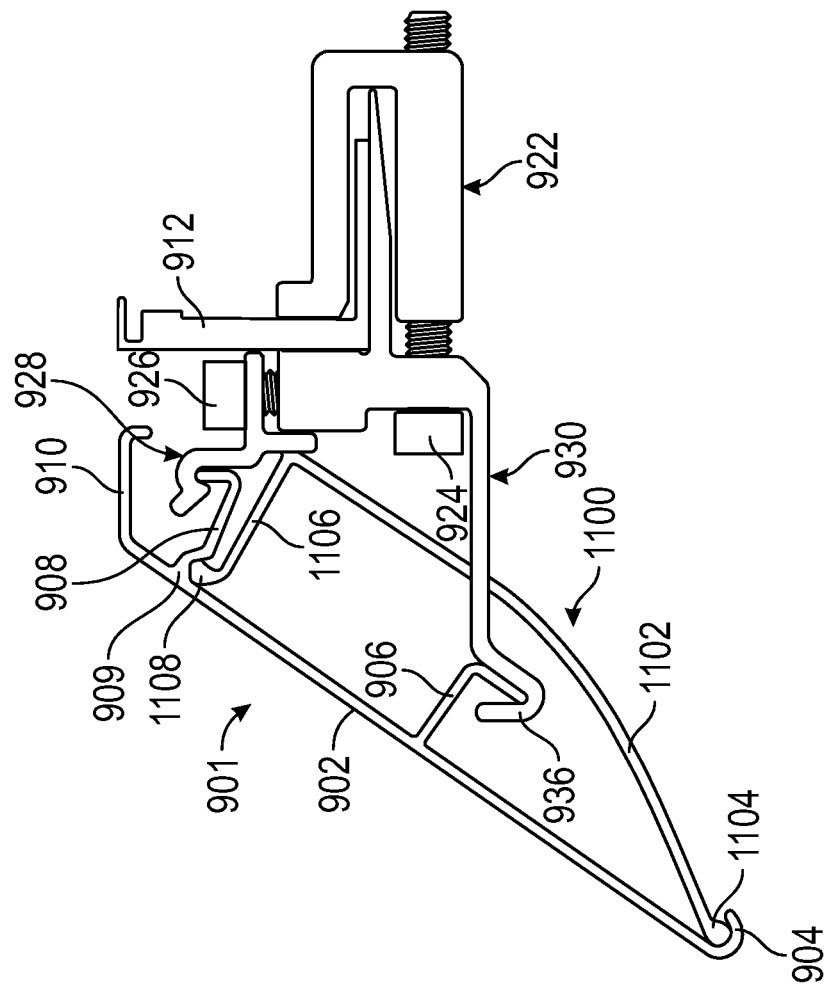
FIG. 41 is an end view of the skirt clamp assembly of FIG. 37 incorporating the a skirt and the skirt splice of FIG. 40.
Figure 40:
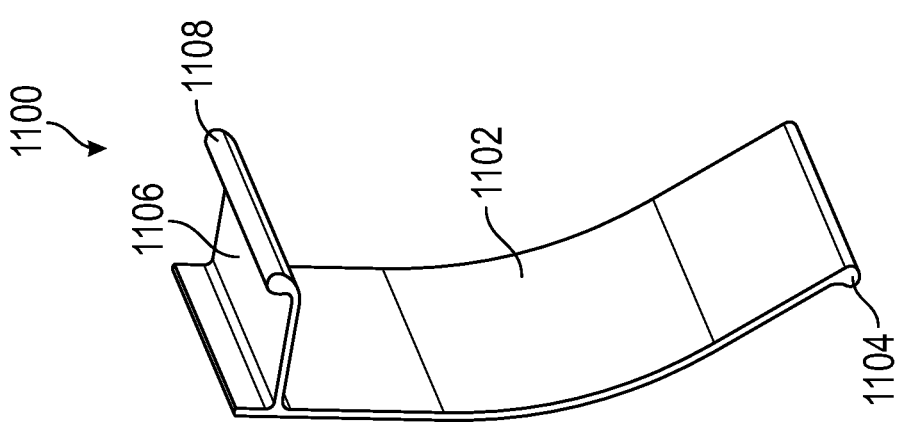
FIG. 40 is an isometric view of a skirt splice in accordance with an aspect of the present disclosure.
Figure 42:
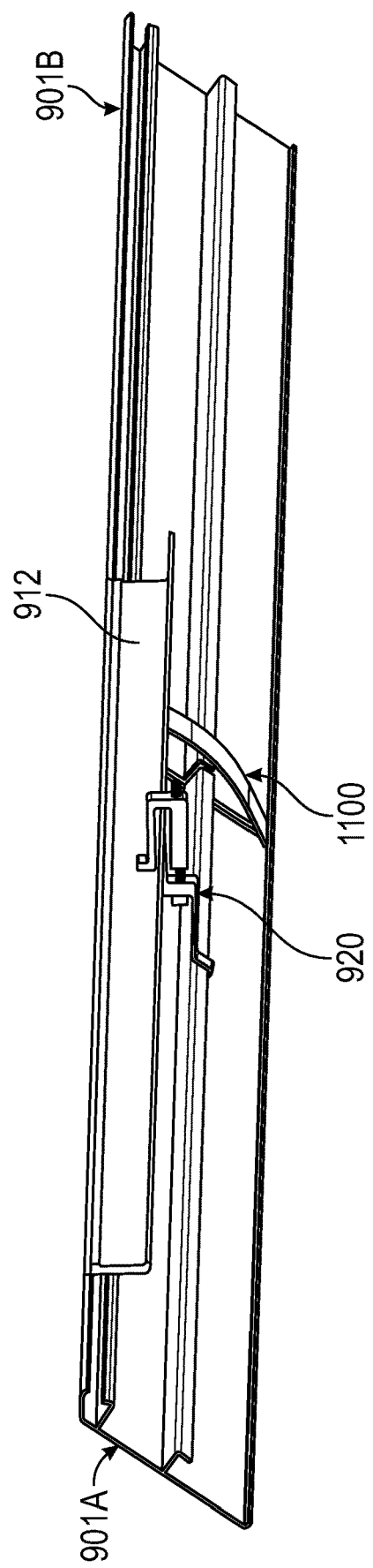
FIG. 42 is a rear isometric view of the skirt clamp assembly incorporating a skirt and the skirt splice of FIG. 40.

Next, referring to FIGS. 40-42, a skirt splice 1100 for use in conjunction with the skirt assembly 900 described above is shown. As will be described in greater detail below, the skirt splice 1100 may be utilized to couple the ends of multiple skirt members 901, thereby creating the appearance of a continuous skirt member from a plurality of skirt members 901. As shown in FIG. 40, the skirt splice 100 comprises a partially curved elongated portion 1102, a lower interface 1104, an upper extending member 1106, and an upper interface 1108. In some embodiments, the upper extending member 1106 may extend substantially perpendicular to an inner face of the elongated portion 1102. Additionally, at least the elongated portion 1102 may be formed of a substantially elastic material so as to enable skirt splice to deflect in order to provide a tight fit with corresponding surfaces of the skirt members 901. For example, referring to FIG. 41, the skirt splice 1100 may be positioned below one or more skirt members 901 such that the lower interface 1104 pressingly engages with an interior curved surface of the bottom portion 904 of skirt member 901, while the upper interface 1108 pressingly engages with an inset portion 909 of the upper coupling portion 908. In this way, the skirt splice 1100 is held in place relative to the skirt members 901 via spring force as opposed to, e.g., one or more fasteners. The skirt splice may be formed of any appropriate material allowing for such deflection such as, e.g., aluminum, steel, plastic, etc.

Referring to FIG. 42, a skirt splice 1100 is shown positioned in the span between two laterally adjacent skirt members 901A, 901B. As noted above with respect to FIGS. 40 and 41, the skirt splice is able to couple the ends of the adjacent skirt members 901A, 901B through spring force so as to provide for a substantially continuous skirt member made of a plurality of skirt members 901A, 901B.

Utilizing the various components and embodiments described above, the rail-based mounting system(s) described herein may provide for simplified, faster solar panel installation as compared to previous systems, while still using known processes and basic installation skills. Additionally, many other advantages over existing mounting systems may also be realized. For example, the universal clamps disclosed herein may work with all standard module frame thicknesses and dimensions. Furthermore, the disclosed system may provide improved aesthetics over known systems, using a skirt with a universal clamp that works with all standard module frame thicknesses and dimensions, as well as a hidden end clamp. The disclosed system also represents an improvement in wire management, with an open conduit in the rail(s) sized and shaped to optimally fit common quantities of standard wires and connectors within the conduit, providing speed and ease of installation, as well as improved long-term protection of wires and connectors from possible damage due to, e.g., connectors sitting in water, tight bend radiuses, etc.

The proposed systems may also represent various other advantages and/or improvements over known systems including, e.g., improved universal integrated electrical bonding and grounding, improved splice connections that facilitate a stronger end-to-end connection with ease and confidence of installation, an improved installation process facilitated and accelerated by a snap-in rail attachment bracket, improved long term durability of overall system, with cleared pathways for collected water to exit the rails, and optimized material usage to meet structural requirements of intended regional load requirements. However, it is to be understood that the overall advantages and/or improvements of the disclosed rail-based mounting system are not limited to these examples.

While several embodiments of rail-based mounting systems and associated componentry are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A hidden end clamp assembly configured to secure a frame member of a solar panel module to a rail, the assembly comprising:
    a clamping body, wherein the clamping body comprises a top clamping portion having a lower clamping surface and a leg portion extending downwardly from the lower clamping surface at an acute angle, wherein a distal end portion of the leg portion comprises a base portion having at least one elongated opening formed therethrough;
    a nut member, wherein the nut member comprises a pair of flanges extending from a rear portion, wherein the pair of flanges are spaced apart so as to at least partially receive the base portion of clamping body, wherein the rear portion extends at an angle substantially equal to the acute angle of the leg portion of the clamping body, and further wherein the rear portion comprises a threaded opening formed therethrough; and
    a fastener member, wherein the fastener member comprises a drive head and a threaded shank, and wherein the threaded shank is configured to extend through the at least one elongated opening of the base portion and engage with the threaded opening of the rear portion of the nut member such that tightening of the fastener member causes the clamping body to move downward relative to the nut member.

2. The assembly of claim 1, wherein the top clamping portion further comprises one or more bonding portions extending from the lower clamping surface, wherein the bonding portions are formed of an electrically conducting material.

3. The assembly of claim 2, wherein the one or more bonding portions comprise one or more sharp piercing points.

4. The assembly of claim 1, wherein the base portion of the clamping body comprises a pair of elongated openings formed therethrough.

5. The assembly of claim 1, further comprising a retaining member configured to be coupled to the clamping body and the nut member by the fastener member to support the clamping body relative to the nut member when the fastener member is in an untightened state.

6. The assembly of claim 5, wherein the retaining member comprises a bottom retaining portion, a front extension, a rear extension, and a curved portion coupling the front extension and the rear extension, wherein the rear extension is configured to extend within the rear portion of the nut member such that the retaining member acts as a spring to urge the rear portion of the nut member away from the leg portion of the clamping body.

7. The assembly of claim 6, wherein the front extension comprises a front through-hole and the rear extension comprises a rear through-hole, wherein the front through-hole and the rear-through hole are sized and configured to receive the threaded shank of the fastener member therethrough so as to couple the retaining member to the clamping body and the nut member.

8. The assembly of claim 1, wherein the base portion of the clamping body further comprises a pair of projecting side surfaces having respective sloping ledges and the flanges of the nut member comprise respective sloping flange bottom surfaces, further wherein the sloping flange bottom surfaces engage the sloping ledges when the fastening member is tightened.

9. The assembly of claim 1, wherein the pair of flanges of the nut member further comprise respective wing projections angled outwardly therefrom, wherein the wing projections are configured to provide a slidable interface between the nut member and a pair of elongated recesses of the rail.

10. The assembly of claim 9, wherein each wing projection comprises at least one piercing projection extend from an upper portion of a notch.

11. The assembly of claim 1, wherein the base portion of the clamping body further comprises a front face, wherein a surface plane of the front face is parallel to the angled leg portion of the clamping body.

12. The assembly of claim 1, wherein a rear surface of the top clamping portion of the clamping body comprises a plurality of parallel ribs to form a textured surface.

13. The assembly of claim 1, wherein the base portion of the clamping body further comprises a barb connector.

14. The assembly of claim 13, further comprising a tether, wherein the tether is configured to be coupled to the barb connector.

15. The assembly of claim 14, wherein the tether comprises a pulling end portion, an elongated central portion, and a coupling end portion, wherein the coupling end portion comprises an opening sized and configured to surround the barb connector.

16. The assembly of claim 1, wherein each of the clamp body, the nut member, and the fastener member are formed of an electrically conducting material.

17. A hidden end clamp assembly configured to secure a frame member of a solar panel module to a rail, the assembly comprising:
 a clamping body, wherein the clamping body comprises a top clamping portion having a lower clamping surface and a leg portion extending downwardly from the lower clamping surface at an acute angle, wherein a distal end portion of the leg portion comprises a base portion having at least one elongated opening formed therethrough;
 a nut member, wherein the nut member comprises a pair of flanges extending from a rear portion, wherein the pair of flanges are spaced apart so as to at least partially receive the base portion of clamping body, wherein the rear portion extends at an angle substantially parallel to the leg portion of the clamping body, and further wherein the rear portion comprises a threaded opening formed therethrough; and
 a fastener member, comprises a drive head and a threaded shank, the threaded shank through the at least one elongated opening of the base portion wherein a longitudinal axis of the threaded shank is nonparallel to the rail, and engage with the threaded opening of the rear portion of the nut member such that tightening of the fastener member causes the clamping body to move downward relative to the nut member.

18. The assembly of claim 17, a retaining member positioned at least partially between the clamping body and the nut member and configured to support the clamping body relative to the nut member wherein the retaining member comprises a bottom retaining portion, a front extension, a rear extension, and a curved portion coupling the front extension and the rear extension, wherein the rear extension is configured to extend within the rear portion of the nut member such that the retaining member acts as a spring to urge the rear portion of the nut member away from the leg portion of the clamping body.

19. The assembly of claim 17, wherein the clamping body comprises a barb connector extending from a surface thereof; and a tether, wherein the tether is configured to be couplable to the barb connector of the base portion of the clamping body to allow the assembly to be selectively positioned along the rail such that the lower clamping portion of the clamping body extends at least partially over the frame member of the solar panel module.

20. The assembly of claim 19, wherein the longitudinal axis of the threaded shank extends in a direction through the rail.

* * * * *